(12) United States Patent
Matthews

(10) Patent No.: US 12,450,794 B2
(45) Date of Patent: Oct. 21, 2025

(54) METHOD FOR NONDESTRUCTIVE REVERSE-ENGINEERING OF LAYERS OF PRINTED CIRCUIT BOARD

(71) Applicant: RJ Matthews LLC, Brentwood, TN (US)

(72) Inventor: Robert J. Matthews, Brentwood, TN (US)

(73) Assignee: RJ Matthews LLC, Brentwood, TN (US)

( * ) Notice: Subject to any disclaimer, the term of this patent is extended or adjusted under 35 U.S.C. 154(b) by 299 days.

(21) Appl. No.: 18/470,682

(22) Filed: Sep. 20, 2023

(65) Prior Publication Data

US 2024/0404127 A1 Dec. 5, 2024

Related U.S. Application Data

(60) Provisional application No. 63/384,574, filed on Nov. 21, 2022.

(51) Int. Cl.
*G06T 11/00* (2006.01)
*G06T 7/12* (2017.01)
(Continued)

(52) U.S. Cl.
CPC .............. *G06T 11/003* (2013.01); *G06T 7/12* (2017.01); *G06T 7/162* (2017.01); *G06T 7/62* (2017.01);
(Continued)

(58) Field of Classification Search
CPC ... G06T 7/0004; G06T 7/10–194; G06T 7/60; G06T 7/62; G06T 11/03;
(Continued)

(56) References Cited

U.S. PATENT DOCUMENTS 4,852,131 A * 7/1989 Armistead ........... G01N 23/046
378/58
4,922,915 A 5/1990 Arnold et al.
(Continued)

OTHER PUBLICATIONS

Asadizanjani, Navid, Mark Tehranipoor, and Domenic Forte. " PCB Reverse Engineering Using Nondestructive X-ray Tomography and Advanced Image Processing." IEEE Transactions on Components, Packaging and Manufacturing Technology 7(2), pp. 292-299. (Year: 2017).*

(Continued)

*Primary Examiner* — Scott A Rogers
(74) *Attorney, Agent, or Firm* — Patterson Intellectual Property Law, P.C.; Jerry Turner Sewell; Gary L. Montle

(57) ABSTRACT

A nondestructive method generates a representation of a pattern of electrically conductive material on at least one layer of a multiple-layer printed circuit board (PCB). The method generates a plurality of imaging slices by evaluating the voxels in a 3D nondestructive data set to identify voxels having intensities representing electrically conductive material. The method establishes a reference plane that includes at least one voxel identified in a selected one of the plurality of slices. The method determines a distance of other voxels from the reference plane and adjusts the respective 3D coordinate of each other voxel to effectively position a respective adjusted voxel in the reference plane. The method generates a two-dimensional (2D) image that includes the at least one voxel and the adjusted voxels in the reference plane. The 2D image represents the pattern of electrically conductive material in the at least one layer.

15 Claims, 74 Drawing Sheets

(51) Int. Cl.
| | |
|---|---|
| *G06T 7/162* | (2017.01) |
| *G06T 7/62* | (2017.01) |
| *G06T 15/08* | (2011.01) |
| *G06T 19/00* | (2011.01) |
| *G06V 10/25* | (2022.01) |
| *H05K 1/02* | (2006.01) |
| *H05K 1/14* | (2006.01) |

(52) U.S. Cl.
CPC ............ G06T 11/008 (2013.01); G06T 15/08 (2013.01); G06T 19/00 (2013.01); G06V 10/25 (2022.01); H05K 1/0284 (2013.01); H05K 1/0298 (2013.01); H05K 1/144 (2013.01); H05K 1/147 (2013.01); *G06T 2207/10081* (2013.01); *G06T 2207/10116* (2013.01); *G06T 2207/30141* (2013.01); *G06T 2219/008* (2013.01); *G06V 2201/12* (2022.01); *H05K 2201/04* (2013.01); *H05K 2201/041* (2013.01); *H05K 2201/09* (2013.01); *H05K 2201/09018* (2013.01); *H05K 2201/09209* (2013.01); *H05K 2201/09218* (2013.01); *H05K 2203/178* (2013.01)

(58) Field of Classification Search
CPC ....... G06T 11/008; G06T 15/08; G06T 19/00; G06T 2207/10081; G06T 2207/10116; G06T 2207/30141; G06V 10/25; G06V 2201/12; H05K 1/0284; H05K 1/0296; H05K 1/0298; H05K 1/14; H05K 1/144; H05K 1/147; H05K 3/46; H05K 3/4602; H05K 3/4611; H05K 3/4644; H05K 2201/04; H05K 2201/041; H05K 2201/09; H05K 2201/09018; H05K 2201/09209; H05K 2201/09218; H05K 2203/178

See application file for complete search history.

(56) References Cited

U.S. PATENT DOCUMENTS

| | | |
|---|---|---|
| 4,991,115 A | 2/1991 | Guthrie et al. |
| 6,990,222 B2 | 1/2006 | Arnold |
| 8,139,836 B2 | 3/2012 | Arnold et al. |
| 8,517,608 B1 | 8/2013 | Arnold |
| 8,649,577 B1 | 2/2014 | Arnold et al. |
| 8,649,843 B2 | 2/2014 | Arnold et al. |
| 11,158,039 B2 * | 10/2021 | Michael .................... G06T 7/75 |

OTHER PUBLICATIONS

Botero, Ulbert J., et al. "Semi-Supervised Automated Layer Identification of X-ray Tomography Imaged PCBs." 2020 IEEE Physical Assurance and Inspection of Electronics (PAINE). IEEE, pp. 1-6 (Year: 2020).*

Botero, Ulbert J., et al. "Automated Trace and Copper Plane Extraction of X-ray Tomography Imaged PCBs." 2021 IEEE Physical Assurance and Inspection of Electronics (PAINE). IEEE, pp. 1-6 (Year: 2021).*

True, John, et al. "Revisiting 3D-X-ray for Rapid Reverse Engineering in Large Electronic Packages and PCBs." 2022 IEEE Physical Assurance and Inspection of Electronics (PAINE). IEEE (Year: 2022).*

* cited by examiner

LEGEND

LEGEND

LEGEND

METHOD FOR NONDESTRUCTIVE REVERSE-ENGINEERING OF LAYERS OF PRINTED CIRCUIT BOARD

RELATED APPLICATION

This application claims the benefit under 35 U.S.C. § 119(e) of U.S. Provisional Application No. 63/384,574, filed Nov. 21, 2022, entitled "Method for Nondestructive Reverse-Engineering of Layers of Printed Circuit Board," which is hereby incorporated by reference in its entirety.

GOVERNMENT INTEREST

This invention was made with government support under SBIR Contract No. FA857120C0023 awarded by the U.S. Air Force Materiel Command (USAF/AFMC). The government has certain rights in the invention.

FIELD OF THE DISCLOSURE

The method disclosed herein is in the field of reverse engineering of printed circuit boards, and, more particularly, is in the field of nondestructive analysis of multilayer printed circuit board layers using computed tomography techniques.

BACKGROUND

An electronics object referred to as a circuit card assembly (CCA) is shown in FIG. 1. As shown in FIG. 1, a typical CCA 100 comprises electrical and electronic components 102 mounted on a printed circuit board (PCB) 104. For example, the components include resistors, capacitors, inductors, transistors, integrated circuits, connection pins, and the like. The CCA is assembled by affixing (e.g., soldering) components onto the PCB. The PCB provides the electrical connectivity between the components and serves as the mechanical chassis for the CCA.

FIG. 2A shows an embodiment of a typical PCB 202, which, as illustrated in the exploded view in FIG. 2B, has a laminated (multilayer) structure comprised primarily of alternating layers of conductor material (also known as circuit or plane layers) and non-conductor material (also known as dielectric layers). The front and back surfaces of PCBs are usually covered with solder mask layers as well to aid in soldering components to the PCB. The front surface and the back surface may also be referred to as the top outer layer and the bottom outer layer, respectively of the PCB. PCBs can contain several circuit layers and the method described herein is not limited to a certain number of layers. The embodiment in FIG. 2B illustrates a typical four-layer PCB which contains a front surface solder mask 204, a circuit layer 206 (called here "layer 1"), a dielectric layer 208, an internal circuit layer 210 (called here "layer 2"), a central or core dielectric layer 212, another internal circuit layer 214 (called here "layer 3"), a final dielectric layer 216, a final circuit layer 218 (called here "layer 4"), and a back surface solder mask 220. Neighboring circuit layers are connected to each other by conductor-plated drill holes, called vias 222, which pass through the dielectric layer between the neighboring circuit layers. Traces 224 create electrical connections from one location to another within a given circuit layer.

PCB manufacturing files relevant to this disclosure include circuit layer design files which provide imagery of each circuit layer, provide PCB stackup information that defines the thickness of each conductor and dielectric layer, and provide the drill hole information for both plated (i.e., vias) and non-plated drill holes present in each circuit and dielectric layer. As shown in FIGS. 3A-3D for the PCB embodied in FIG. 2B, each individual circuit layer design is defined by an image defining which locations in the layer contain the conductor (shown as hatched areas in the figures) and which do not (shown as clear areas in the figures). FIG. 3A illustrates the circuit layer image for "layer 1" 206, FIG. 3B illustrates the circuit layer image for "layer 2" 210, FIG. 3C illustrates the circuit layer image for "layer 3" 214, and FIG. 3D illustrates the circuit layer image for "layer 4" 218. This image information is often shared with and among manufacturers in a conventional vector image format known as Gerber files. The Gerber format is a vector image format as illustrated in more detail in FIG. 4 which is the detail region—4—taken from FIG. 3A. The detail illustrates the creation of the circuit layer image through definition of geometric features such as flashed pads (defined by their location and shape); drawn traces connecting pads (defined by their thickness and points along the trace path); drill holes (defined by their size and location), which are often placed at the center of pads; and conductor filled zones, also known as pours or planes or shielding (defined by their outline path). The figure shows example instances of flashed pads 402 and 404 that in this embodiment are rectangular or circular, traces 406 and 408 of various thicknesses, drill holes 410 and 412 of various radii, and a conductor pour region 414.

If the Gerber file or similar information is maintained for a PCB, the PCB may be reproduced many years later using the original information; however, if the original information is no longer available, a PCB cannot be readily reproduced because a large portion of the interconnections between the components on the outer layers is hidden on inner layers of a multilayer PCB. Thus, for example, if a PCB fails in a legacy system (e.g., a decades-old control system), the user of the legacy system may not be able to reproduce the failed PCB and return the legacy system to an operating condition. Previous techniques for determining the interconnections on inner layers have gradually removed the outer layers to progressively reveal the hidden interconnections by abrasion (e.g., sanding) or by other removal techniques. In addition to requiring substantial time and effort to remove the thin layers, the removal techniques have the unfortunate result of effectively destroying the PCB, which may be one of the few remaining PCBs for the legacy system. Other existing techniques electrically probe the conductor connection points (i.e., pads) visibly present on the PCB outer surface to determine electrical connectivity between the pads. However, such methods only provide the electrical connectivity information (i.e., netlist) and lack information on how that connectivity is physically manifested within the conductor layers within the board. This method therefore does not allow for reproduction of a legacy PCB that meets form, fit, and function of the original. Accordingly, a nondestructive technique is needed for determining the interconnections on inner layers of a multilayer PCB.

SUMMARY

One aspect of the embodiments disclosed herein is a nondestructive method that generates a representation of a pattern of electrically conductive material on at least one layer of a multiple-layer printed circuit board (PCB). The method generates a plurality of imaging slices by evaluating the voxels in a 3D nondestructive data set to identify voxels having intensities representing electrically conductive material. The method establishes a reference plane that includes at least one voxel identified in a selected one of the plurality of slices. The method determines a distance of other voxels from the reference plane and adjusts the respective 3D coordinate of each other voxel to effectively position a respective adjusted voxel in the reference plane. The method generates a two-dimensional (2D) image that includes the at least one voxel and the adjusted voxels in the reference plane. The 2D image represents the pattern of electrically conductive material in the at least one layer.

Another aspect of the embodiments disclosed herein is a nondestructive method for generating a representation of a pattern of electrically conductive material on at least one layer of a multiple-layer printed circuit board (PCB) wherein the at least one layer potentially has a non-planar surface, wherein the electrically conductive material is positioned on the non-planar surface, and wherein the electrically conductive material has a thickness orthogonal to the non-planar surface. The method comprises generating a plurality of imaging slices with a three-dimensional (3D) scanning device. Each imaging slice comprises a plurality of voxels. Each voxel has a volume centered at a respective 3D coordinate with respect to a common origin. Each voxel has an intensity responsive to a density of electrically conductive material in the volume of the voxel. The method further comprises evaluating the voxels in each imaging slice to identify voxels having intensities representing electrically conductive material. The method further comprises establishing a reference plane that includes at least one voxel identified in a selected one of the plurality of imaging slices. The reference plane is parallel to a plane tangential to the non-planar surface. For a voxel not in the selected imaging slice, the method determines a distance of the voxel from the reference plane and adjusts the respective 3D coordinate of the voxel to effectively position a respective adjusted voxel in the reference plane. The method further comprises generating a two-dimensional (2D) image comprising the at least one voxel and the adjusted voxels in the reference plane. The 2D image represents the pattern of electrically conductive material in the at least one layer.

In certain embodiments in accordance with this aspect, generating a plurality of imaging slices with a 3D scanning device includes x-raying the PCB at a plurality of angles to create a plurality of 2D projections; and combining the plurality of 2D projections to create the plurality of imaging slices. In certain embodiments, combining the plurality of 2D projections to create the plurality of imaging slices includes applying a computed tomography (CT) algorithm to the plurality of 2D projections to estimate a 3D intensity dataset.

In certain embodiments in accordance with this aspect, generating the plurality of imaging slices with a 3D scanning device includes aligning a slice axis of each of the plurality of imaging slices with an object axis of the PCB.

In certain embodiments in accordance with this aspect, the method further comprises evaluating the quality of the plurality of imaging slices, and selectively introducing intentional curvature to the PCB to improve the quality of the plurality of imaging slices.

In certain embodiments in accordance with this aspect, establishing a reference plane includes determining a number of layers present in the PCB and establishing a reference plane associated with each layer.

In certain embodiments in accordance with this aspect, evaluating the voxels in each imaging slice includes dividing each imaging slice into a plurality of regions of interest (ROI) arranged in a grid pattern, and measuring a depth of the electrically conductive material of each voxel within each ROI. In certain embodiments, determining a distance of each voxel from the reference plane includes comparing the depths of electrically conductive material of each voxel to determine a relative offset of each voxel, and building a board flexure surface based on the relative offset of each voxel. In certain embodiments, the method further comprises aligning and orienting the board flexure surface with a respective one of the plurality of imaging slices.

In certain embodiments in accordance with this aspect, the method further comprises converting the 2D image into a computer-aided manufacturing file. In certain embodiments, the computer-aided manufacturing file is in the form of a Gerber file. In certain embodiments, converting the 2D image into a computer-aided manufacturing file includes manually drawing elements associated with each layer. In certain embodiments, converting the 2D image into a computer-aided manufacturing file includes, via a computer program, automatically identifying and tracing elements associated with each layer. In certain embodiments, converting the 2D image into a computer-aided manufacturing file includes, via an algorithm, segmenting the 2D image into pixel clusters corresponding to individual elements and processing each pixel cluster.

Another aspect of the embodiments disclosed herein is a nondestructive method for generating a representation of a pattern of electrically conductive material on at least one layer of a multiple-layer printed circuit board (PCB), wherein the at least one layer potentially has a non-planar surface, wherein the electrically conductive material is positioned on and/or within the non-planar surface, and wherein the electrically conductive material has a thickness orthogonal to the non-planar surface. The method comprises generating a plurality of imaging slices via a three-dimensional (3D) scanning device. Each imaging slice includes a plurality of voxels. Each voxel has a volume centered at a respective 3D coordinate with respect to a common origin. Each voxel has an intensity responsive to a density of electrically conductive material in the volume of the voxel. The method further comprises aligning a slice axis associated with the plurality of imaging slices with an object axis of the PCB. The method further comprises evaluating the voxels in each imaging slice to identify voxels having intensities representing electrically conductive material The method further comprises determining a number of layers of the PCB The method further comprises generating a non-planar slice surface for each layer consistent with an estimated flexure of the PCB; and generating a two-dimensional (2D) image of each non-planar slice surface, the 2D image representing the pattern of electrically conductive material in the at least one layer.

BRIEF DESCRIPTION OF THE DRAWINGS

The foregoing aspects and other aspects of the disclosure are described in detail below in connection with the accompanying drawings in which.

DETAILED DESCRIPTION

The following description and the accompanying drawings illustrate a nondestructive process for analyzing the layers of a multilayer printed circuit board (PCB) and generating a respective manufacturing file (e.g., a Gerber file) to represent the interconnections and drill holes for each of the layers. The process is referred to herein as nondestructive reverse engineering.

Figure 5:
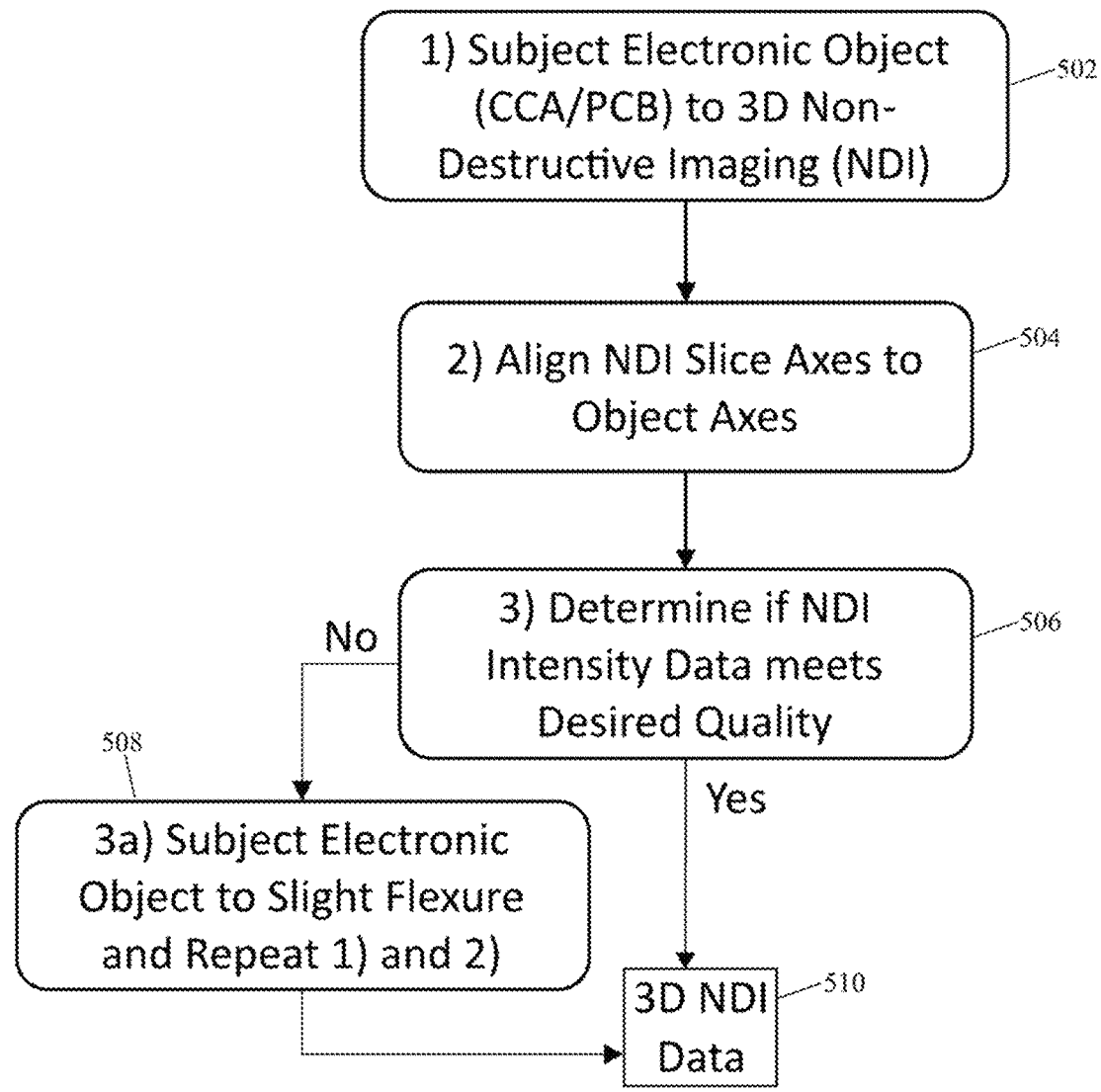
FIG. 5 illustrates a flowchart of the steps to obtain a three-dimensional (3D) nondestructive image (NDI) using computed tomography.

The illustrated process utilizes a three-dimensional (3D) nondestructive image (NDI) of the electronic object (e.g., PCB) to be reverse-engineered. The NDI comprises a plurality of NDI slices, which combine to form a 3D image. The NDI slices have axes, which are roughly aligned with the axes of the electronic object as described later in this document. The imagery provided by the NDI slices exhibits sufficient contrast to represent circuit layer features of interest (e.g., the conductors providing the interconnections and surrounding the drill holes). The following paragraphs provide background and nomenclature relevant to the imagery process. The specific modality of NDI described herein is x-ray computed tomography, which may be referred to herein as computed tomography (CT); however, the nomenclature and techniques are applicable to other NDI modalities. The steps to obtain the NDI imagery using x-ray tomography are illustrated in FIG. 5. A first step 502 subjects the electronic object (CCA/PCB) to 3D Non-Destructive Imaging (NDI). A second step 504 aligns the NDI slice axes to the object axes (i.e., the axes corresponding to the electronic object geometry). A third step 506 determines if the NDI intensity data meets the desired quality and specifically the proper contrast quality. If the NDI data does not meet the desired quality, an alternative step 508 is applied whereby the electronic object is subjected to a slight flexure and the prior steps are repeated. If the NDI data does meet the desired quality this alternative step is not necessary. A result 510 of the process illustrated in FIG. 5 is 3D NDI data of the electronic object which exhibits sufficient material contrast for reverse engineering, and which is aligned such that the NDI slicing axes are aligned with the electronic object geometry axes. The steps shown in FIG. 5 are illustrated in more detail in other figures and are discussed in more detail in subsequent sections.

Step 1: Subject Electronic Object (CCA/PCB) to 3D NDI

The electronic object (e.g., a circuit card assembly (CCA) or a PCB without mounted components) is subjected to a 3D NDI method to produce a full 3D digital dataset (aka 3D image). The 3D image is a data set of digital intensity values at (x, y, z) spatial locations where a digital value at a particular location correlates to an electronic object material density at that same spatial location. The 3D image can also be such that relative changes to neighboring intensity values in the 3D dataset correspond to relative material densities at neighboring points in the physical sample.

Figure 1:
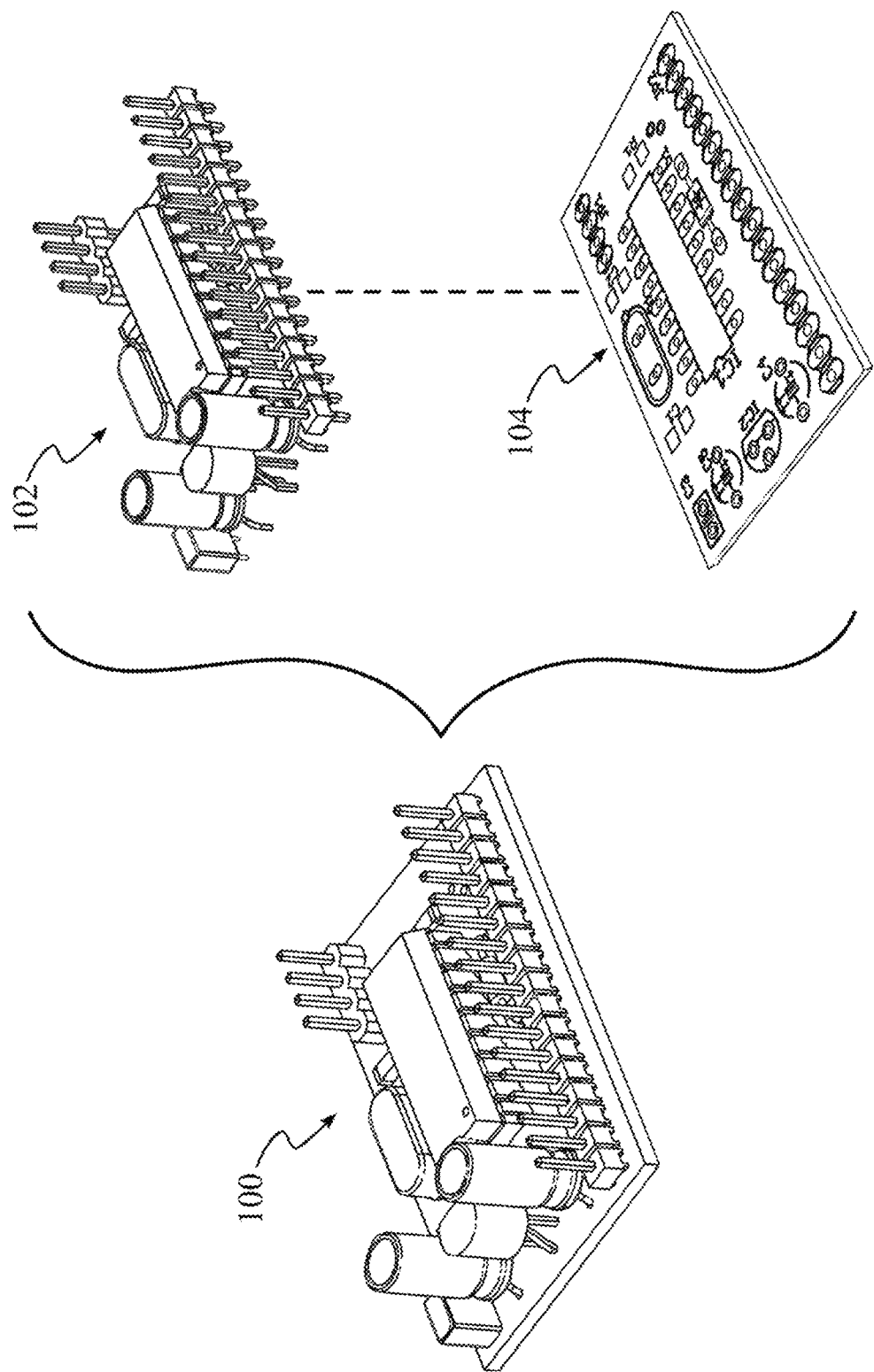
FIG. 1 illustrates a typical circuit card assembly (CCA), which comprises a printed circuit board (PCB) and a plurality of components mounted on the PCB.
Figure 2A:
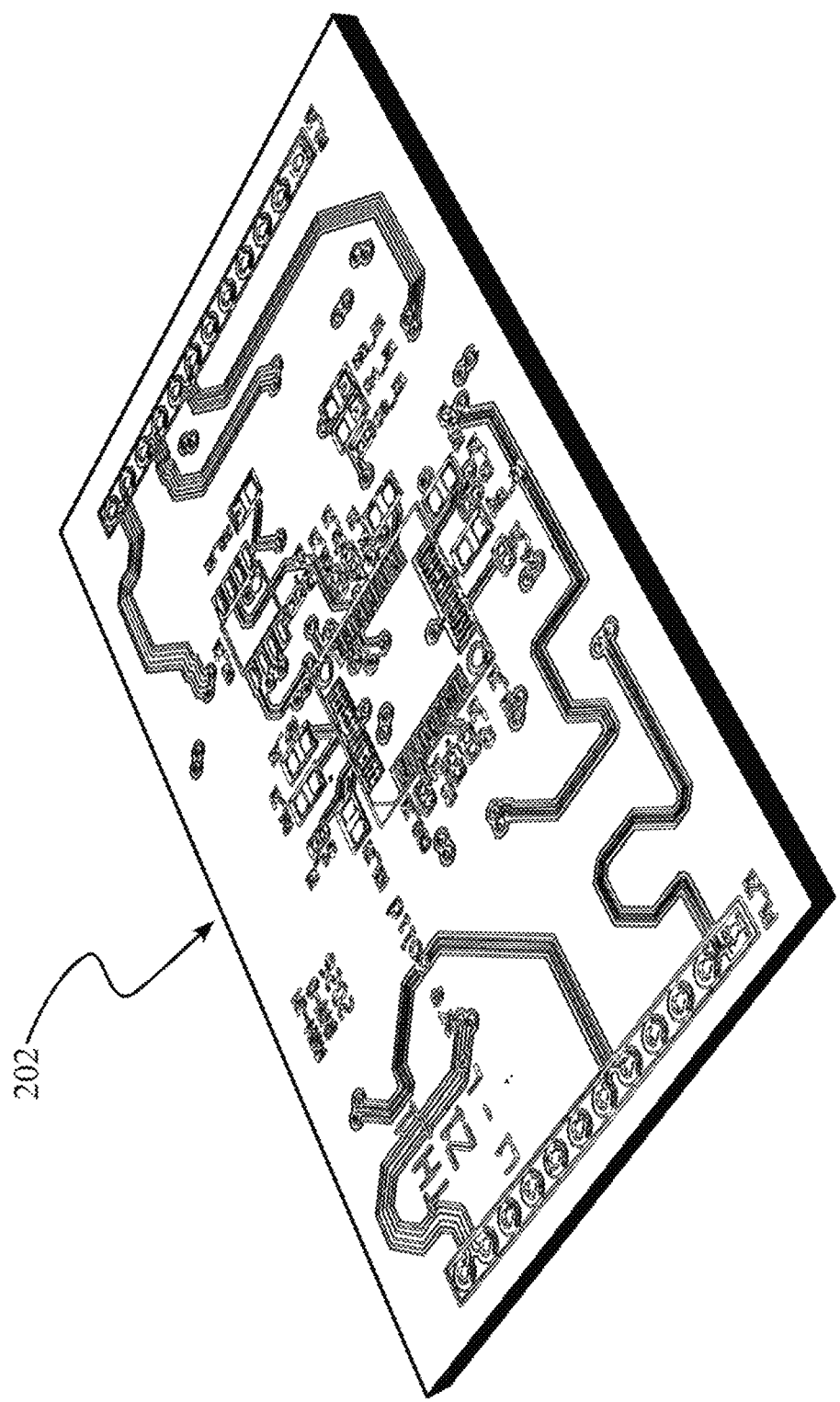
FIG. 2A illustrates a typical PCB.
Figure 2B:
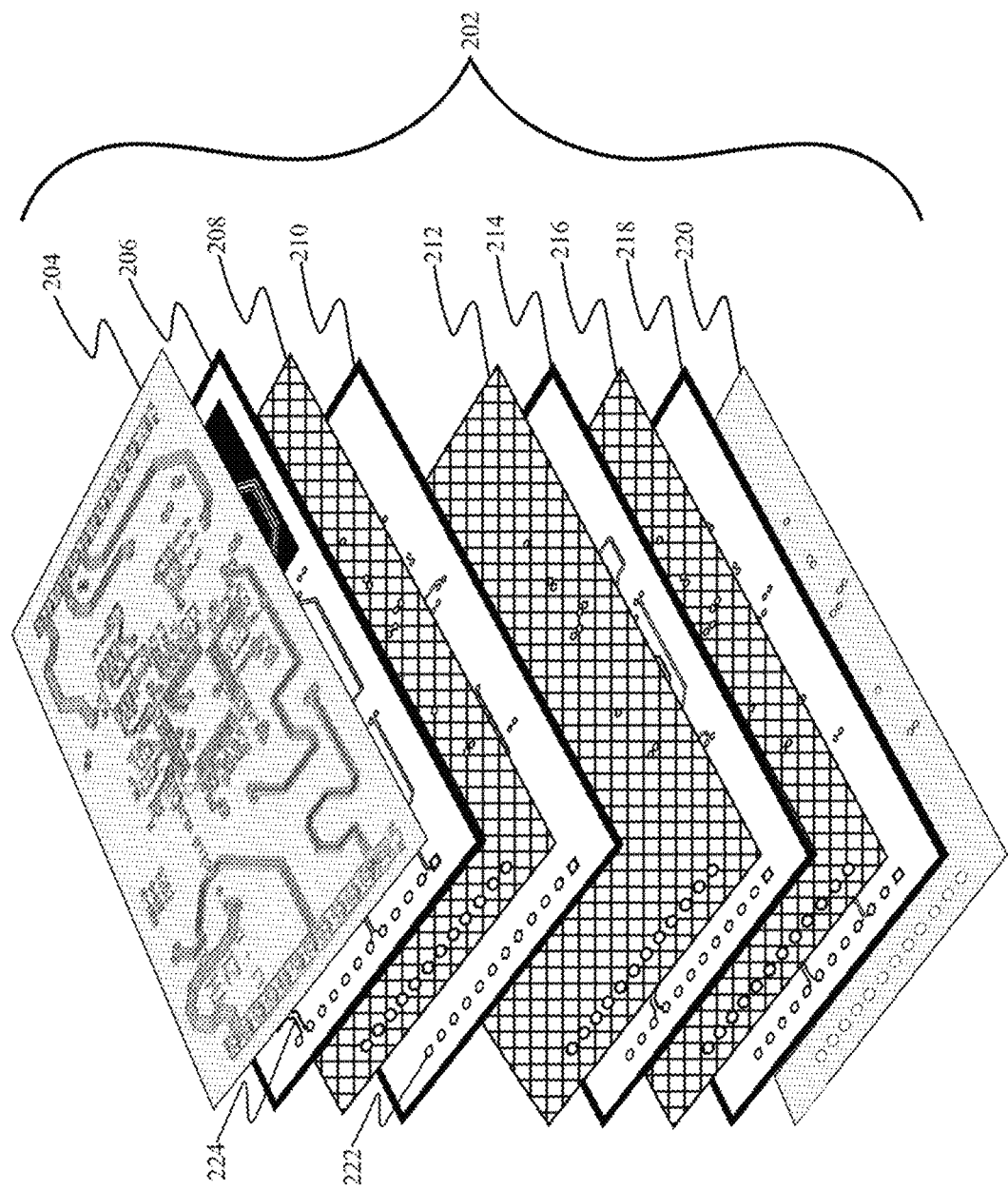
FIG. 2B illustrates the exploded view of the PCB in FIG. 2A demonstrating the laminated nature of PCBs.
Figure 3A:
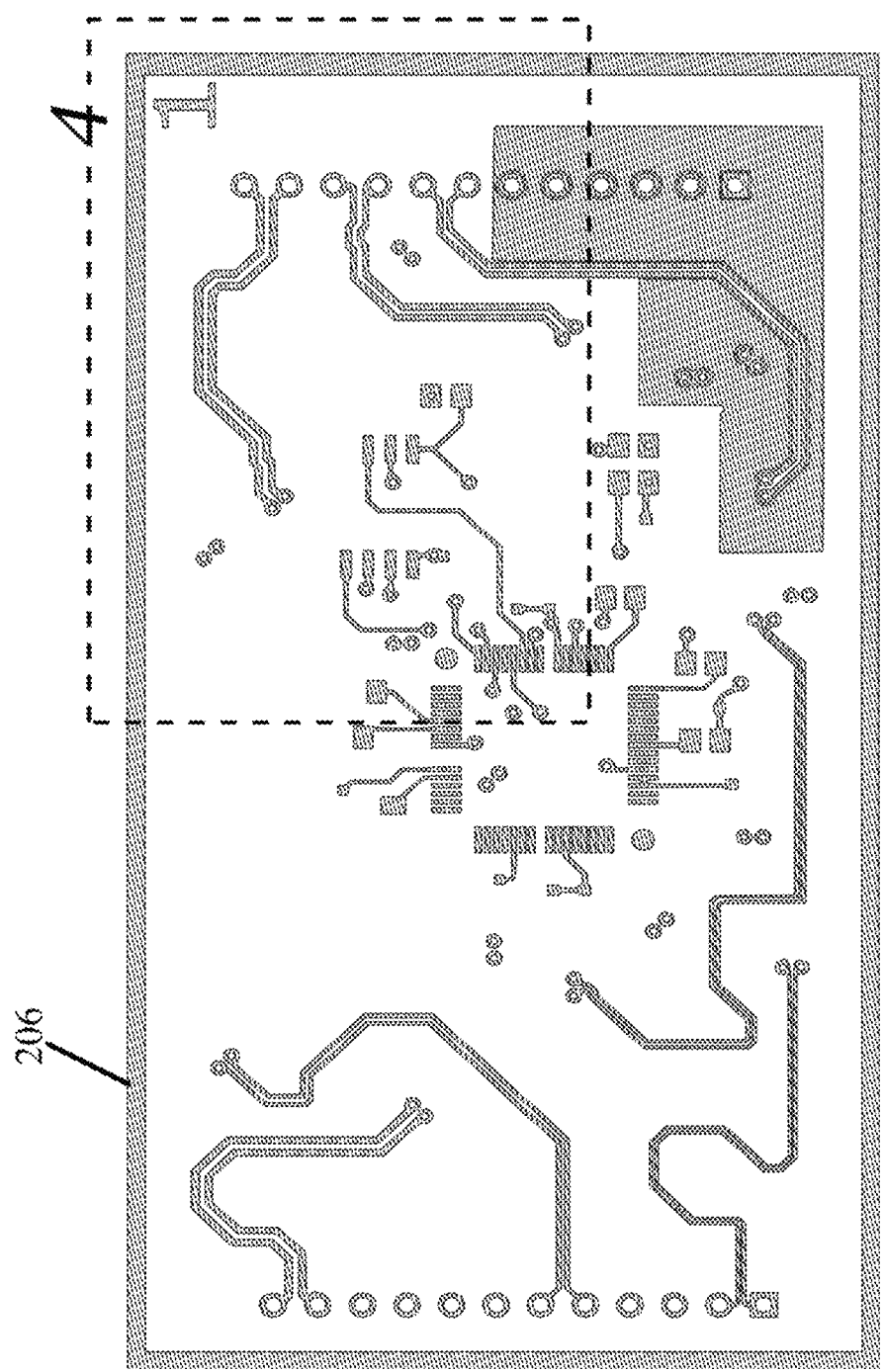
FIG. 3A illustrates the first internal circuit layer design image for the PCB in FIG. 2A.
Figure 3B:
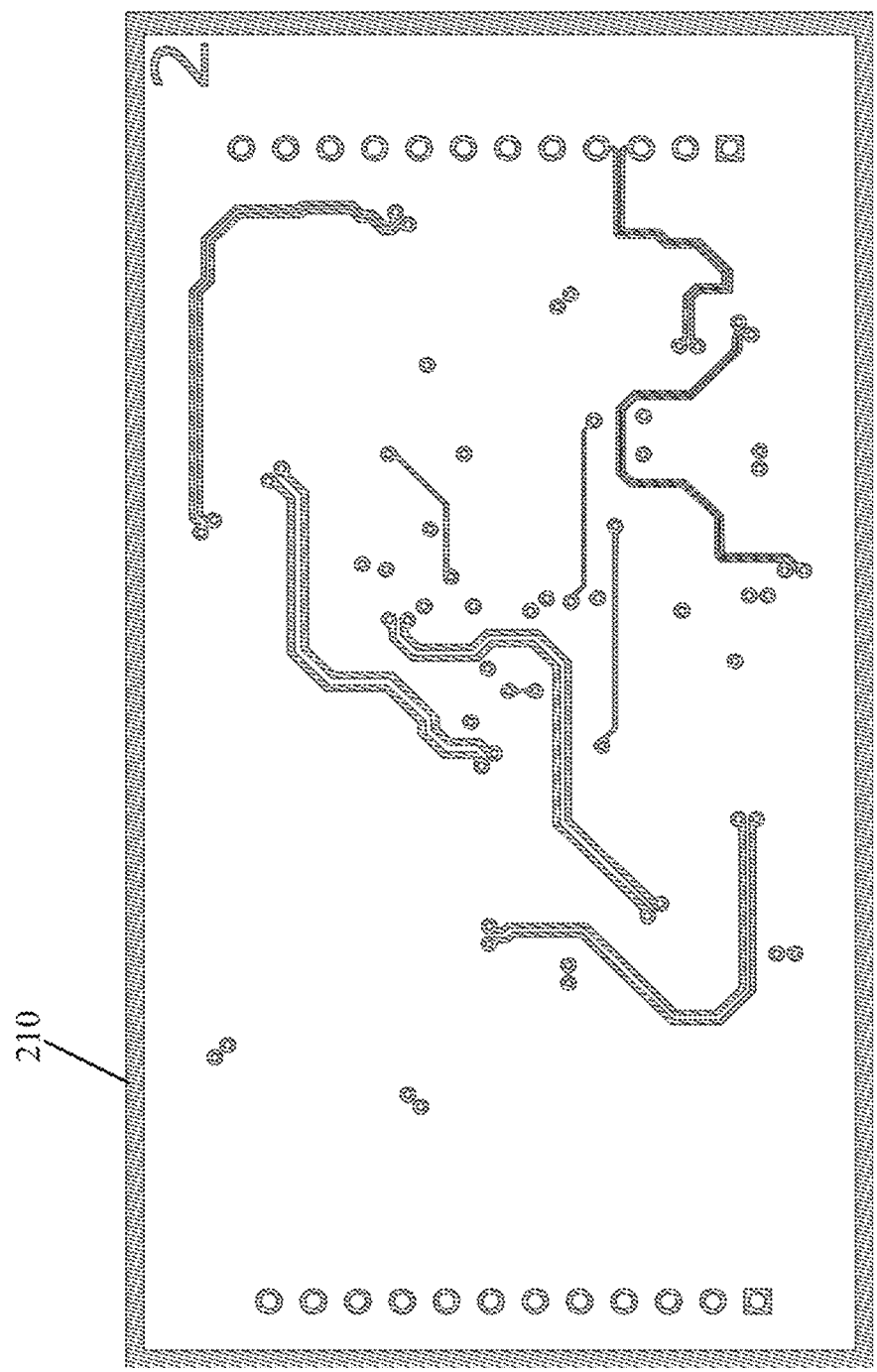
FIG. 3B illustrates the second internal circuit layer design image for the PCB in FIG. 2A.
Figure 3C:
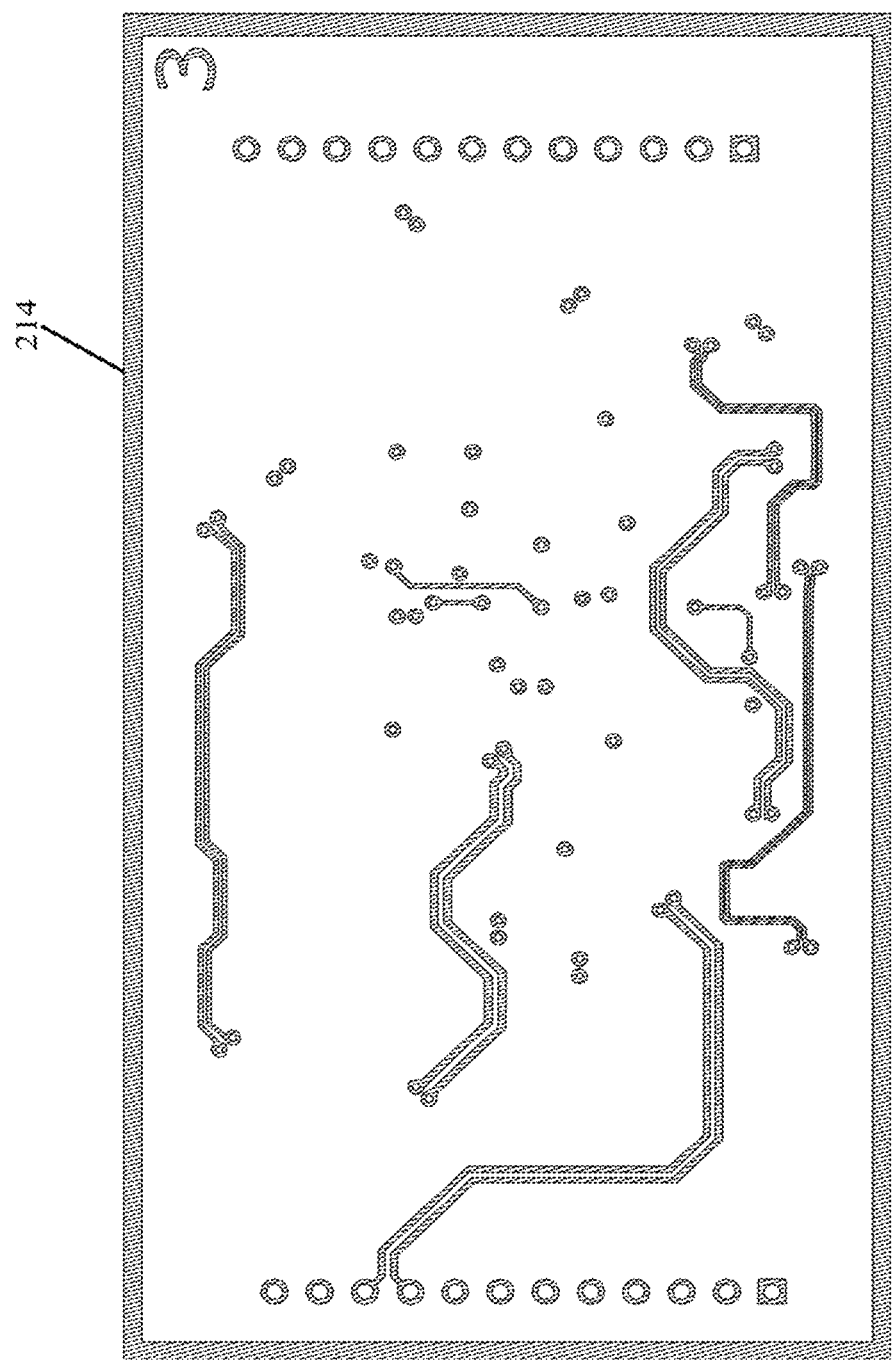
FIG. 3C illustrates the third internal circuit layer design image for the PCB in FIG. 2A.
Figure 3D:
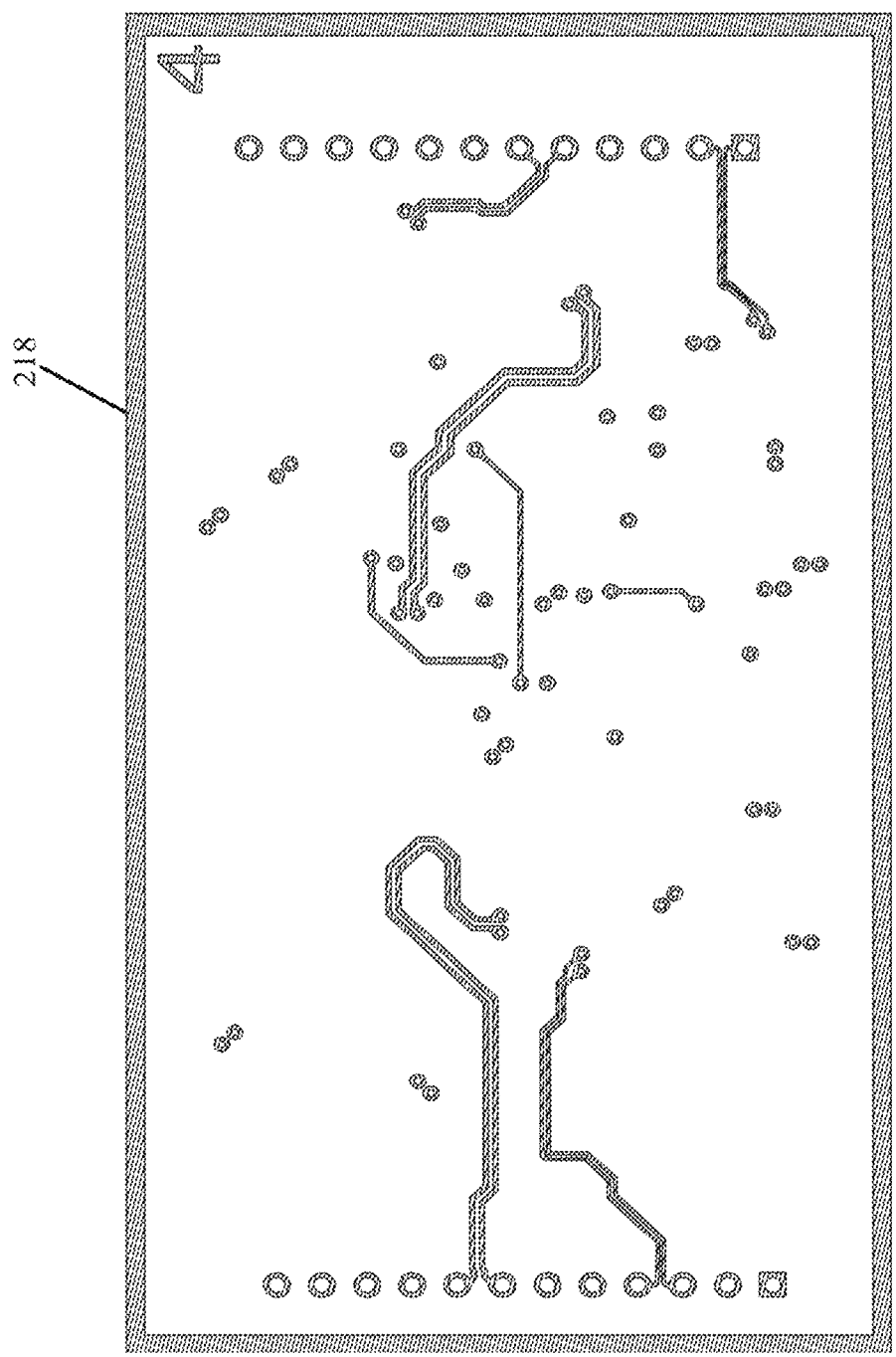
FIG. 3D illustrates the fourth internal circuit layer design image for the PCB in FIG. 2A.
Figure 4:
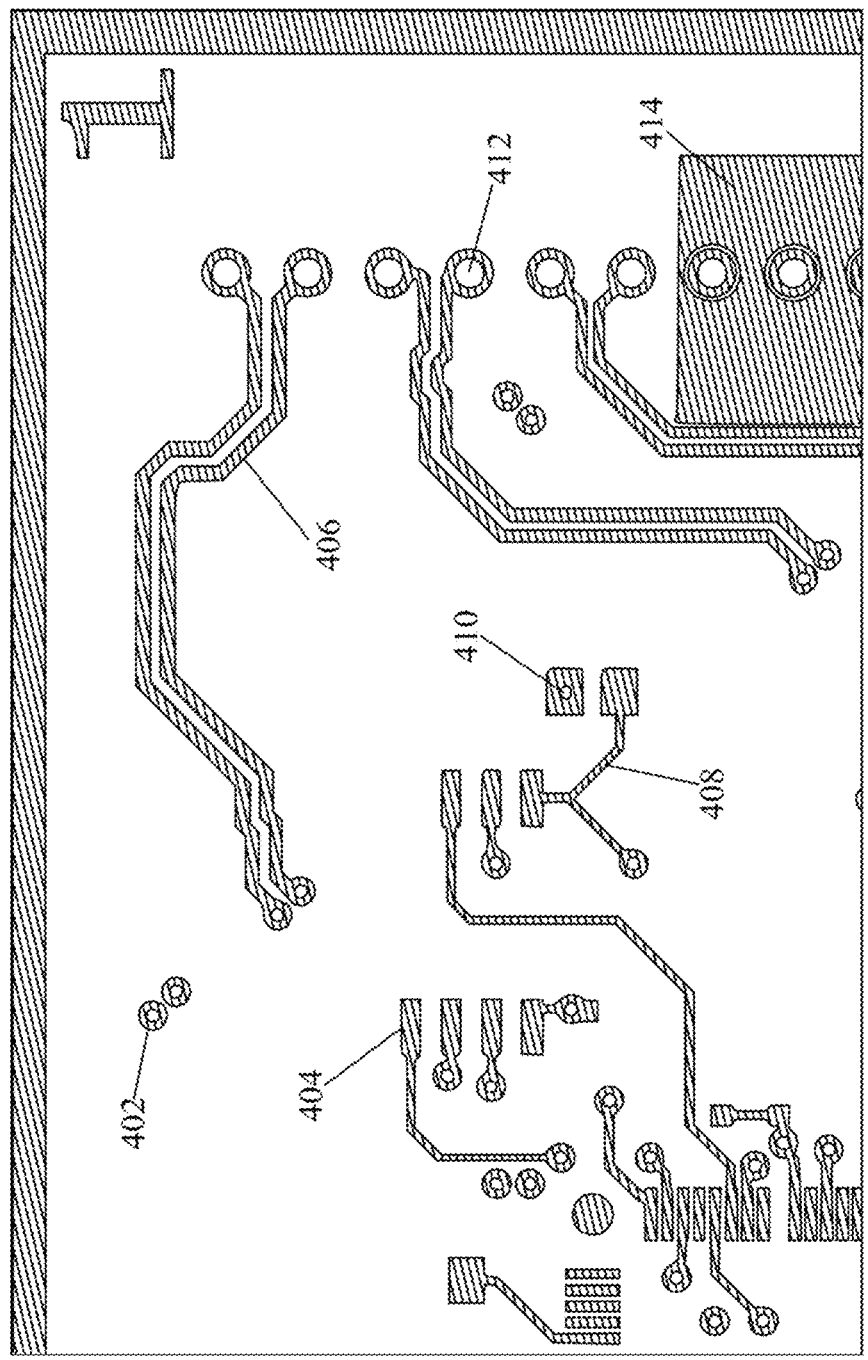
FIG. 4 shows a detail region within the area—4—of FIG. 3A and highlights common geometric elements used in circuit layer image design.
Figure 6A:
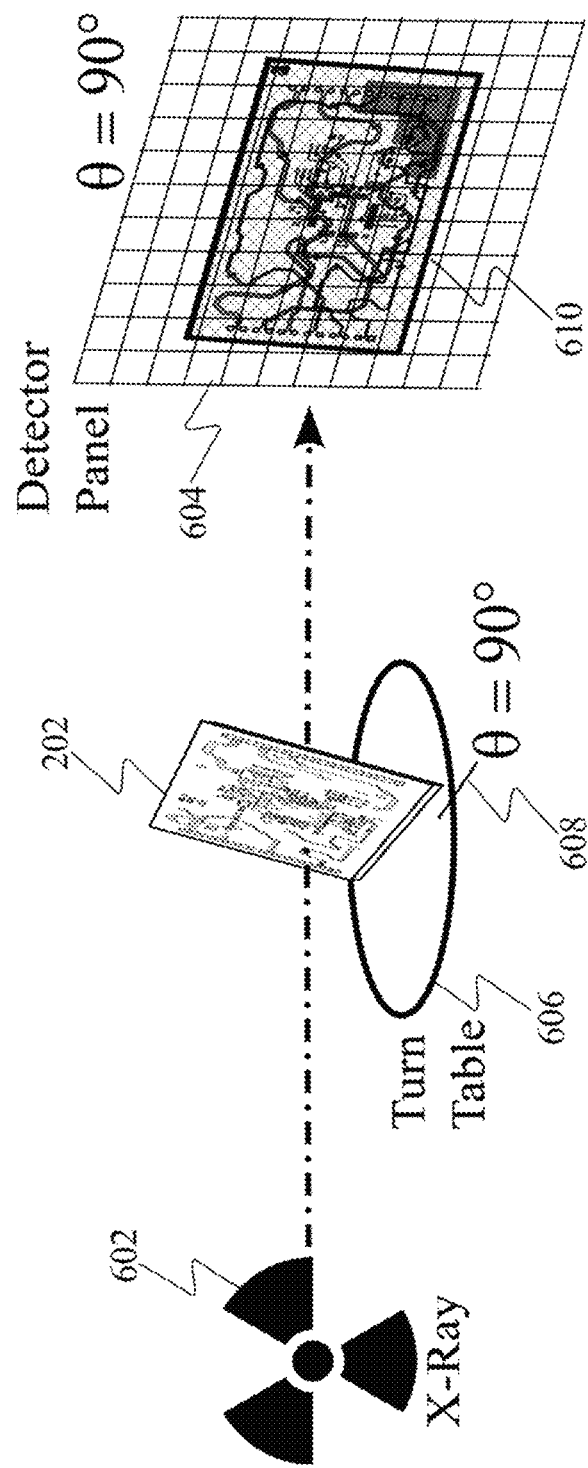
FIG. 6A illustrates graphically the configuration used for NDI computed tomography imaging wherein the imaging mode is x-rays, and wherein x-ray transmission images are captured when the front surface of the PCB from FIG. 2A is positioned at an angle of 90° with respect to the propagation path of the x-rays to the detector panel.
Figure 6B:
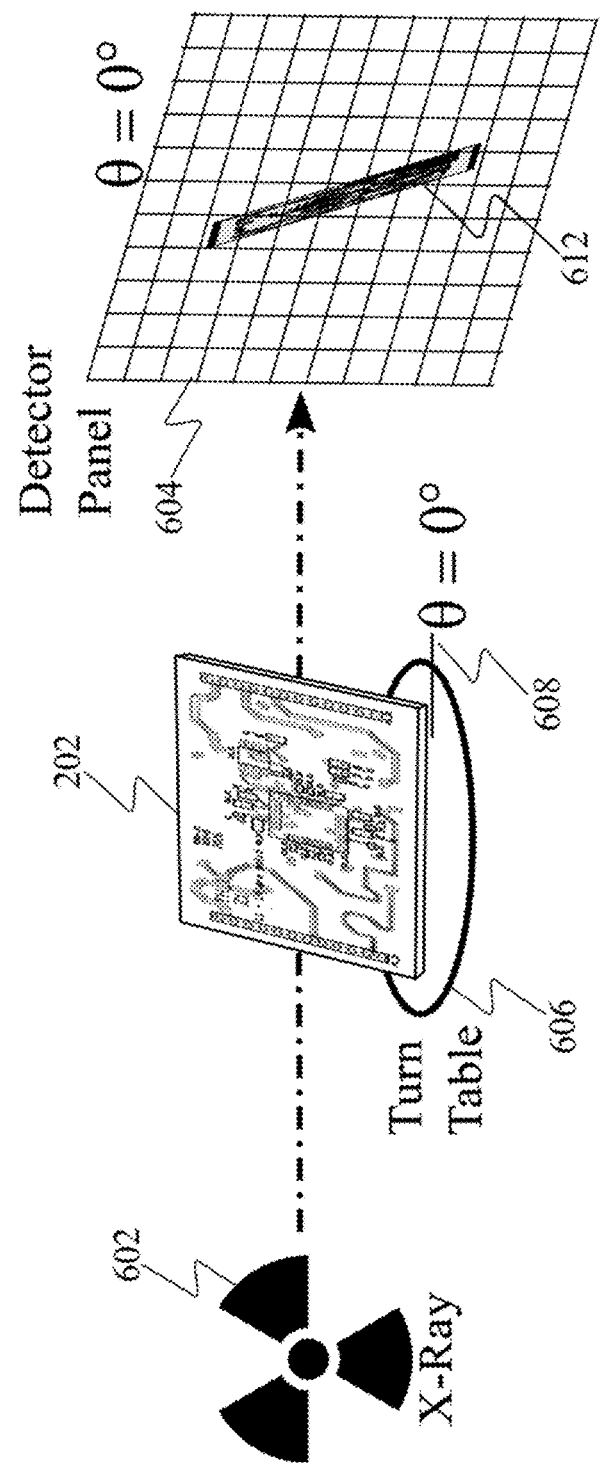
FIG. 6B illustrates graphically the configuration used for NDI computed tomography imaging wherein the imaging mode is x-rays, and wherein x-ray transmission images are captured when the front surface of the PCB from FIG. 2A is positioned at an angle of 0° with respect to the propagation path of the x-rays to the detector panel.
Figure 7:
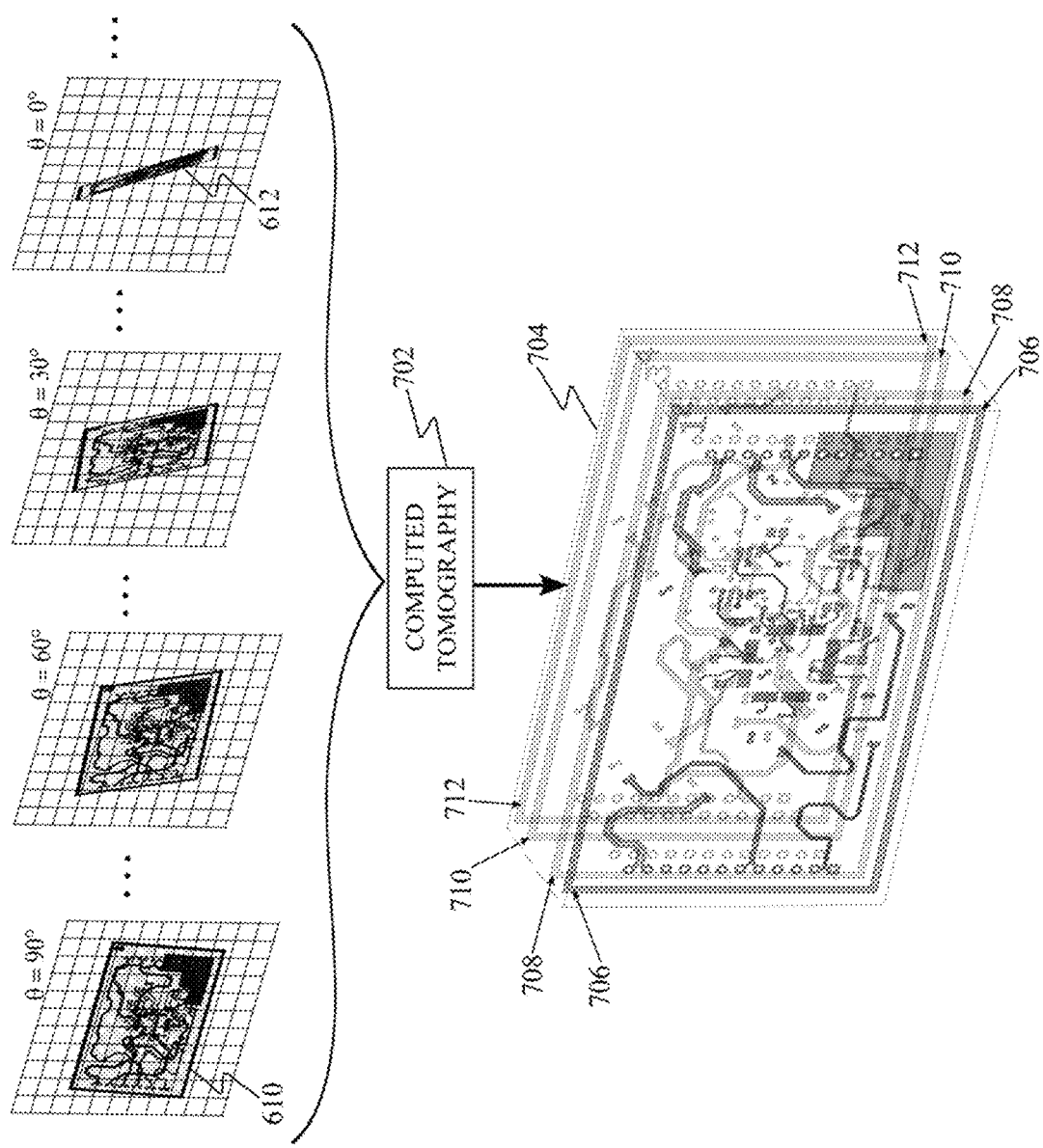
FIG. 7 illustrates graphically the computed tomography process, which converts a series of 2-D x-ray transmission images into a 3D image of a PCB.

An NDI 3D imaging process is depicted graphically in FIGS. 6A-6B and FIG. 7. In the illustrated configuration using x-ray CT in FIG. 6A, an x-ray source 602 is used in conjunction with an x-ray detector panel 604. A turntable 606 is placed between the x-ray source and detector panel. The electronic object, which in this embodiment is the PCB 202 from FIG. 2, is mounted to the turntable. The turntable is rotated to a certain angle 608 (θ) and the resulting x-ray transmission image 610 is captured. In this instance, the turntable is set to 90° and the x-ray transmission image 610 corresponds to this angular setting. FIG. 6B shows the same configuration as FIG. 6A except that the turntable angle 608 is set to 0° and the resulting x-ray transmission image 612 corresponds to this angular setting. As depicted in FIG. 7, in the computed tomography (CT) process, x-ray transmission images as described above are captured at a plurality of angles. These images are used as input to a computed tomography algorithm which yields a 3D NDI intensity dataset (or image) 704. The NDI dataset is comprised of voxels arranged in three dimensional space each with an intensity value assigned from the CT process. Voxels are the 3D equivalent of the pixel for a 2D image. The 3D NDI dataset (image) 704 embodied in the FIG. 7 corresponds to CT scanning of the PCB 202 depicted in FIGS. 2A-2B and FIGS. 3A-3D. The set 706 of voxels in the 3D image of FIG. 7 corresponds to the conductor image 206 forming "layer 1" in FIG. 3A described previously. Similarly, a set 708 of voxels in FIG. 7 corresponds to the conductor image 210 in FIG. 3B, a set 710 of voxels in FIG. 7 corresponds to the conductor image 214 in FIG. 3C, and finally a set 712 of voxels in FIG. 7 corresponds to the conductor image 218 in FIG. 3D. This CT NDI process is commonly used in the medical industry and for industrial NDI imaging.

Figure 8A:
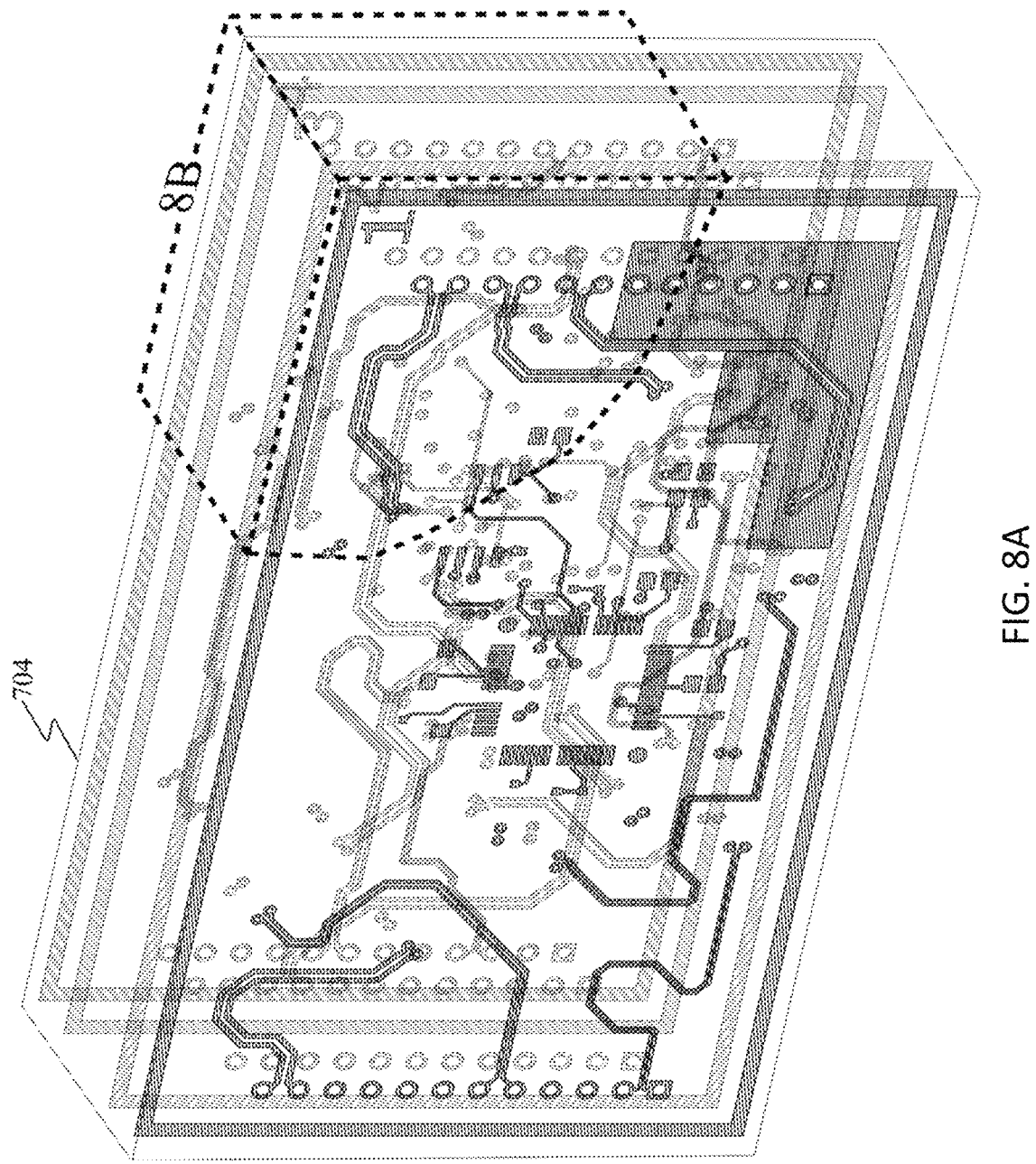
FIG. 8A illustrates a 3D image of the PCB in FIG. 2A containing four conductive or circuit layers.
Figure 8B:
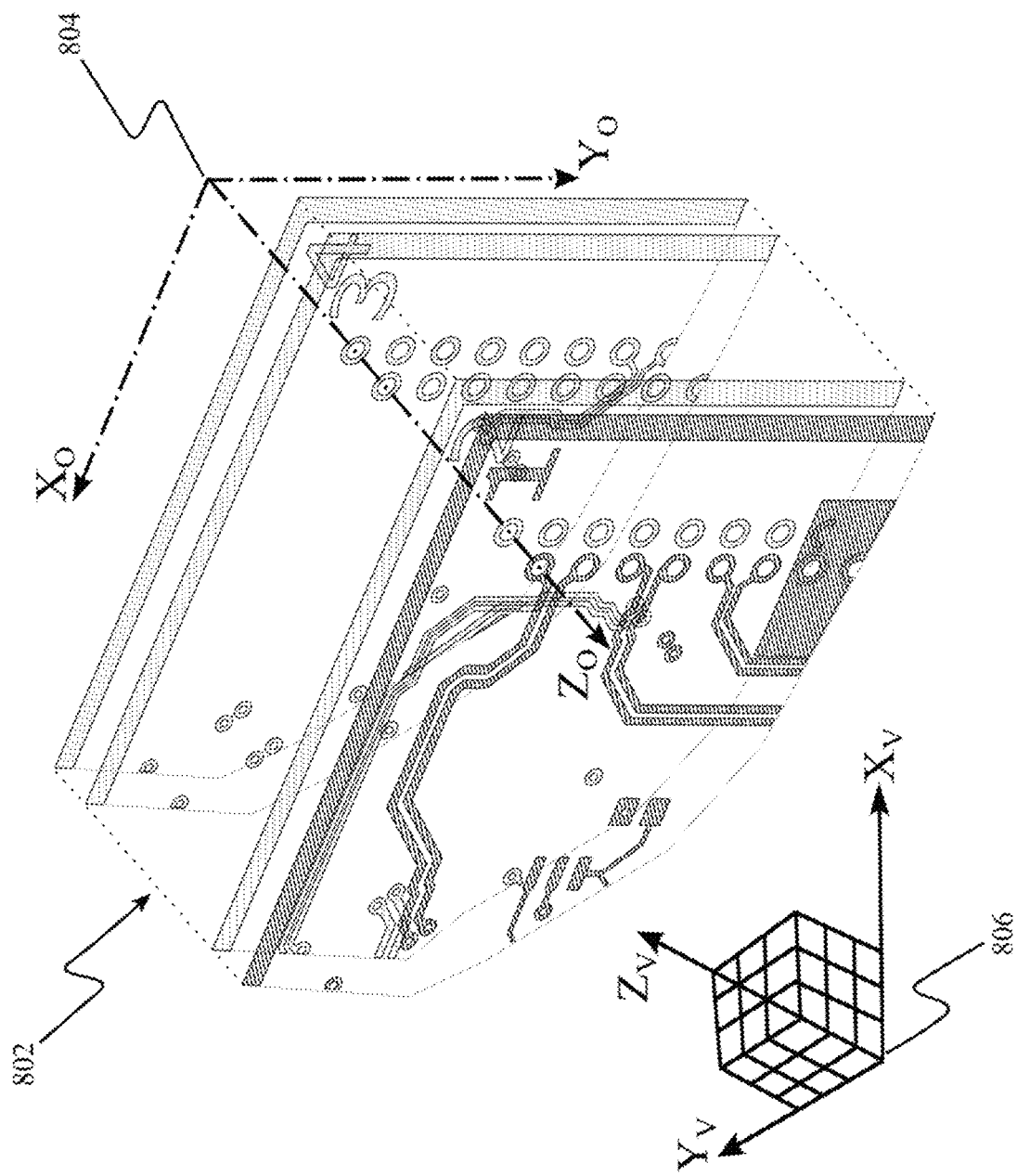
FIG. 8B illustrates an enlarged view of the region—8B—in the 3D image of FIG. 8A showing the misalignment of the voxel grid axes and the electronic object axes.

As described above, an NDI 3D image is defined as digital intensity values at points in 3D space. In many implementations of the imaging process, the points are arranged in a regular 3D grid with each point representing a small volume known as a voxel. The 3D grid is also referred to as a voxel grid. As used in the following description, an orthogonal set of coordinate axes are defined known as the object axes—denoted here as $(X_o, Y_o, Z_o)$. The object axes align with the electronic object (e.g., the PCB). Another set of coordinate axes known as the voxel grid axes—denoted here as $(X_v, Y_v, Z_v)$—are a byproduct of the NDI process and are aligned with the 3D voxel grid. Depending on how the electronic object is oriented in the NDI imaging configuration, these two sets of axes may or may not be aligned. FIG. 8A depicts the 3D NDI image 704 for a four-layer circuit board with an enlarged region—8B—shown in more detail in FIG. 8B. The detailed region 802 in FIG. 8B shows that the set 804 of object axes are aligned with the geometry of the PCB but are not aligned with the set 806 of voxel grid axes resulting from the NDI scanning configuration. As shown in the figure this misalignment can often be severe.

Reverse engineering a PCB requires that a suitable 2D image of each circuit layer within the PCB be obtained from the NDI 3D image. A 2D image is extracted from the 3D image by intersecting a 2D surface (also known as an "NDI slice," which may be flat (e.g., planar) with the NDI 3D image data. Interpolation of the 3D values onto the 2D slice geometry produces a 2D image.

Challenges with obtaining a suitable 2D image as referenced above include resolution, contrast, NDI slice and circuit layer registration, and circuit layer flexure.

If the PCB contains features significantly smaller than the NDI voxel size (i.e., resolution) the features are not visible and cannot be reverse-engineered. Resolution is controlled by the NDI machinery and by the process used to generate the 3D image; and resolution is not discussed herein.

Figure 9A:
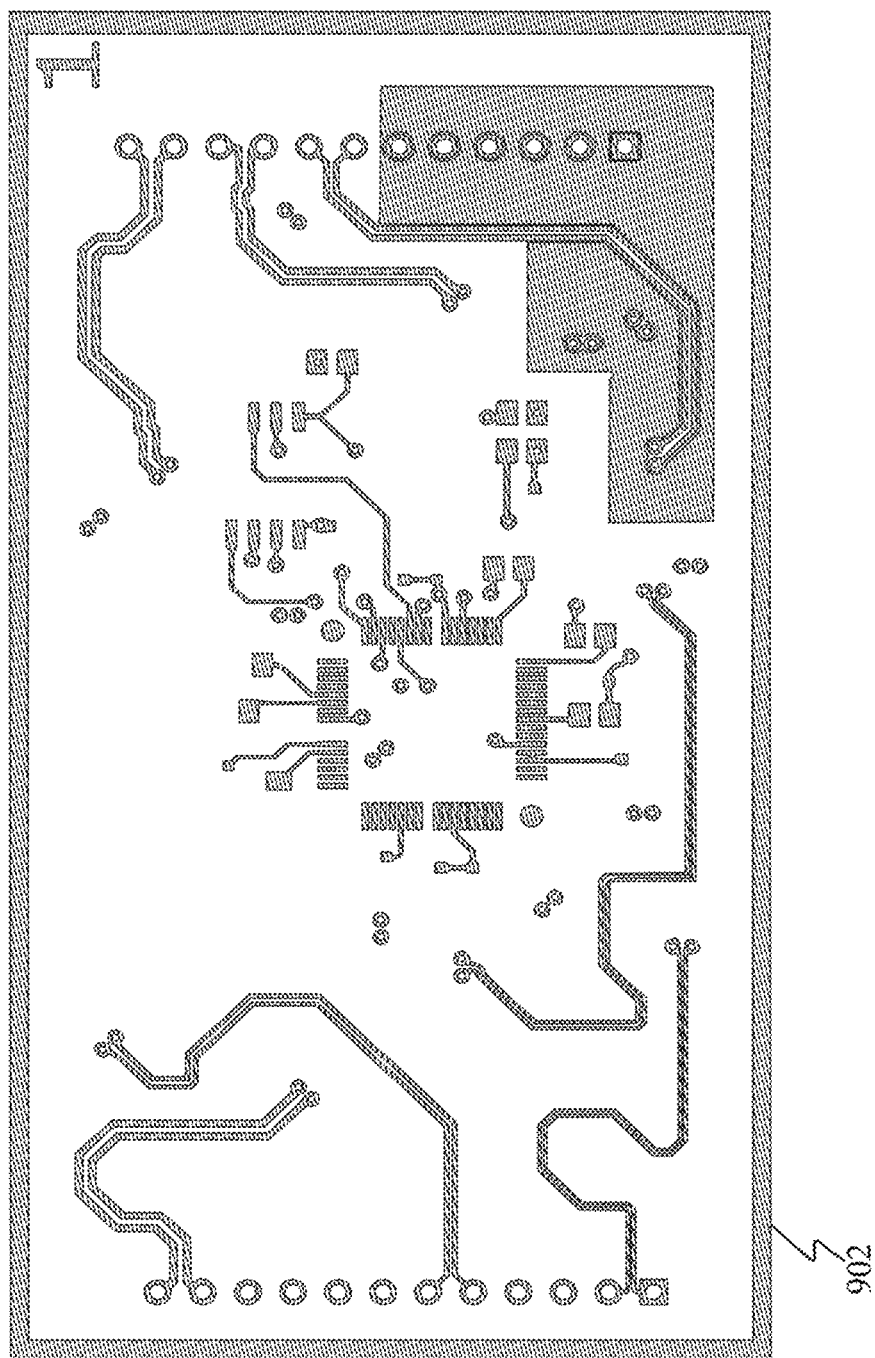
FIG. 9A illustrates a reconstructed NDI slice of a PCB circuit layer under ideal conditions in which the circuit layer lies perfectly in the NDI slice plane and exhibits suitable contrast.
Figure 9B:
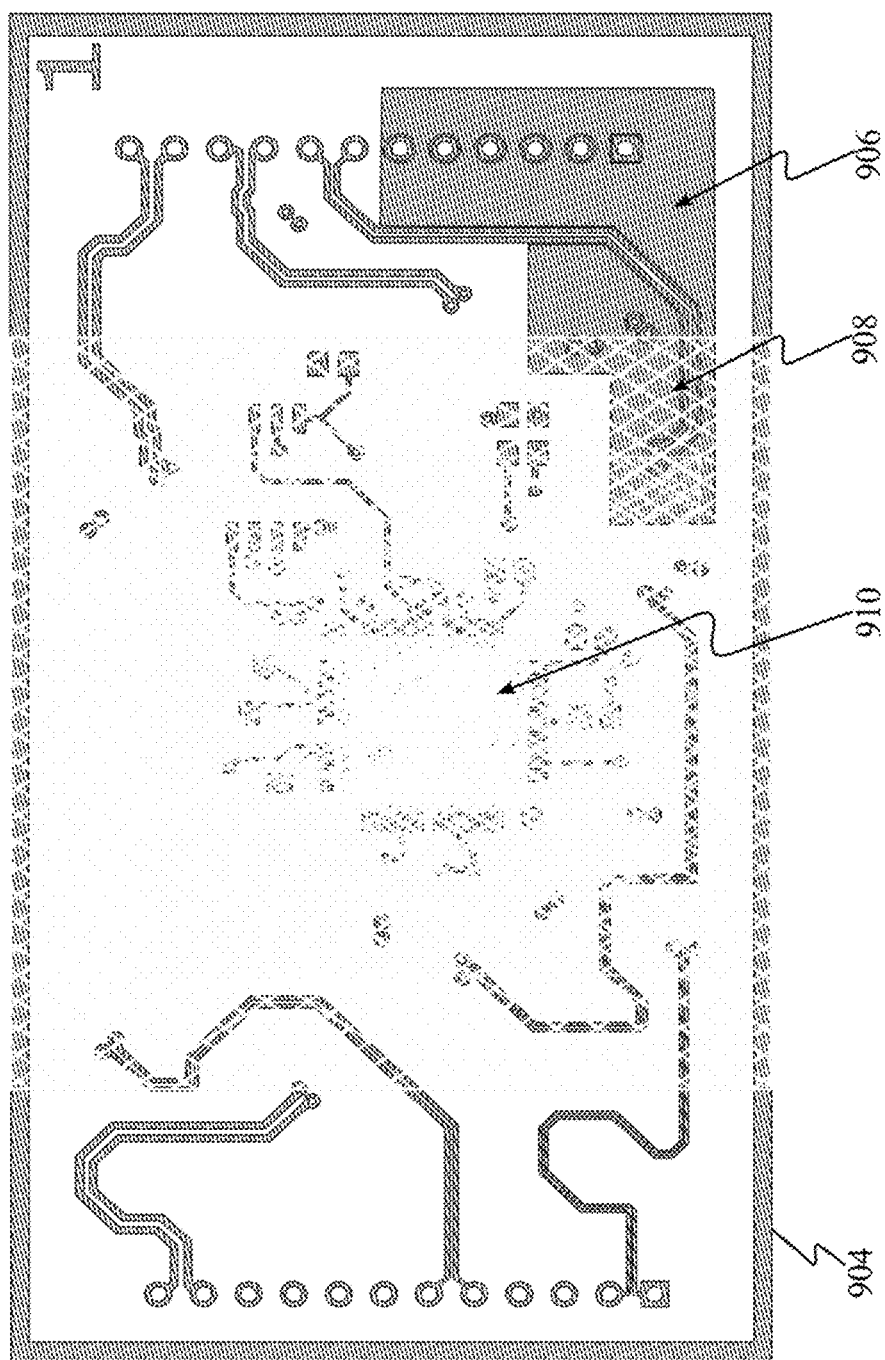
FIG. 9B illustrates a reconstructed NDI slice having areas of poor contrast caused by improper segregation of conductor material from dielectric material.

The NDI process may or may not produce a 3D image that suitably segregates or contrasts conductor from dielectric material in regions of the PCB. As illustrated in FIG. 9A, an NDI slice image 902 of a circuit layer taken from the 3D image can exhibit suitable contrast for reverse engineering in all regions. Or, as illustrated in FIG. 9B, the extracted circuit layer image 904 may exhibit areas 906 of high contrast, areas 908 of lower or poor contrast, and areas 910 of almost no contrast. In these later cases, reverse engineering may not be possible because of poor contrast. For the specific case of x-ray CT NDI, and more particularly PCBs containing a large amount of "shielding" (i.e., circuit layers that contain a high proportion of conductive material), a technique is discussed later (step 3) that aids in improving contrast.

Figure 10A:
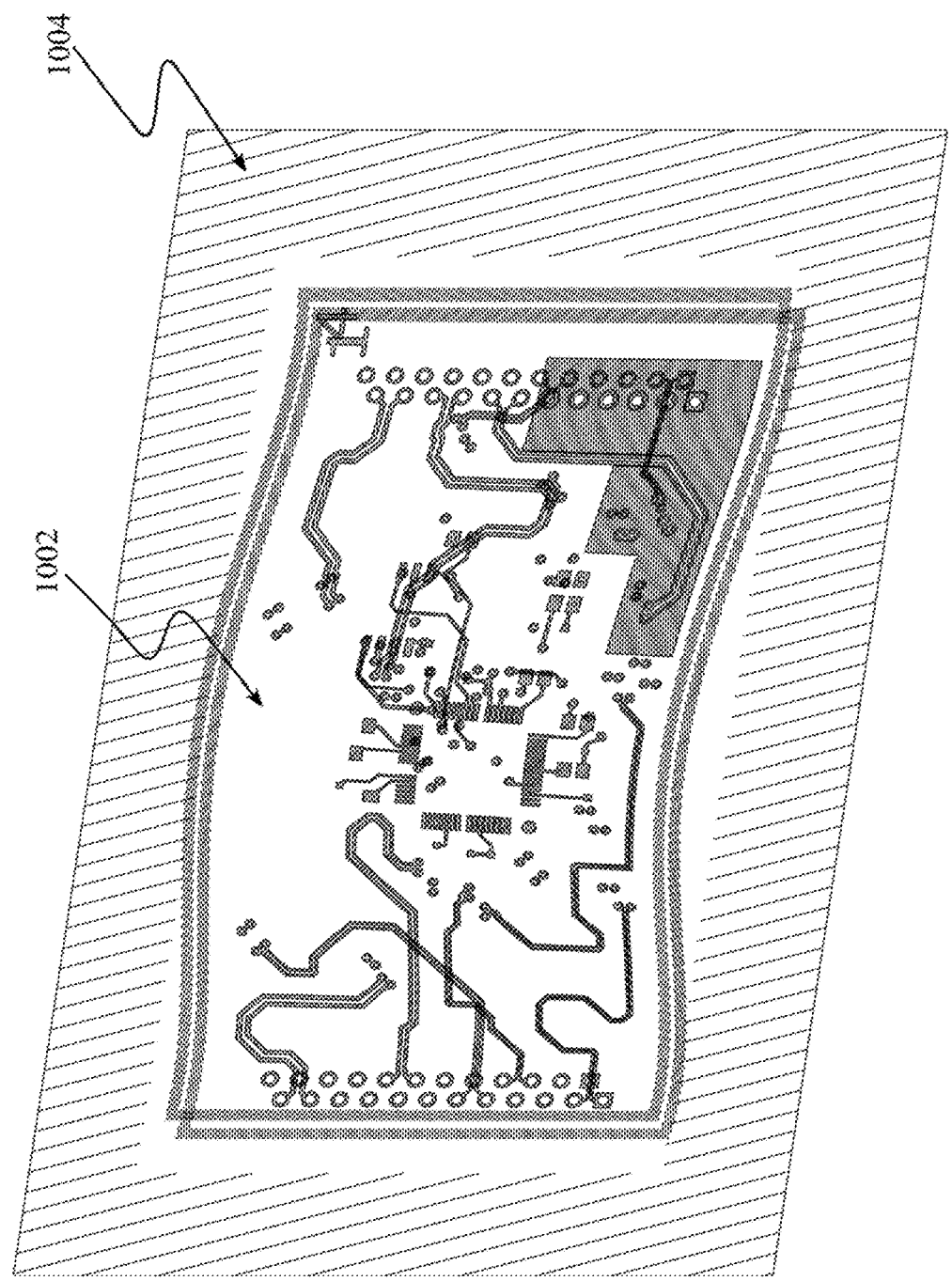
FIG. 10A illustrates a flexed PCB subjected to a planar NDI slice in three dimensions.
Figure 10B:
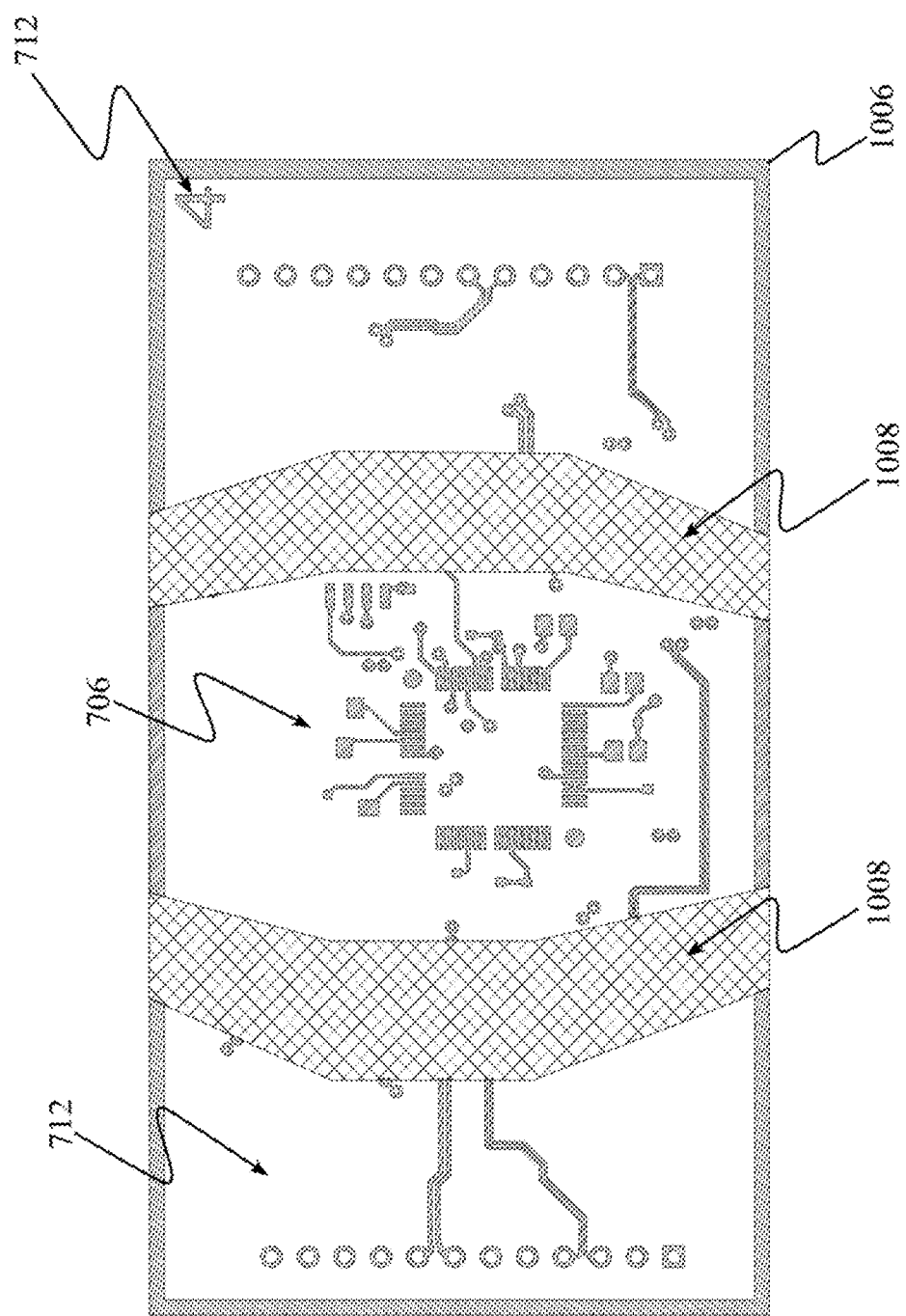
FIG. 10B illustrates the effects of a flexed PCB and planar NDI slice as illustrated in FIG. 10A whereby the resulting 2D image captures portions of multiple circuit layers within the PCB due to the flexure.

Circuit layers within PCBs typically range in thickness from 5 ten-thousandths to 4 thousandths of an inch. PCBs and their internal circuit layers often have a small degree of flexure present because of the manufacturing process or because of lifetime usage. Subjecting the 3D image to a planar/flat NDI slice is common in CT imaging applications;

however, such a flat NDI slice tends to depict multiple circuit layers at once due to the PCB and circuit layer flexure. FIG. 10A illustrates an example of this whereby the PCB 202, previously shown in FIGS. 2A and 2B, is flexed near the center of the board. As a result, an NDI 3D image 1002 shown in FIG. 10A reflects this condition. Note that in the absence of this flexure the NDI image would appear similar to the NDI dataset 704 depicted in FIG. 7 and that for clarity of illustration only voxels associated with "layer 1" (corresponding to conductor image 206 in FIG. 3A) and "layer 4" (corresponding to conductor image 218 in FIG. 3D)) are depicted in FIG. 10A. A planar NDI slice 1004, which is generally well aligned with the axes of the electronic object is used to extract a 2D NDI slice image. As illustrated in FIG. 10B the resulting NDI slice image 1006 includes a portion of the set 706 of voxels representing conductor "layer 1" near the center of the image and a portion of the set 712 of voxels representing conductor "layer 4" near the left and right edges of the image. In between these regions are regions 1008 representing the portion of the PCB between conductor "layer 1" and conductor "layer 4" which is primarily comprised of dielectric material. The presence of voxels representing conductors from the two different conductor layers indicates that the board is flexed in the manner depicted in FIG. 10A to cause portions of the various circuit layers to be included in a single NDI slice.

Step 2: Align NDI Slice Axes to Object Axes

Figure 11A:
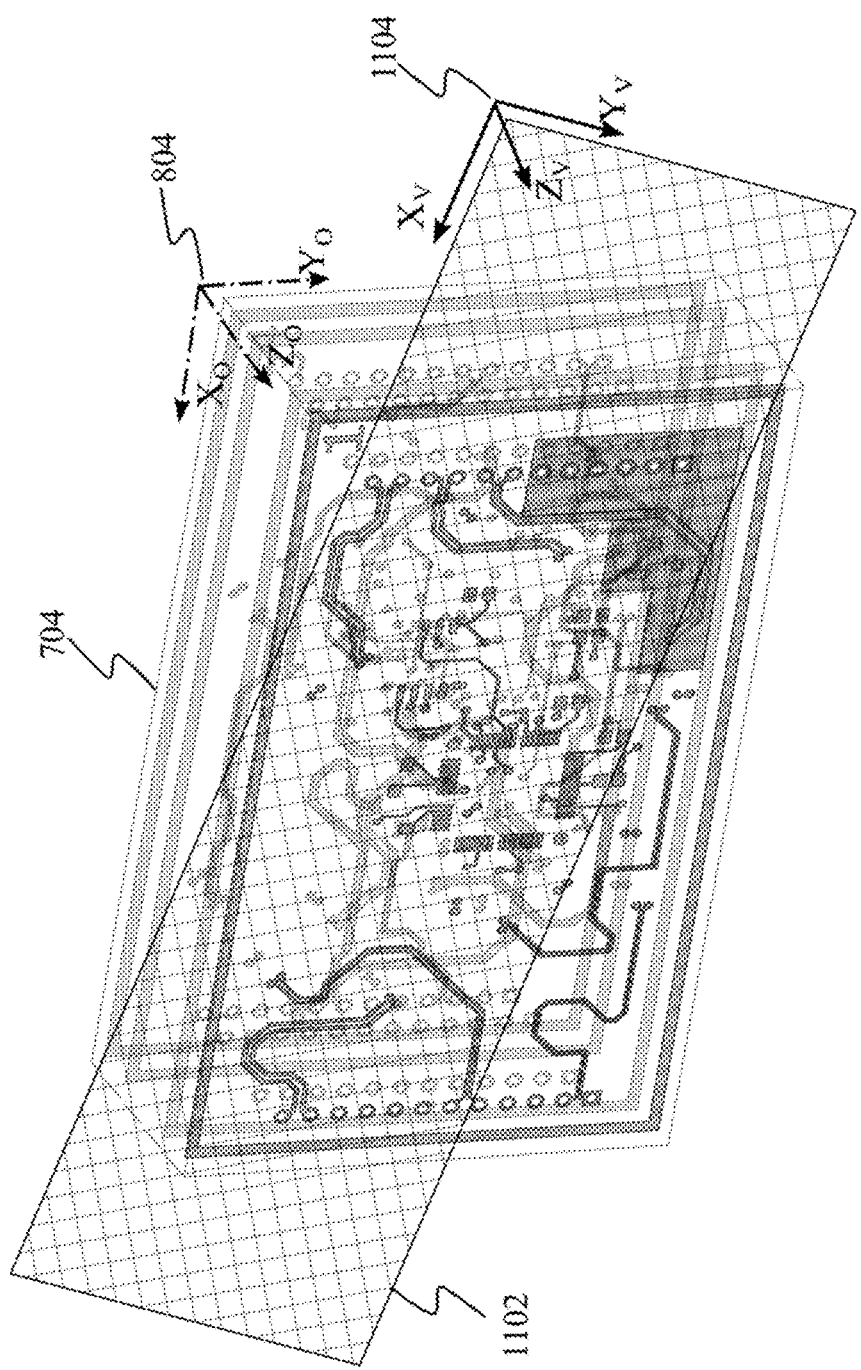
FIG. 11A illustrates pictorially an NDI slice passing through a PCB at an angle because of misalignment of the voxel grid axes and electronic object axes.
Figure 11B:
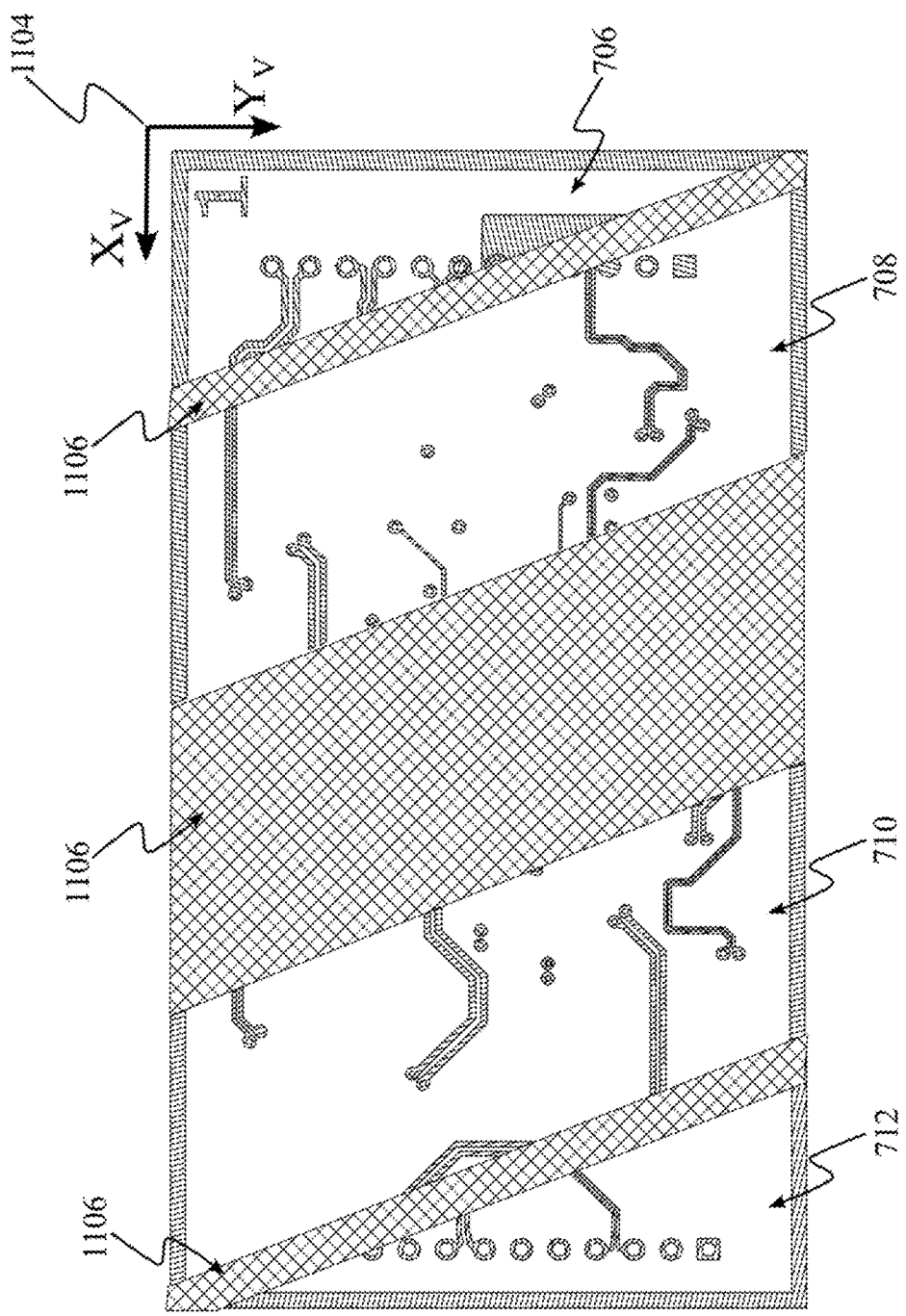
FIG. 11B illustrates the effect of the misalignment of FIG. 11A on the resulting NDI slice image.

NDI 3D image data are often oriented such that the voxel grid axes (typically the default NDI slice axes) are not aligned with the geometry of the electronic object. The misalignment is a byproduct of how an electronic object (e.g., PCB 202) is oriented within the NDI equipment. The misalignment produces 2D slice images that probe through several circuit layers of the PCB at once. This is illustrated in FIG. 11A and FIG. 11B. In FIG. 11A an NDI 3D image 704 of the four-layer PCB 202 with the set 804 of electronic object axes shown is subjected to a planar NDI slice 1102 oriented along the set 1104 voxel grid axes which is not aligned with the electronic object axes. Note that the NDI slice 1102 is a plane whose normal vector is aligned with the voxel axes Z vector, and which passes through a given point along the voxel Z axis. FIG. 11B illustrates the resulting NDI slice image which in a single 2D image contains portions of the sets (706, 708, 710, and 712) of voxels corresponding to the four separate circuit layers (respectively "layer 1", "layer 2", "layer 3", and "layer 4") within this electronic object as well as the dielectric material 1106 between them. This type of image is not suitable for reverse engineering as an image of each individual circuit layer alone is needed for further processing.

Figure 12A:
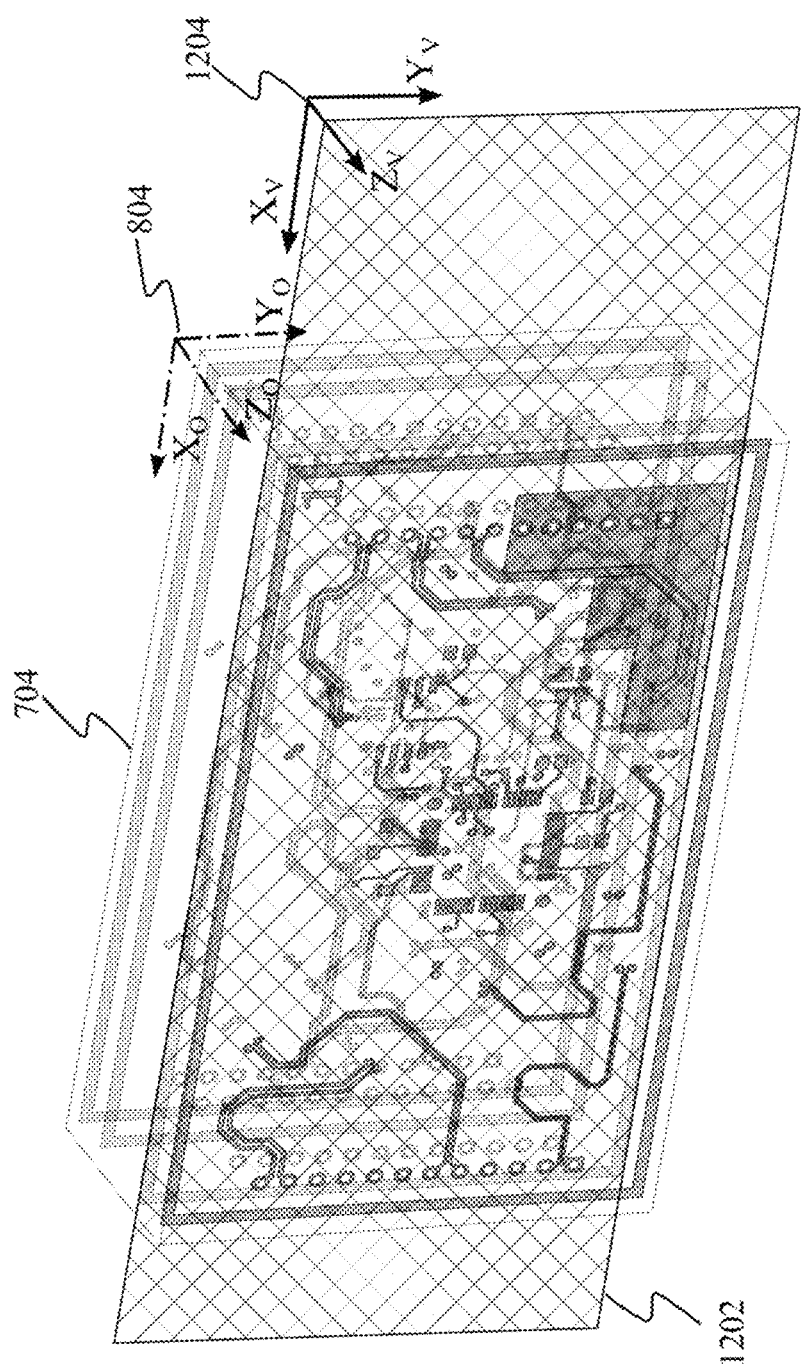
FIG. 12A illustrates pictorially an alignment step performed before further processing wherein the voxel grid axes are aligned with the electronic object axes.
Figure 12B:
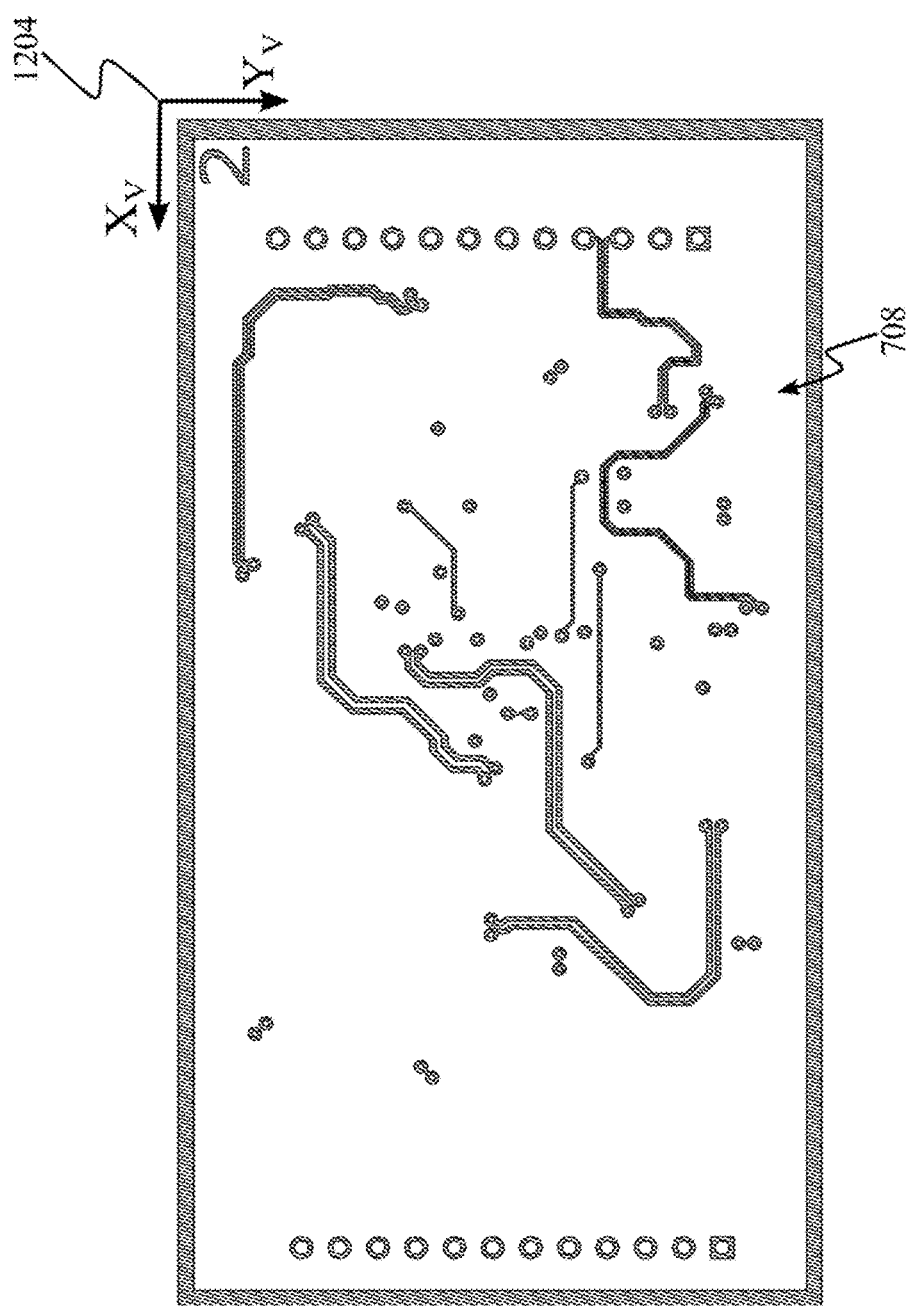
FIG. 12B illustrates a well-aligned NDI slice that results from the alignment step of FIG. 12A.

In contrast, FIG. 12A illustrates an alignment step performed before any further processing. As illustrated in FIG. 12A, the alignment step roughly aligns a new set 1204 of voxel grid axes with the set 804 of electronic object 3D image axes. Alignment of the two coordinate axes means only that coordinate vectors are aligned in similar directions—the origin of the axes need not be coincident. As a result, the new NDI slice 1202 is also aligned with the geometry of the electronic object 3D image. As illustrated in FIG. 12B, the result of this alignment step for a perfectly planar (i.e., un-warped) PCB is that a planar NDI slice no longer captures multiple circuit layers. In this embodiment, the NDI slice is located along the Z axes of the set 1204 of voxel grid axes such that the resulting image captures a complete picture of the set 708 of voxels representing the internal circuit layer called "layer 2" described previously. The alignment step can be done automatically if the orientation of the electronic object within in the CT scanning equipment is known ahead of time; otherwise, the alignment step can be done manually within typical CT viewing software. The alignment step may not resolve contrast issues or poor NDI slice and circuit layer alignment due to PCB flexure (discussed above).

Step 3: Determine if NDI Data Meets Desired Contrast Quality

Figure 13A:
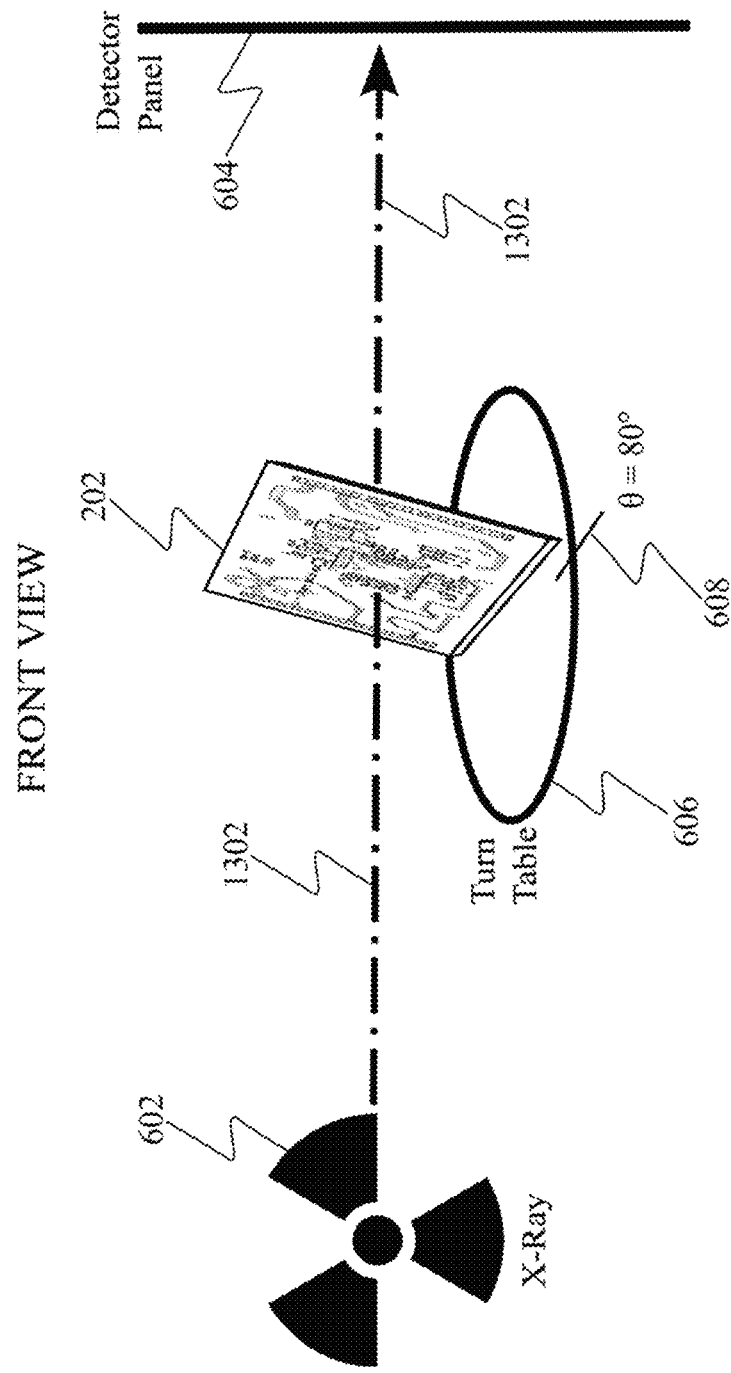
FIG. 13A illustrates pictorially the front view of the CT configuration when the PCB is oriented at an angle with respect to an x-ray source such that the face (e.g., mounting surface) of the PCB is not parallel to the propagation path of x-rays passing from the x-ray source to the detector.
Figure 13B:
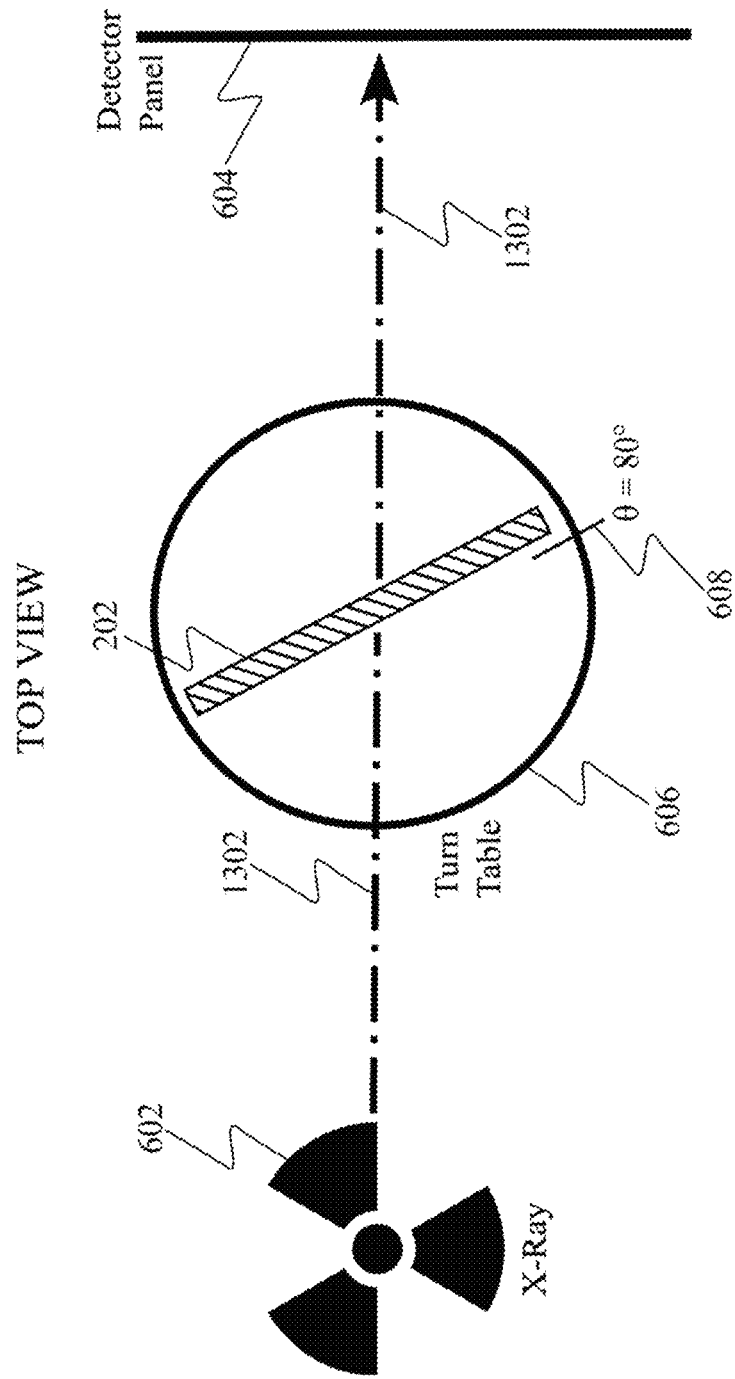
FIG. 13B illustrates pictorially the top view of the CT configuration when the PCB is oriented at an angle with respect to an x-ray source such that the face (e.g., mounting surface) of the PCB is not parallel to the propagation path of x-rays passing from the x-ray source to the detector.
Figure 13C:
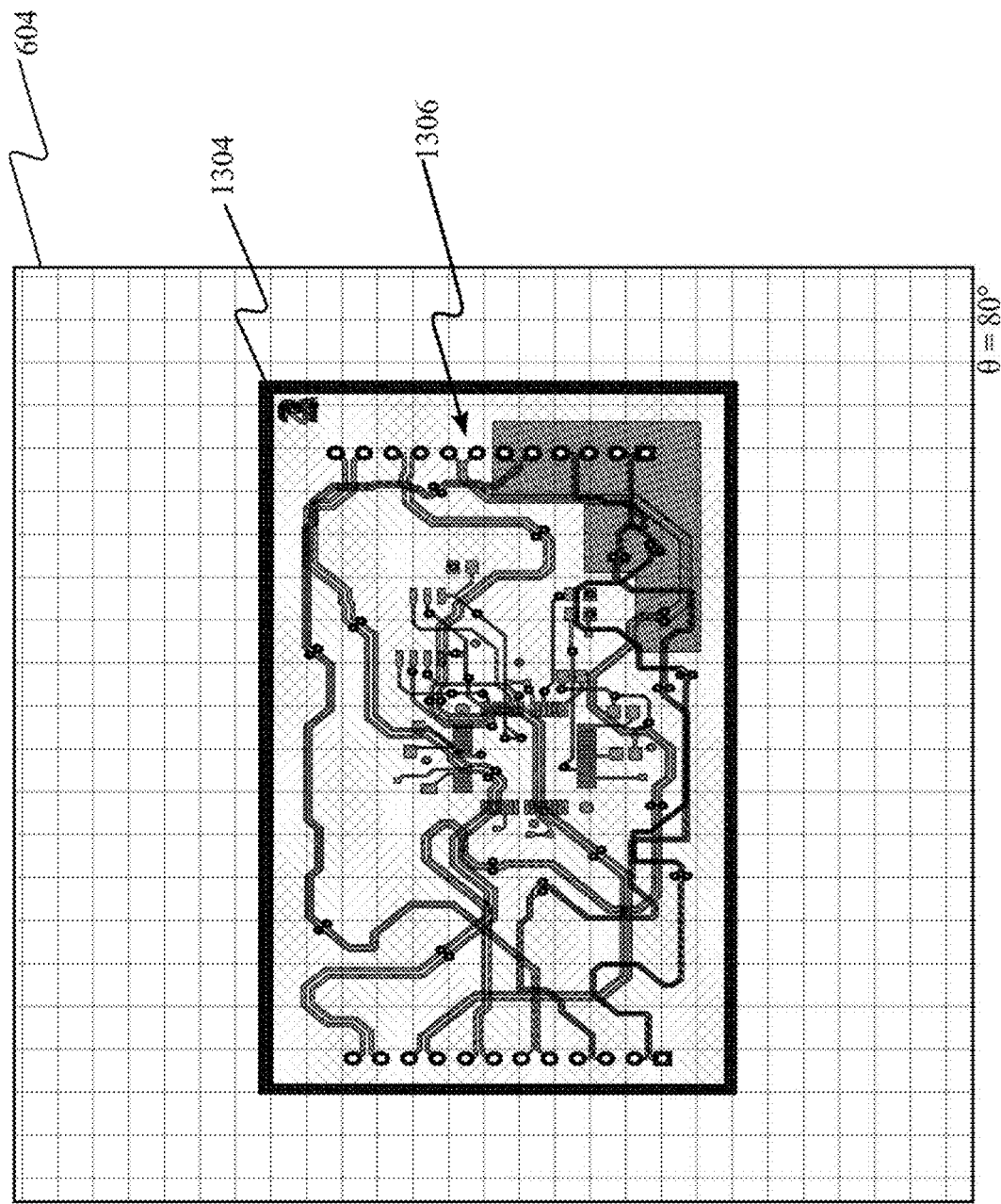
FIG. 13C illustrates pictorially the x-ray transmission image resulting from the CT configuration geometry shown in FIGS. 13B-13C.
Figure 13D:
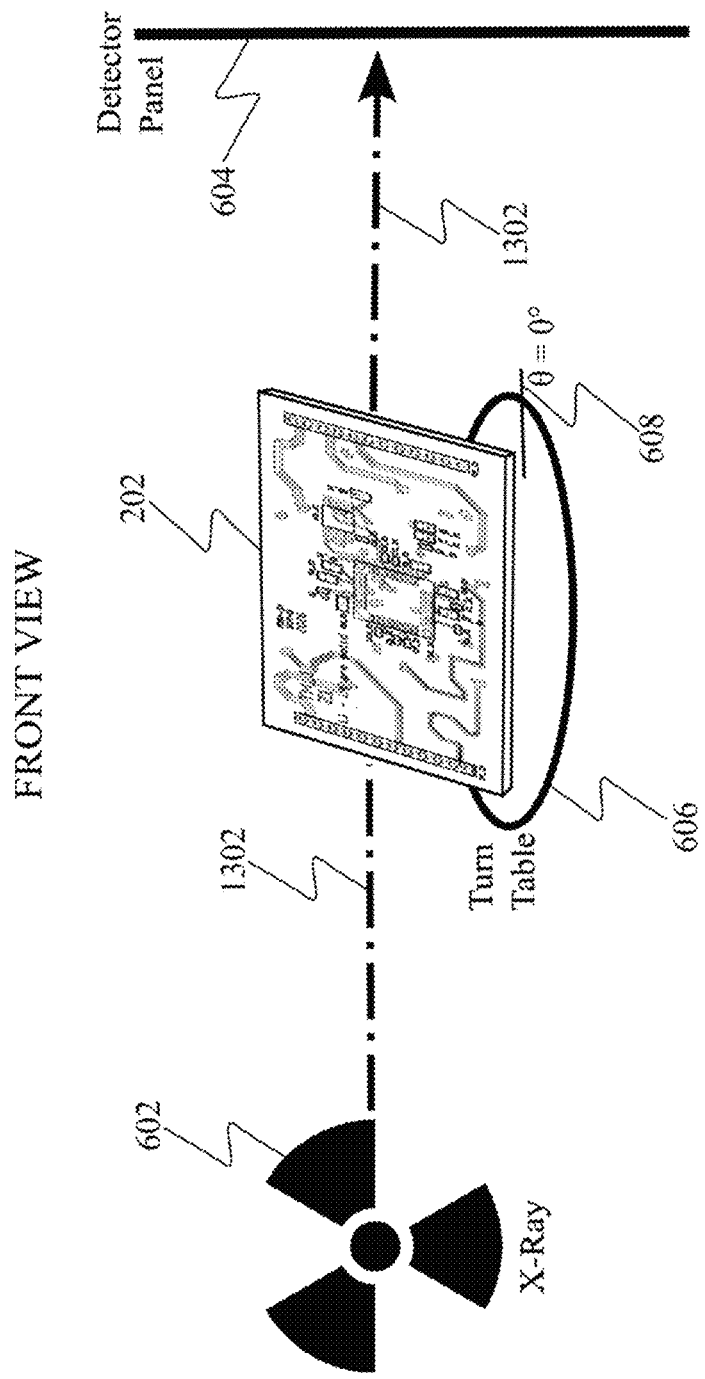
FIG. 13D illustrates pictorially the front view of the CT configuration when the PCB is oriented at an angle with respect to an x-ray source such that the face (e.g., mounting surface) of the PCB is parallel to the propagation path of x-rays passing from the x-ray source to the detector.
Figure 13E:
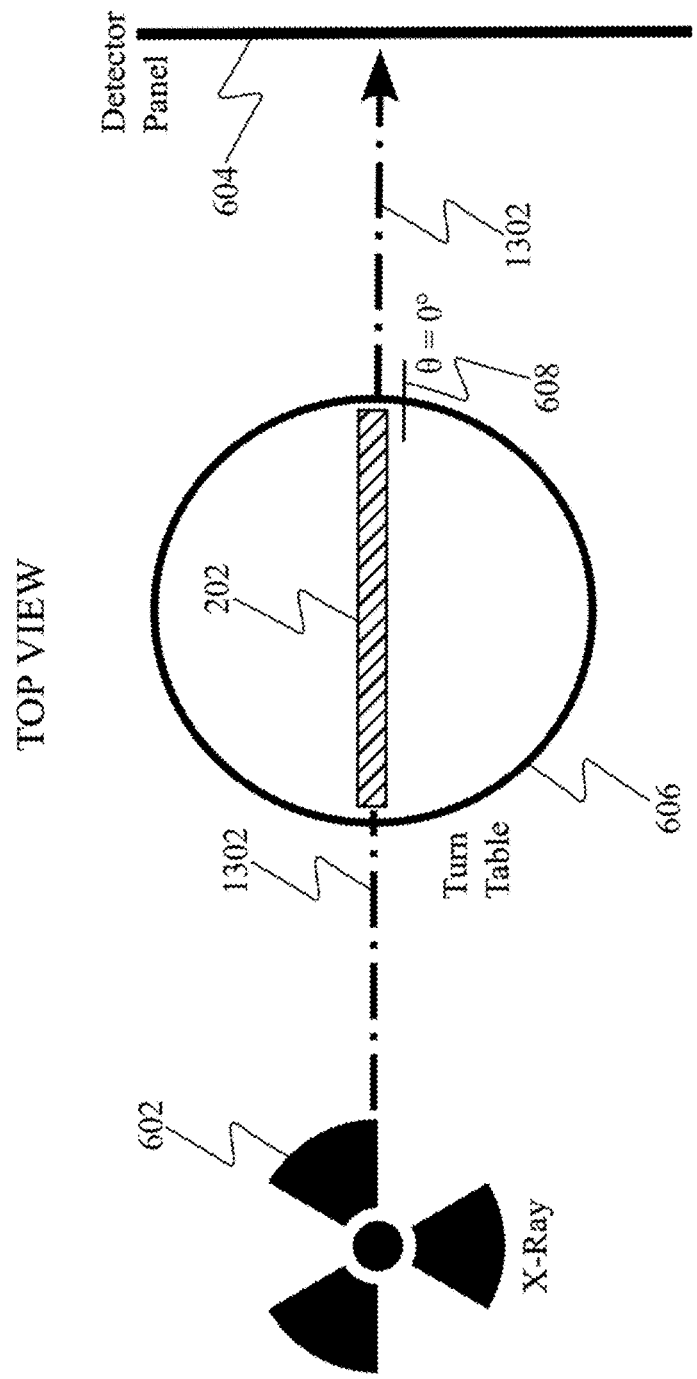
FIG. 13E illustrates pictorially the top view of the CT configuration when the PCB is oriented at an angle with respect to an x-ray source such that the face (e.g., mounting surface) of the PCB is x-parallel to the propagation path of rays passing from the x-ray source to the detector.
Figure 13F:
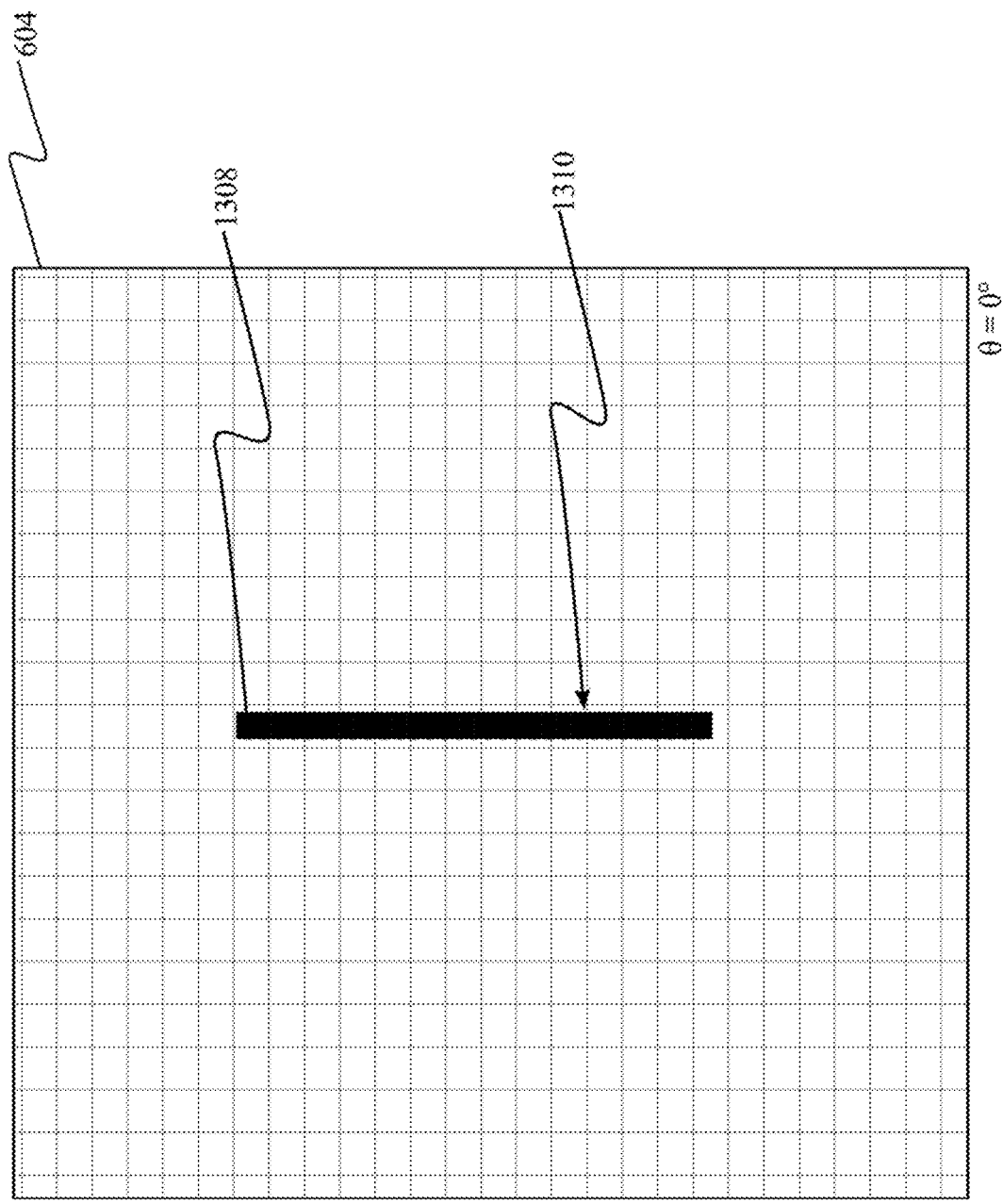
FIG. 13F illustrates pictorially the x-ray transmission image resulting from the CT configuration geometry shown in FIGS. 13D-13E highlighting the poor contrast due to the inability of the x-rays to penetrate the full width of the PCB.
Figure 13G:
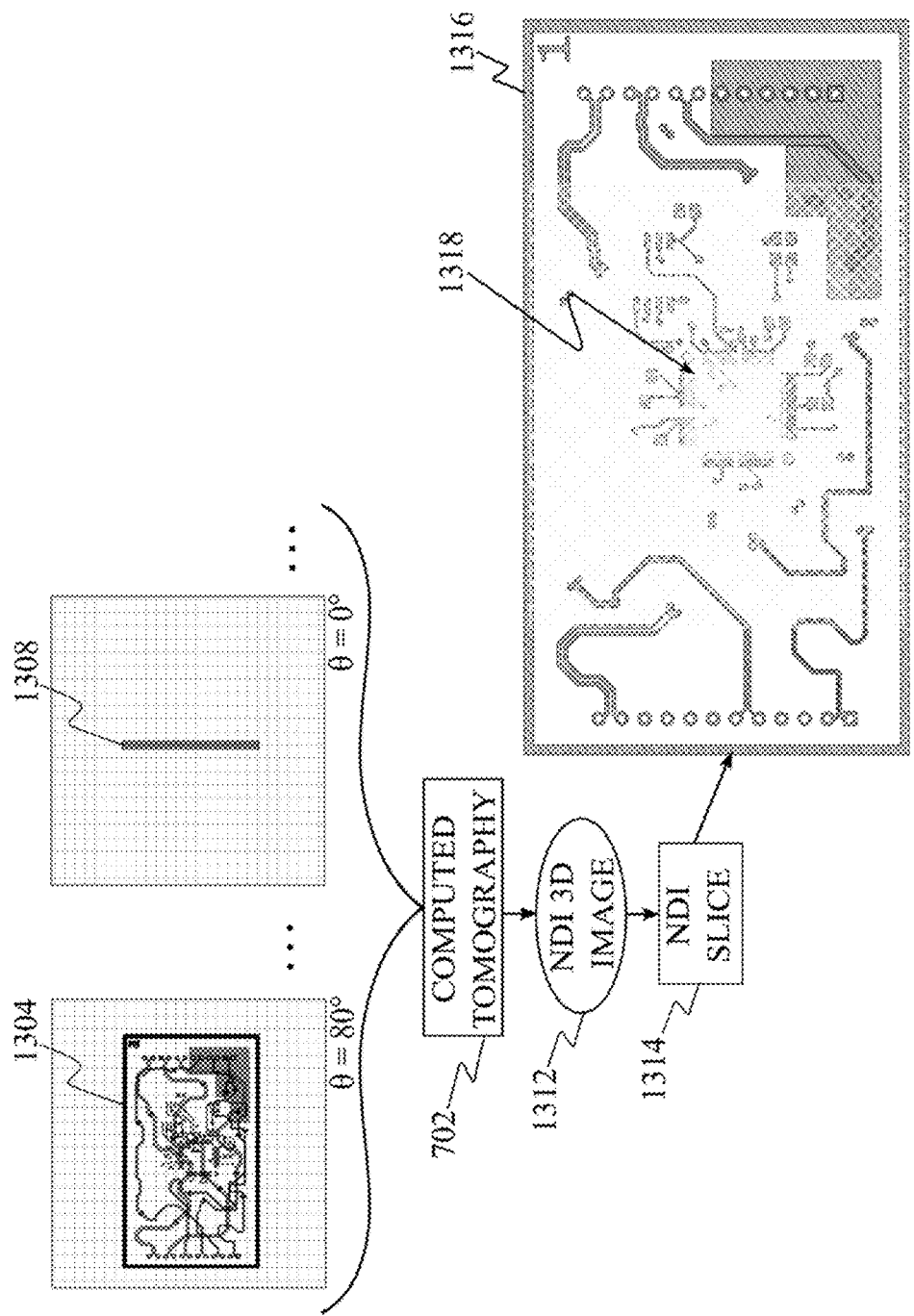
FIG. 13G illustrates a reconstructed NDI slice derived from the configuration and transmission images shown in FIGS. 13A-13F with poor material contrast highlighted in the figure.

Depending on an object's material, a conventional x-ray CT process can have difficulty imaging large flat objects because x-rays easily penetrate the material at some angles and do not penetrate well at other angles. The differences in x-ray penetration produce projection images that are inaccurate, and the inaccuracy corrupts downstream CT reconstruction. This inaccuracy occurs often when scanning electronic objects that include conductor pours or zones (e.g., shielding, ground planes, power planes). The circuit layers formed with conductor pours are largely solid sheets of conductor. FIGS. 13A-13G illustrate the problem caused by conductor pours. FIG. 13A illustrates the front view of the CT scanning configuration discussed and shown previously when the turntable angle 608 is not near 0° (i.e., when the electronic object 202 is not viewed edge-on from the x-ray source 602). FIG. 13B illustrates this same configuration from a top view. Note from these figures that in this configuration the x-rays 1302 penetrate a relatively thin amount of material. As illustrated in FIG. 13C, this leads to a projection image 1304 with sufficient contrast 1306. FIG. 13D shows the front view of this same CT scanning process but when the turntable angle 608 is near 0° (i.e., at the angle when the electronic object is viewed edge on from the x-ray source 602). FIG. 13E illustrates a top view of this same configuration. Note from these figures that in this configuration the x-ray 1302 penetrates a relatively thick amount of material. As illustrated in FIG. 13F this leads to a projection image 1308 with poor contrast 1310. Finally, FIG. 13G illustrates the results of using this type of poor contrast projection image 1308 as part of the images used for computed tomography 702 to obtain an NDI 3D image 1312 (discussed previously) and using an NDI slice 1314 on this 3D image to obtain a 2D slice image 1316. Note in the figure that there are areas 1318 of poor contrast on this CT reconstructed slice image. This type of circuit layer imagery may be unsuitable for reverse engineering.

Evaluating the quality of the 3D image contrast is subjective in each case and affects the ability of later steps to be successfully performed. If the 3D image contrast is sufficiently poor, later steps (described below) might not result in the quality of imagery needed for reverse engineering. In such cases, the contrast can be improved via the process in the sub-step described below.

Step 3a: Subject Electronic Object to Slight Flexure for Improved Contrast

Figure 14A:
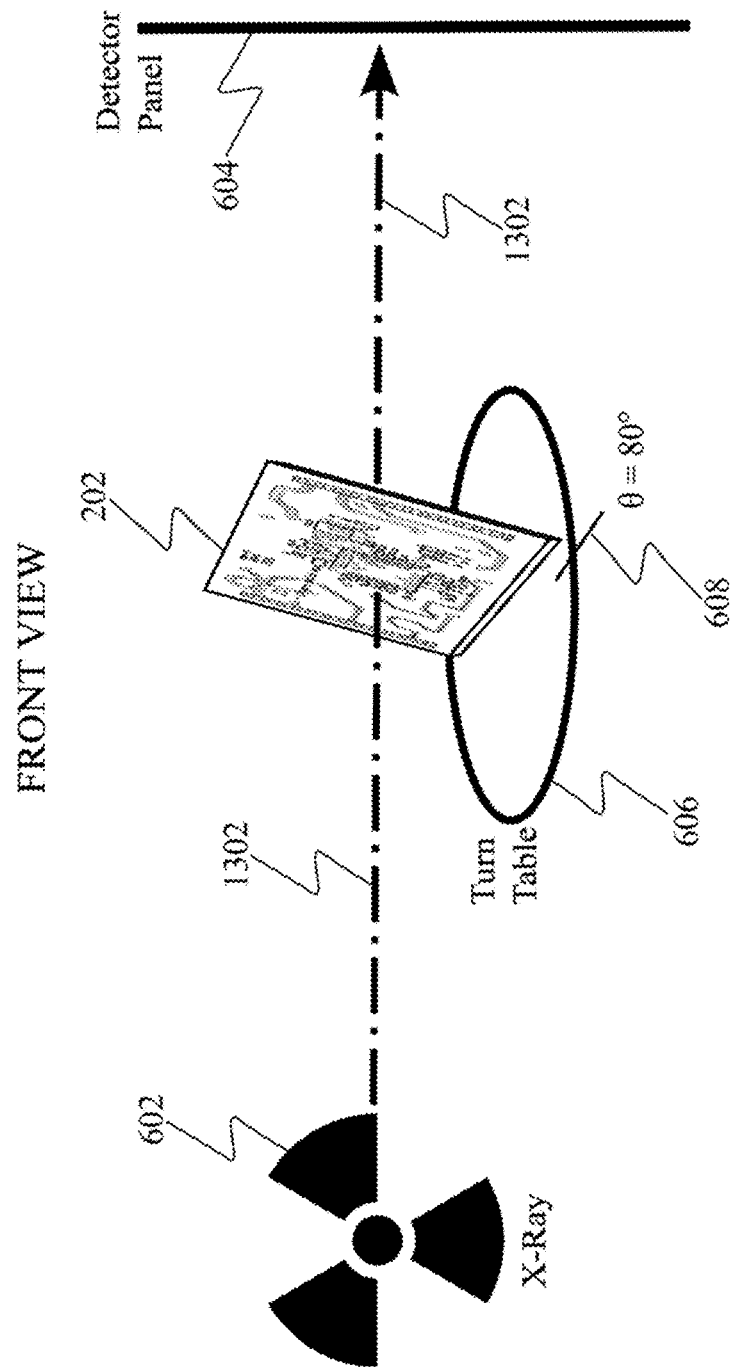
FIG. 14A illustrates pictorially the front view of the CT configuration when the flexed PCB is oriented at an angle with respect to an x-ray source such that the face (e.g., mounting surface) of the PCB generally faces the x-ray source but at a non-perpendicular angle to the propagation path of the x-rays from the x-ray source.
Figure 14B:
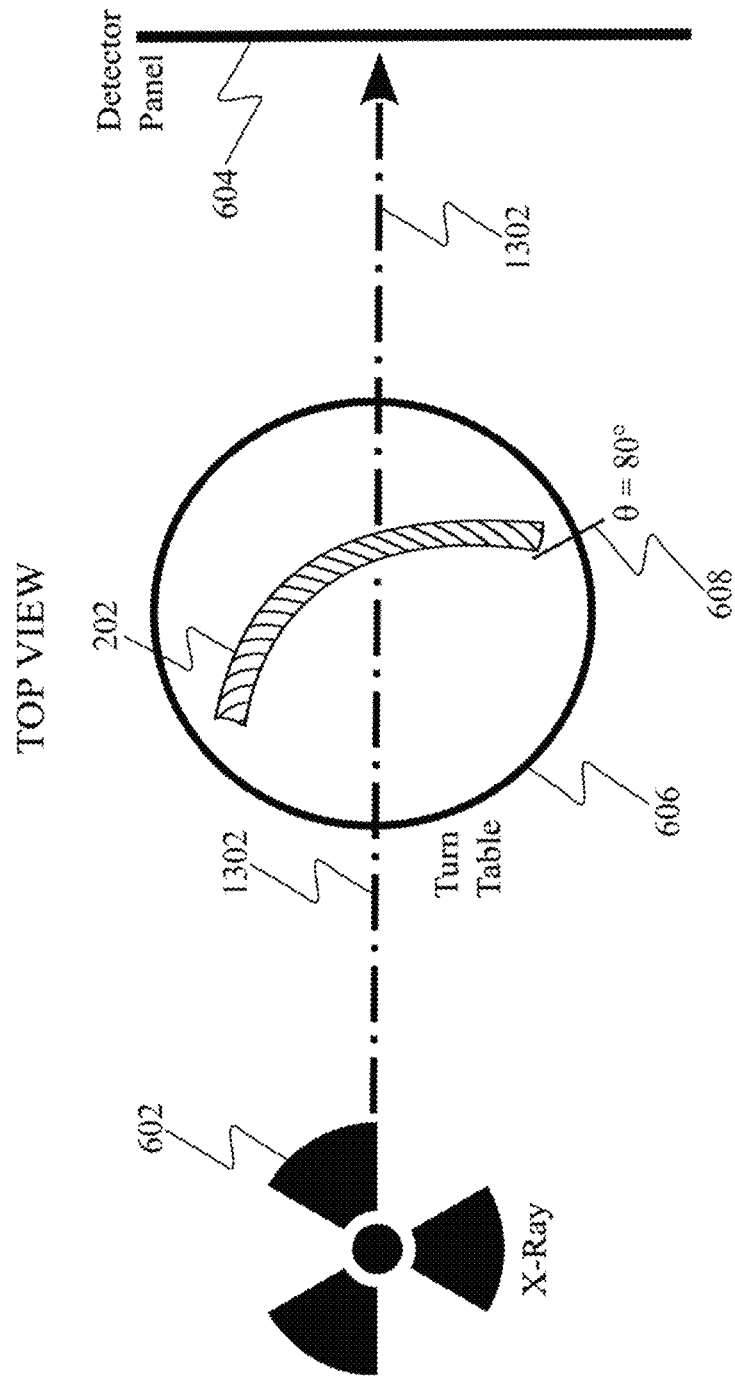
FIG. 14B illustrates pictorially the top view of the CT configuration when the flexed PCB is oriented at an angle with respect to an x-ray source such that the face (e.g., mounting surface) of the PCB generally faces the x-ray source but at a non-perpendicular angle to the propagation path of the x-rays from the x-ray source.
Figure 14C:
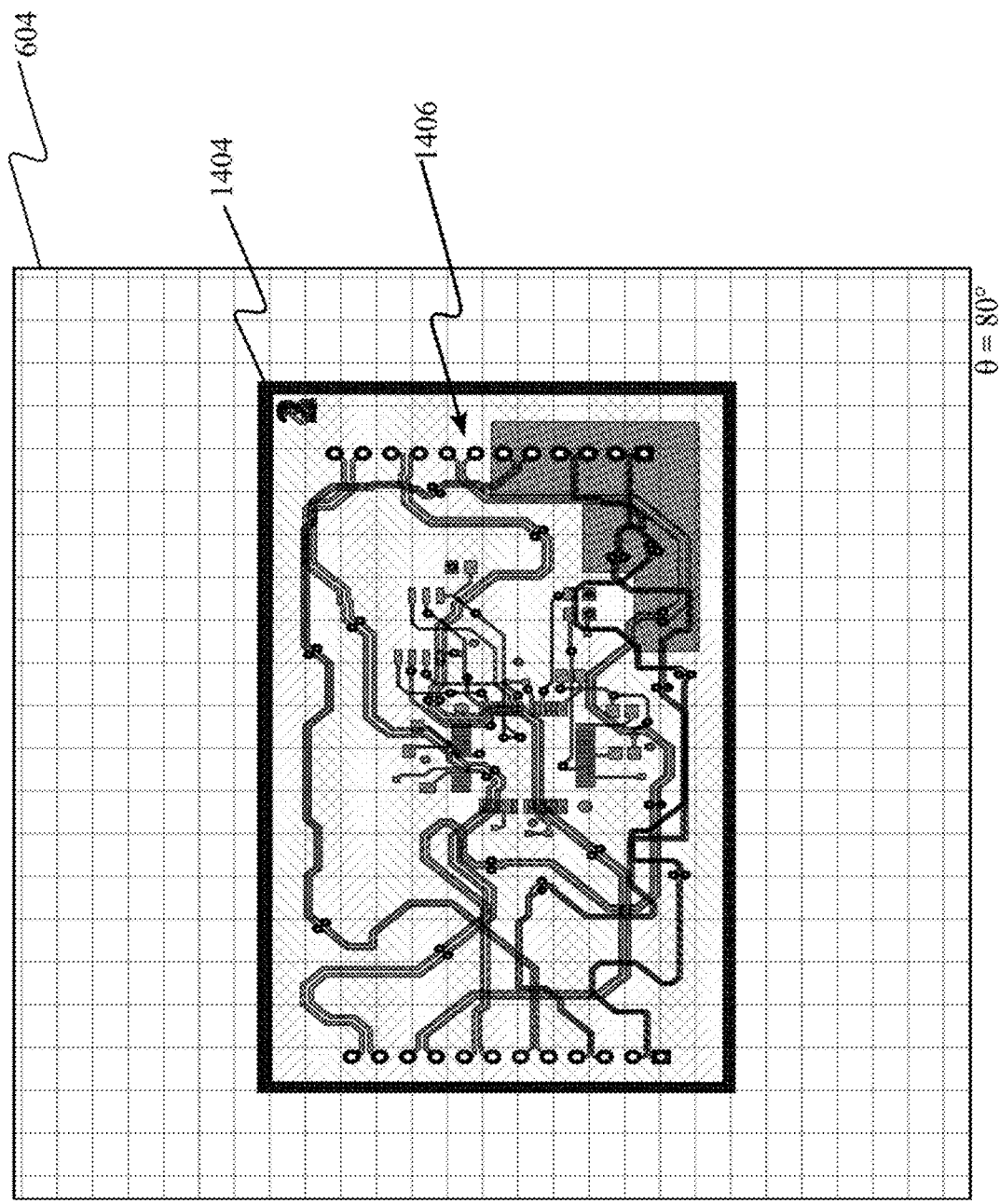
FIG. 14C illustrates pictorially the x-ray transmission image resulting from the CT configuration geometry and flexed PCB shown in FIGS. 14A-14B.
Figure 14D:
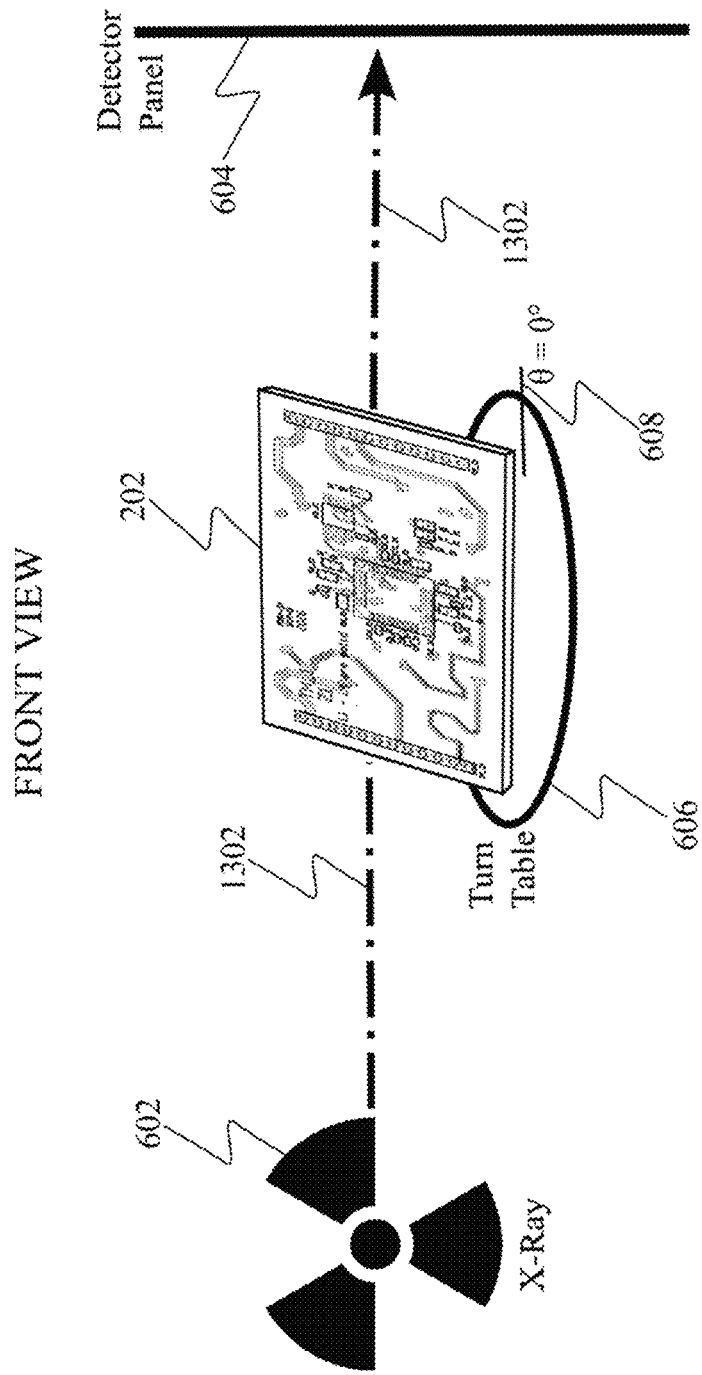
FIG. 14D illustrates pictorially the front view of the CT configuration when the flexed PCB is oriented at an angle with respect to an x-ray source such that the face (e.g., mounting surface) of the PCB is parallel to the propagation path of x-rays passing from the x-ray source to the detector.
Figure 14E:
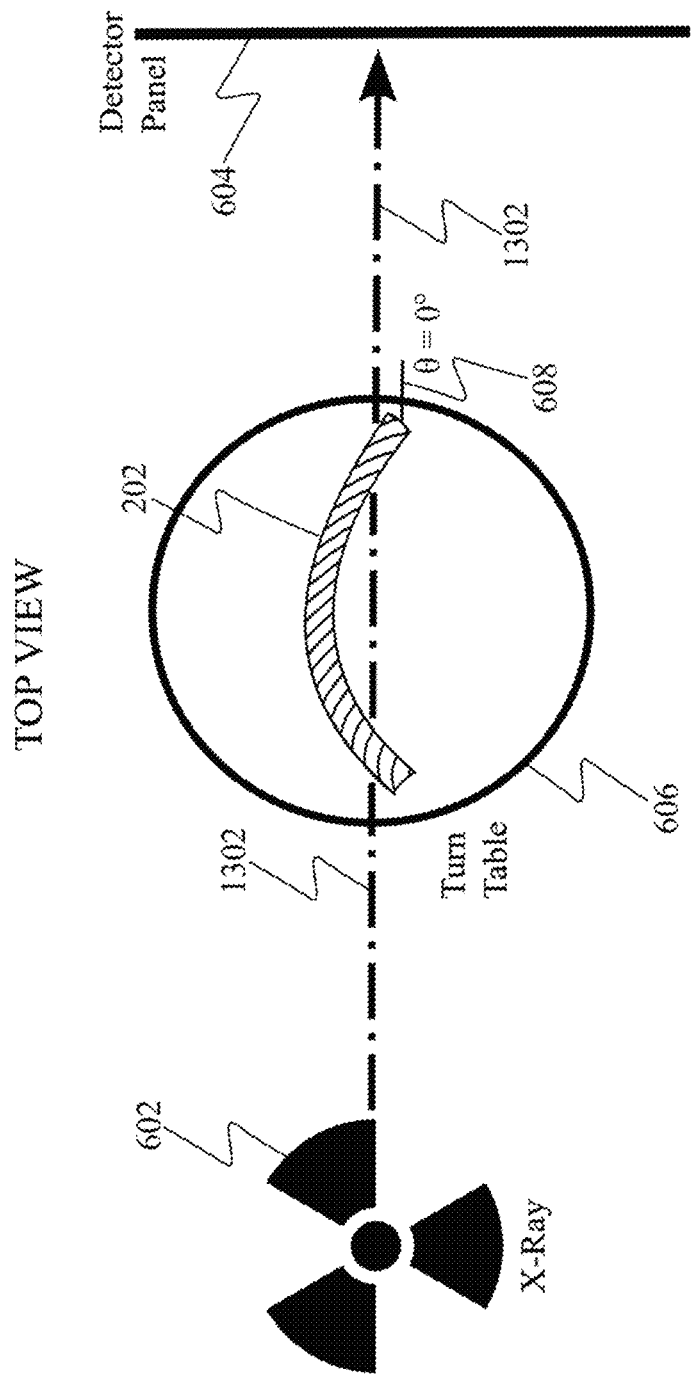
FIG. 14E illustrates pictorially the top view of the CT configuration when the flexed PCB is oriented at an angle with respect to an x-ray source such that the face (e.g., mounting surface) of the PCB is parallel to the propagation path of x-rays passing from the x-ray source to the detector.
Figure 14F:
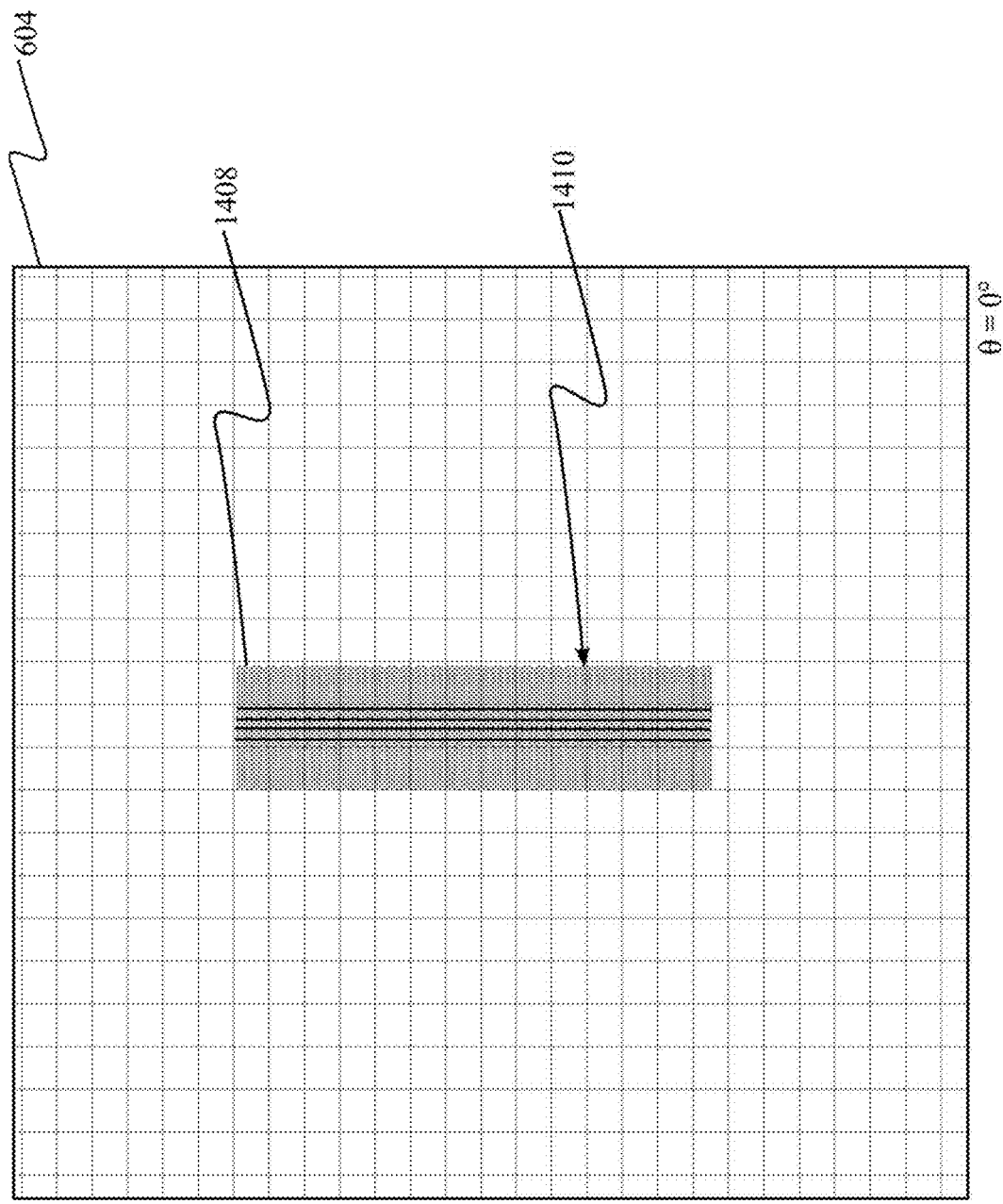
FIG. 14F illustrates pictorially the x-ray transmission image resulting from the CT configuration geometry and flexed PCB shown in FIGS. 14D-14E highlighting the improved contrast due to the ability of the x-rays to penetrate the width of the PCB due to the flexure.
Figure 14G:
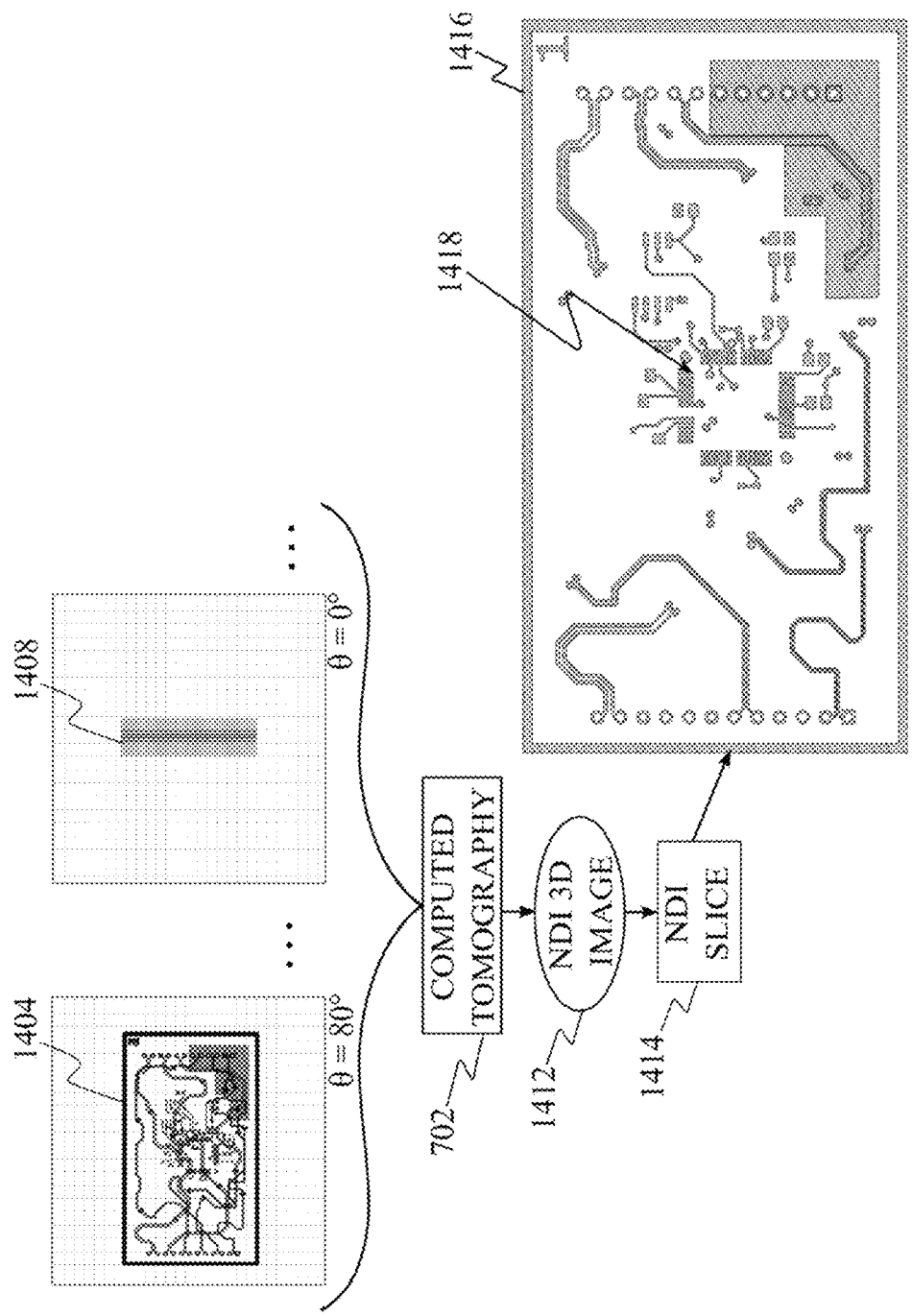
FIG. 14G illustrates a reconstructed NDI slice derived from the flexed PCB and CT configuration and transmission images shown in FIGS. 14A-14F with improved material contrast highlighted in the figure.

FIGS. 14A-14G illustrate a technique to correct contrast issues by introducing a slight intentional curvature to the electronic object (e.g., the CCA or PCB 202). As discussed above, many PCBs contain some inherent curvature. Introducing greater curvature to a slightly curved or uncurved PCB as depicted in FIGS. 14A-14G can improve the projection contrast at near 0° angles due to the decreased thickness the x-ray must penetrate. Like FIG. 13A, FIG. 14A illustrates the front view of the CT scanning configuration discussed and shown previously when the turntable angle 608 is not near 0°. However, in this circumstance, the PCB 202 is flexed as illustrated in FIG. 14B which shows the top view of this same scanning configuration. FIG. 14C shows the resulting x-ray projection image 1404 in this flexed configuration for scanning not near 0°, which is like that illustrated in FIG. 13C and which exhibits sufficient contrast 1406. Note, however, that when the turntable is near 0° as illustrated in the front view of FIG. 14D and top view of FIG. 14E, the x-rays 1302 are not required to penetrate as much material as they were when the PCB 202 was unflexed as shown in FIGS. 13D-13E. FIG. 14F illustrates the resulting x-ray projection image 1408 which contains sufficient contrast 1410 unlike the x-ray projection image 1308 shown in FIG. 13F. Finally, FIG. 14G illustrates the results of using this type of improved contrast projection image 1408 as part of the images used for computed tomography 702 to obtain an NDI 3D image 1412 (discussed previously) and using an NDI slice 1414 on this 3D image to obtain a 2D slice image 1416. Note in the figure that there is sufficient contrast in all areas 1418 of this CT reconstructed slice image. This type of circuit layer imagery is suitable for reverse engineering.

Extraction of Circuit Layer Images Using NDI

As described above, the physical construction of PCBs comprises laminated structures with alternating layers of conductor and dielectric materials wherein neighboring conductor layers are electrically interconnected by conductor plated holes known as vias. Manufacturing data files for PCBs primarily comprise vectorized image files (e.g., Gerber format files) for each conductor layer and for drill holes and via holes on those layers. Manufacturing data files also comprise a description of the PCB stackup—that is the thickness and the ordering of each conductor and dielectric layer.

As discussed above, recovering conductor layer images of PCBs using conventional nondestructive imaging (NDI) and planar NDI slices is challenging due to slight inherent flexures already present in PCBs and/or intentionally introduced flexure which may aid in improving NDI data quality. The following paragraphs describe a process to analyze NDI data of a PCB that may be flexed to extract and align circuit layer raster images and estimate the PCB stackup. The described process is a step within a larger process to nondestructively reverse engineer a PCB. The information obtained by this process is suitable for further processing which may convert the raster images to a suitable vector format as mentioned above to reverse engineer the PCB or to otherwise recover design data effectuating the manufacture of a replica.

Figure 15:
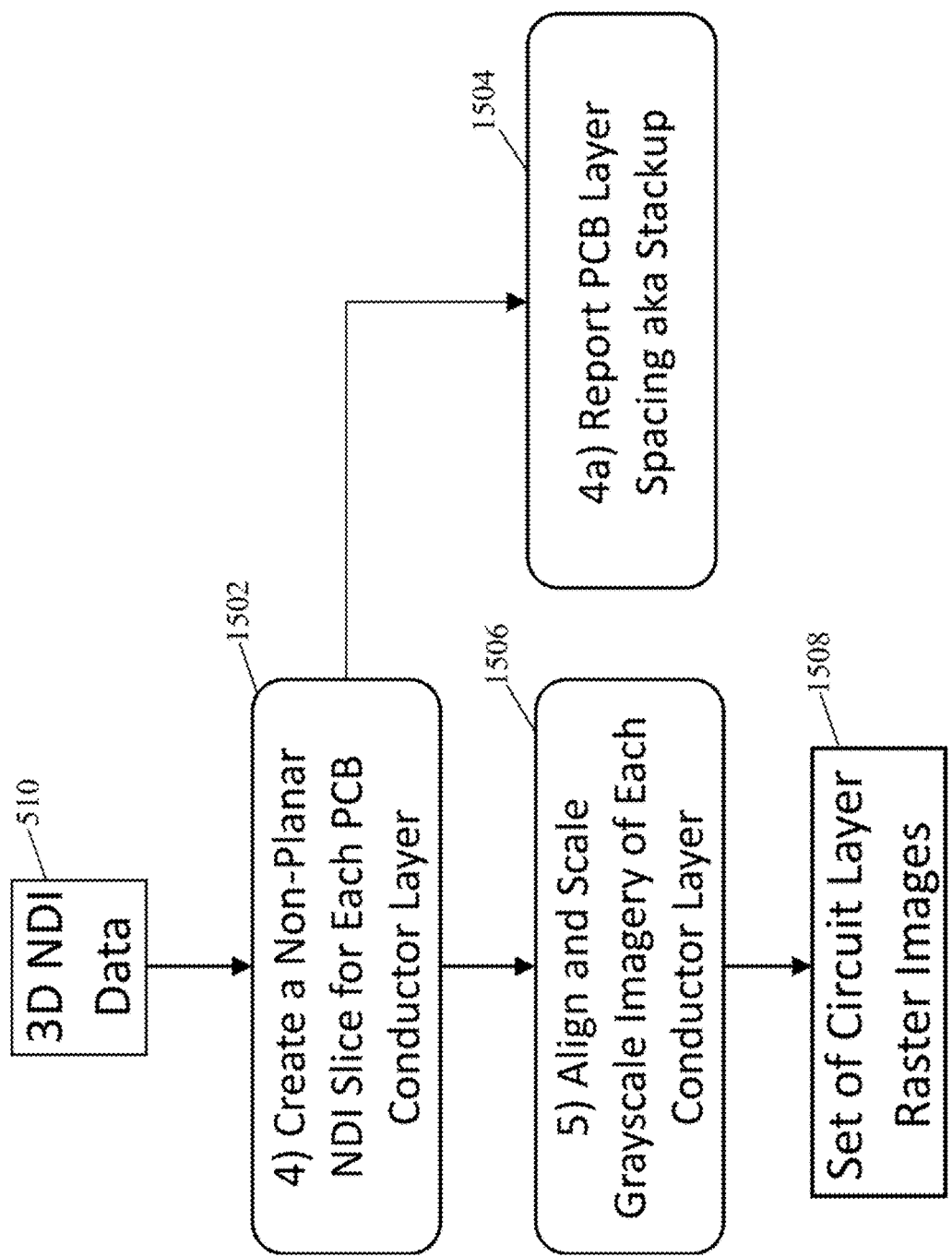
FIG. 15 illustrates a flowchart of the steps of a process for analyzing NDI data of a PCB to extract and align circuit layer raster images and to estimate the PCB stackup.

The steps for this process are shown in FIG. 15. The individual steps of the process are described in more detail with respect to the following figures. The starting point 510 of the process of FIG. 15 is the result 510 of the process illustrated in FIG. 5. The starting point 510 of the process described herein is that NDI data with sufficient contrast and resolution for the electronic object has been obtained and the NDI slices are roughly aligned with the electronic object axes as described above for the specific NDI modality of X-ray tomography. The next step 1502 is to create a non-planar NDI slice for each PCB conductor layer. The primary result of this step is that each such slice produces a 2D raster image of the respective circuit layer that is suitable for reverse engineering. A byproduct 1504 of this step is that necessary information is gathered to report the PCB layer spacing (aka stackup). Finally, the last step 1506 of the process is to align and scale the grayscale imagery of each conductor layer which ensures they are dimensionally accurate. The result of this process is a set 1508 of circuit layer raster images that are suitable for reverse engineering (e.g., each image captures only one circuit layer and exhibits sufficient contrast) and are aligned and scaled to be dimensionally accurate. The described process is readily adaptable to other imaging modalities.

Step 4: Create a Non-Planar NDI Slice for Each PCB Conductor Layer

Figure 16:
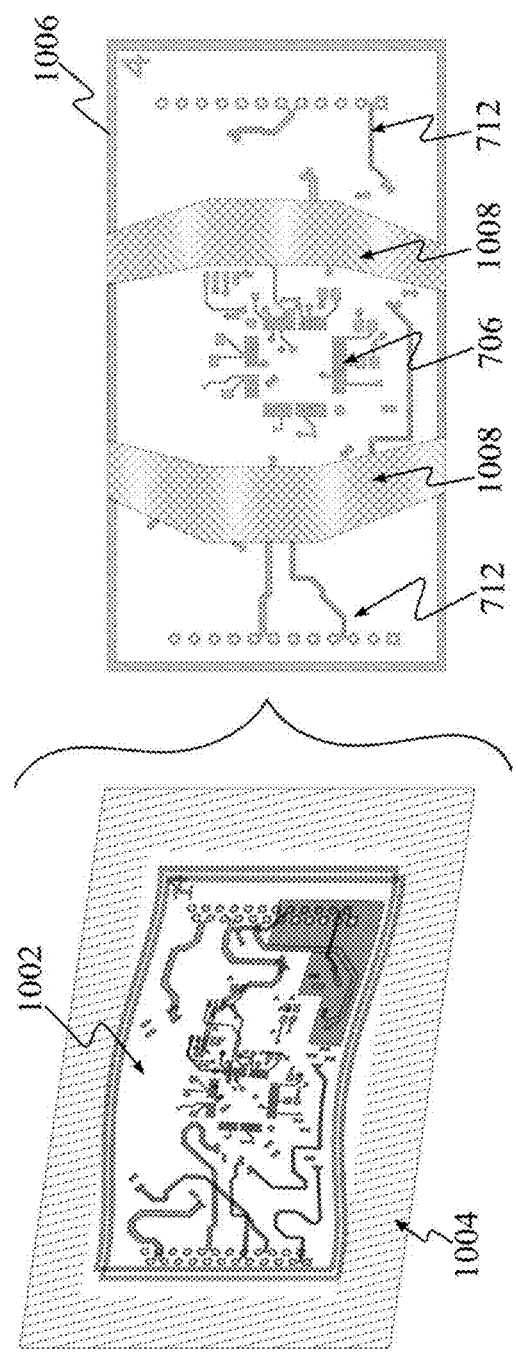
FIG. 16 illustrates a planar 2D NDI slice unsuitable for reverse engineering as it includes voxels representing conductive elements from multiple circuit layers.

Conductor layers within PCBs are often on the order of 5 ten-thousandths to 4 thousandths of an inch thick. The slightest degree of flexure in the PCB can make imaging a single layer difficult because planar/flat NDI slices will often probe through several different circuit layers at one time due to the PCB flexure as discussed previously and illustrated in FIGS. 10A-10B. FIG. 16 reiterates this situation whereby the 3D NDI image 1002 is warped and subjected to the planar NDI slice 1004. As a result, the NDI slice image 1006 contains regions showing the set 712 of voxels from the back layer (aka "layer 4") and regions showing the set 706 of voxels from the front layer (aka "layer 1") along with regions 1008 showing voxels from the interior portion of the PCB between these two layers. This slice image is not suitable for reverse engineering as it does not provide a complete picture of only one circuit layer.

Figure 17:
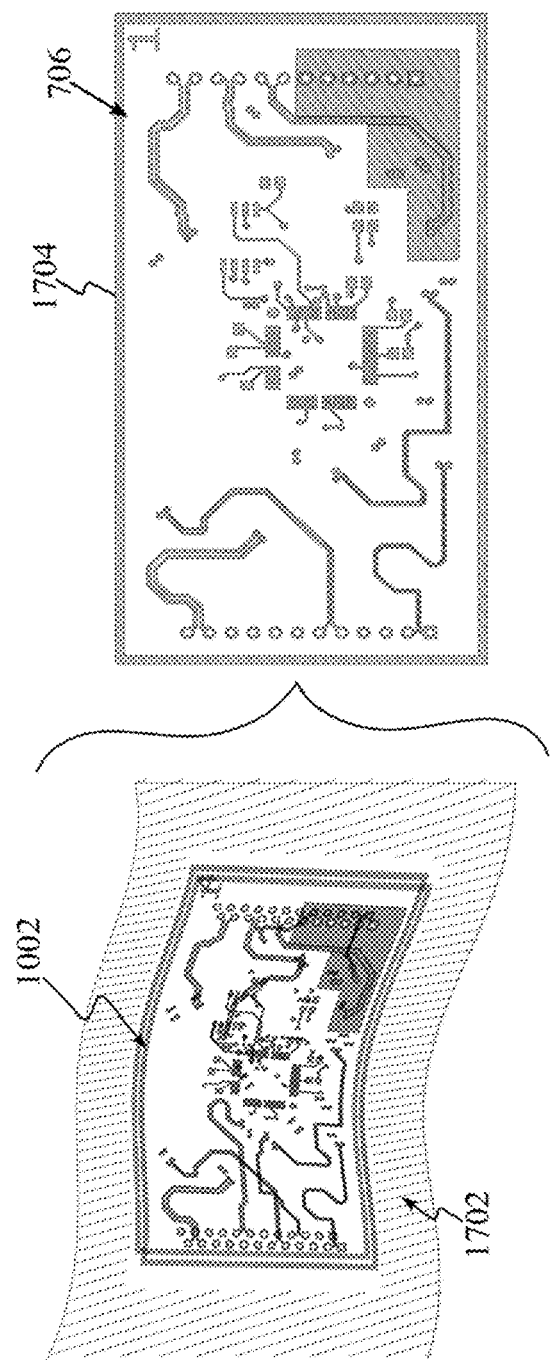
FIG. 17 illustrates a non-planar NDI slice that produces a 2D image that is suitable for reverse engineering as it includes a representation of a single circuit layer—the first circuit layer.

In contrast to FIG. 16, FIG. 17 illustrates the same warped NDI 3D image subjected to a non-planar NDI slice 1702 whose curvature better matches that of the PCB producing the NDI image than was illustrated in FIG. 16. Furthermore, the slice is located into the depth of the 3D image such that it intersects the set 706 of NDI voxels associated with the front layer (aka "layer 1") as shown in the resulting NDI slice 2D image 1704. This slice image is suitable for reverse engineering as it provides a complete picture of only one circuit layer. The process that produces such a 2D slice image for each circuit layer in the PCB is illustrated in FIG. 18 and is described below.

Steps 4.1 and 4.3: Determine and Report the PCB Stackup

Figure 18:
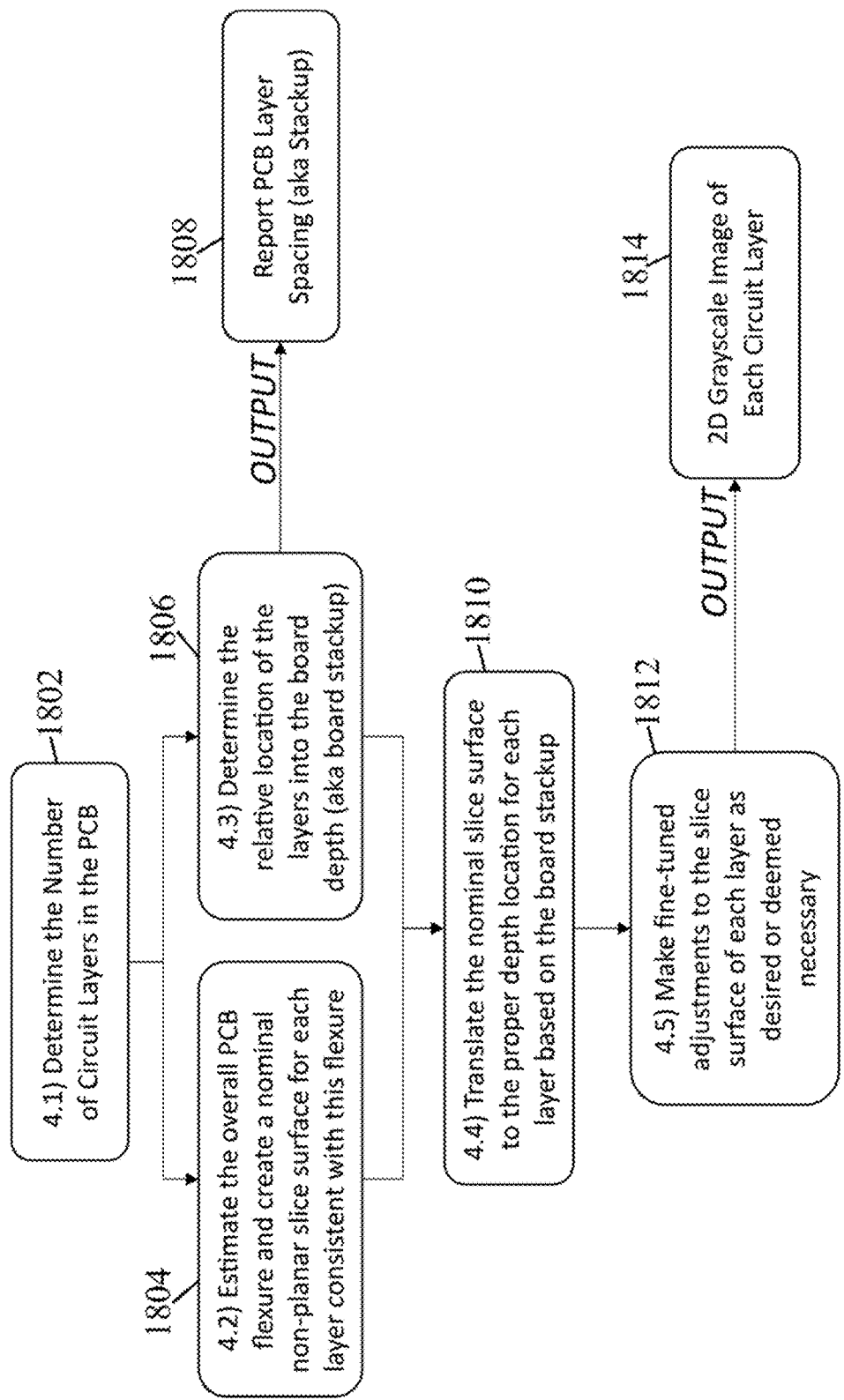
FIG. 18 illustrates a flowchart of a process that produces the 2D image of FIG. 17.

As illustrated in FIG. 18, in a first step 1802 (aka Step 4.1) in the process is to determine the number of circuit layers in the PCB. In a subsequent step 1804 (aka Step 4.2), the process estimates the overall PCB flexure and creates a nominal non-planar slice surface for each layer consistent with the estimated flexure. In a step 1806 (aka Step 4.3) parallel to the step 1802 (Step 4.1), the process determines the relative location of the layers into the board depth (aka board stackup), which results in the PCB stackup information discussed previously. As a result of the Step 4.3 the process produces the output data 1808 which provides a report of the PCB layer spacing (aka Stackup). In a step 1810 (aka Step 4.4), the process uses the information from the Step 4.2 and the information from the Step 4.3 to translate the nominal slice surface to the proper depth location for each layer based on the PCB stackup. In a step 1812 (aka Step 4.5), the process makes fine-tuned adjustments to the slice surface of each layer as desired or deemed necessary. As a result, from Step 4.5, the process produces an output data set 1814 comprised of a 2D grayscale image of each circuit layer.

Steps 4.1 and 4.3: Determine and Report the PCB Stackup

Figure 19:
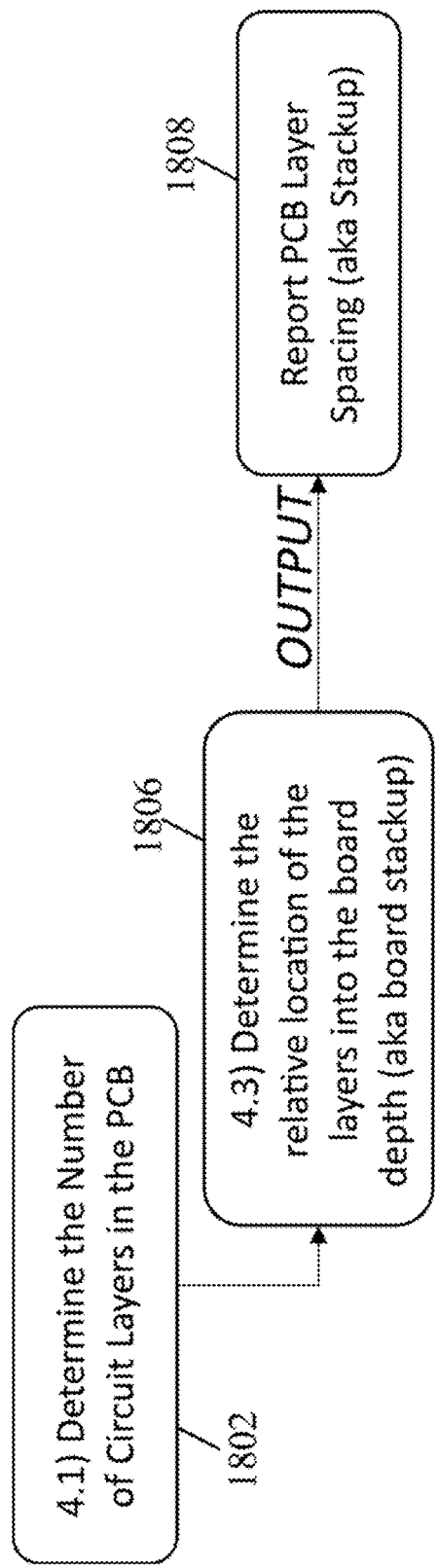
FIG. 19 illustrates a flowchart of the Steps 4.1 and 4.3 of FIG. 18.

FIG. 19 illustrates the Step 4.1 and the Step 4.3 of the process, which determine the PCB stackup. The PCB stackup comprises manufacturing data that includes the number of Circuit Layers in the PCB, the location into the depth of each circuit layer (or equivalently the spacing between each set of neighboring circuit layers (i.e., the dielectric thickness between two neighboring layers)), and the thickness of the conductor for each Circuit Layer.

One approach for obtaining PCB stackup information uses standard CT imaging software to manually view images of the PCB as the user scrolls into the depth (i.e., the thinnest dimension of the board). Noting depth locations that seem to show circuit layers provides an estimate of the PCB stackup. The noted locations, when scaled properly by the NDI voxel size, provide an estimate of the location of the circuit layers, and therefore provide the relative spacing of the circuit layers. As noted above, the PCB stackup information is output as a report of information to be included with the Gerber files.

Figure 20A:
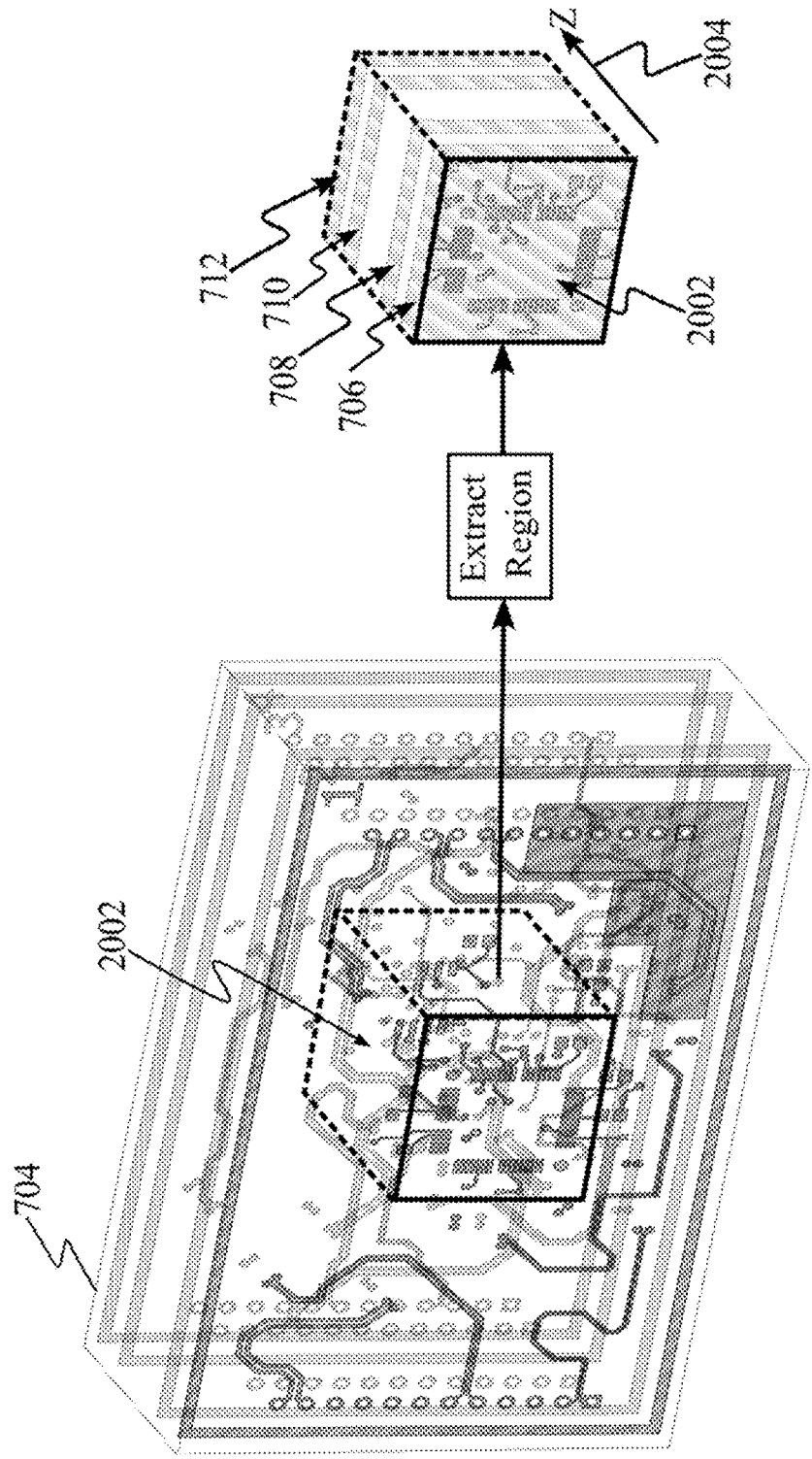
FIG. 20A illustrates the first step of extracting a 3D region of interest (ROI) from the larger NDI 3D image as part of an algorithm to determine the locations and thicknesses of the conductive layers of the PCB (aka stackup)
Figure 20B:
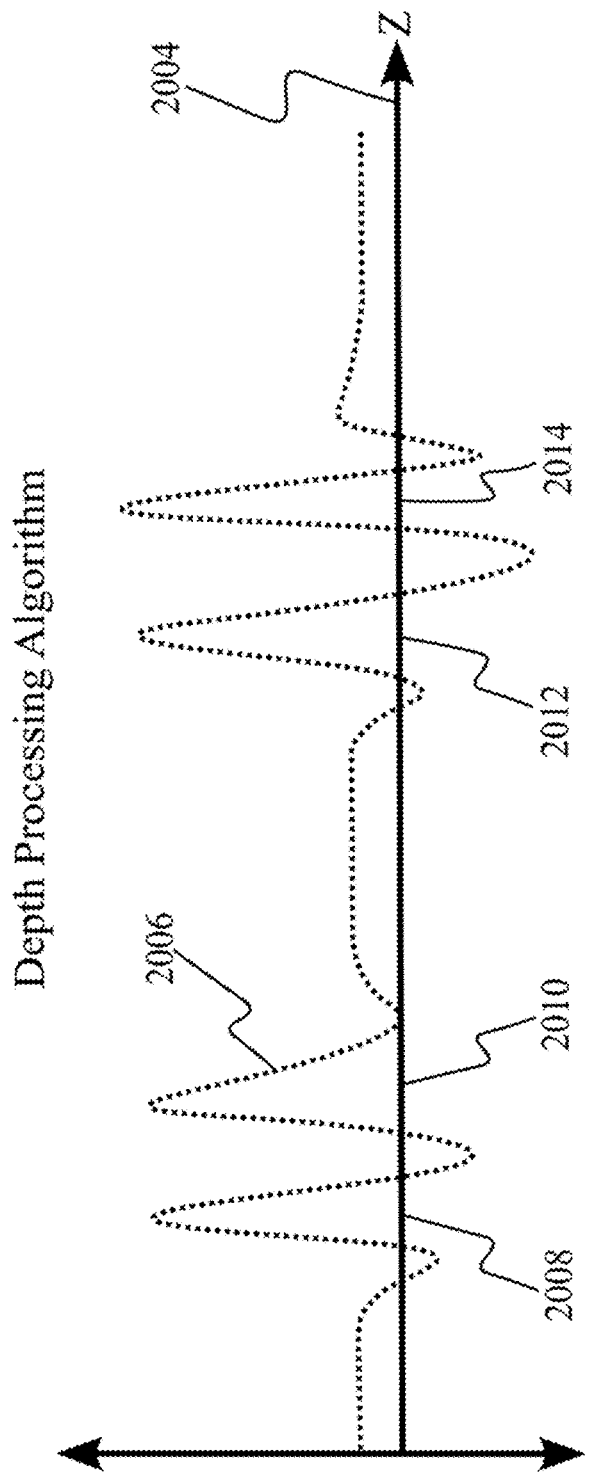
FIG. 20B illustrates the second step of processing the ROI from FIG. 20A into the depth as part of an algorithm to determine the locations and thicknesses of the conductive layers of the PCB (aka stackup)

In contrast to the manual approach, the process described herein which is illustrated in FIGS. 20A-20B uses an algorithm that probes into the depth (the thinnest board dimension) of the CT data for a user-defined 3D region of interest (ROI) and processes the data into the depth to determine the stackup information. As illustrated in FIG. 20A, a local region of interest 2002 is extracted from the 3D NDI image 704. The ROI is a voxel grid subset of the entire 3D image voxel grid. As shown in the figure the ROI contains subsets of the sets (706, 708, 710, 712) of voxels representing each of the circuit layers in the PCB. The ROI voxel grid has orthogonal X, Y, and Z axes in the same manner as the encompassing global 3D NDI image. The grid is centered at a given (user-specified) global (x, y) coordinate, and, by convention, the coordinate direction 2004 Z is used to denote the dimension associated with the board thickness or depth as shown in the figure. As illustrated in FIG. 20B, a depth processing algorithm measures image contrast over all ROI X and Y values for each distinct Z depth value. The algorithm also measures the rate of change in contrast versus Z. The algorithm uses the measured data to generate a trace 2006 of values versus depth 2004 (aka Z). The trace has peaks whose Z-values (2008, 2010, 2012, and 2014) indicate locations of circuit layers into the depth at the given global (x, y) location associated with the ROI center. For clarity in the figure, a Z location 2008 of the first peak indicates the presence of the set 706 of voxels associated with "layer 1", the Z location 2010 of the second peak indicates the presence of the set 708 of voxels associated with "layer 2", and so on. Furthermore, the widths of each peak are proportional to the respective circuit layer thickness. This information is sufficient to estimate the PCB stackup.

Step 4.2: Create Nominal Non-Planar NDI Slices for Each Circuit Layer

This portion of the process creates a nominal non-planar slice for each circuit layer. The term nominal is used because each circuit layer slice can be individually modified in later steps as deemed necessary to obtain a suitable 2D image of the circuit layer in question. The process starts by using an algorithm to estimate the flexure of the board. This 2D flexure surface is the starting basis for each circuit layer slice. If N Circuit Layers are determined to be present in the board from previous steps, this process initializes N separate non-planar slices—one for each circuit layer.

Figure 21A:
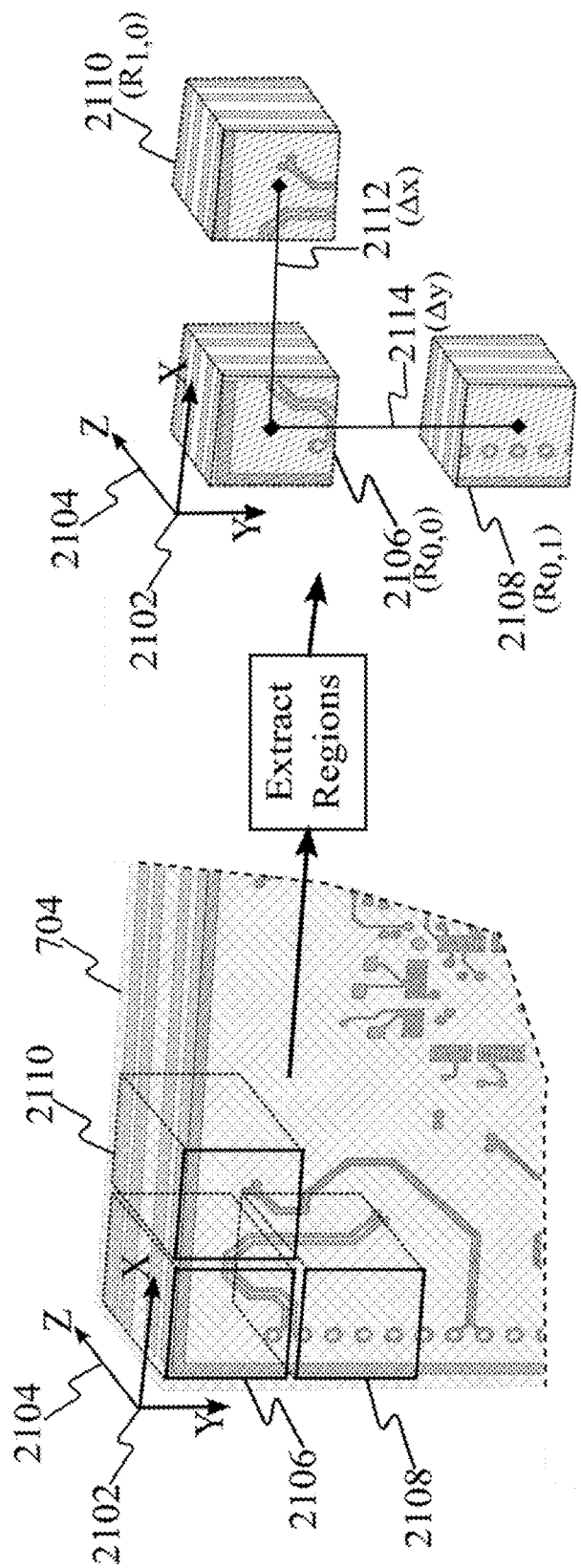
FIG. 21A illustrates the process of dividing the total 3D image into a series of smaller regions of interest (ROI) 3D as part of an algorithm to estimate the overall PCB flexure surface.
Figure 21B:
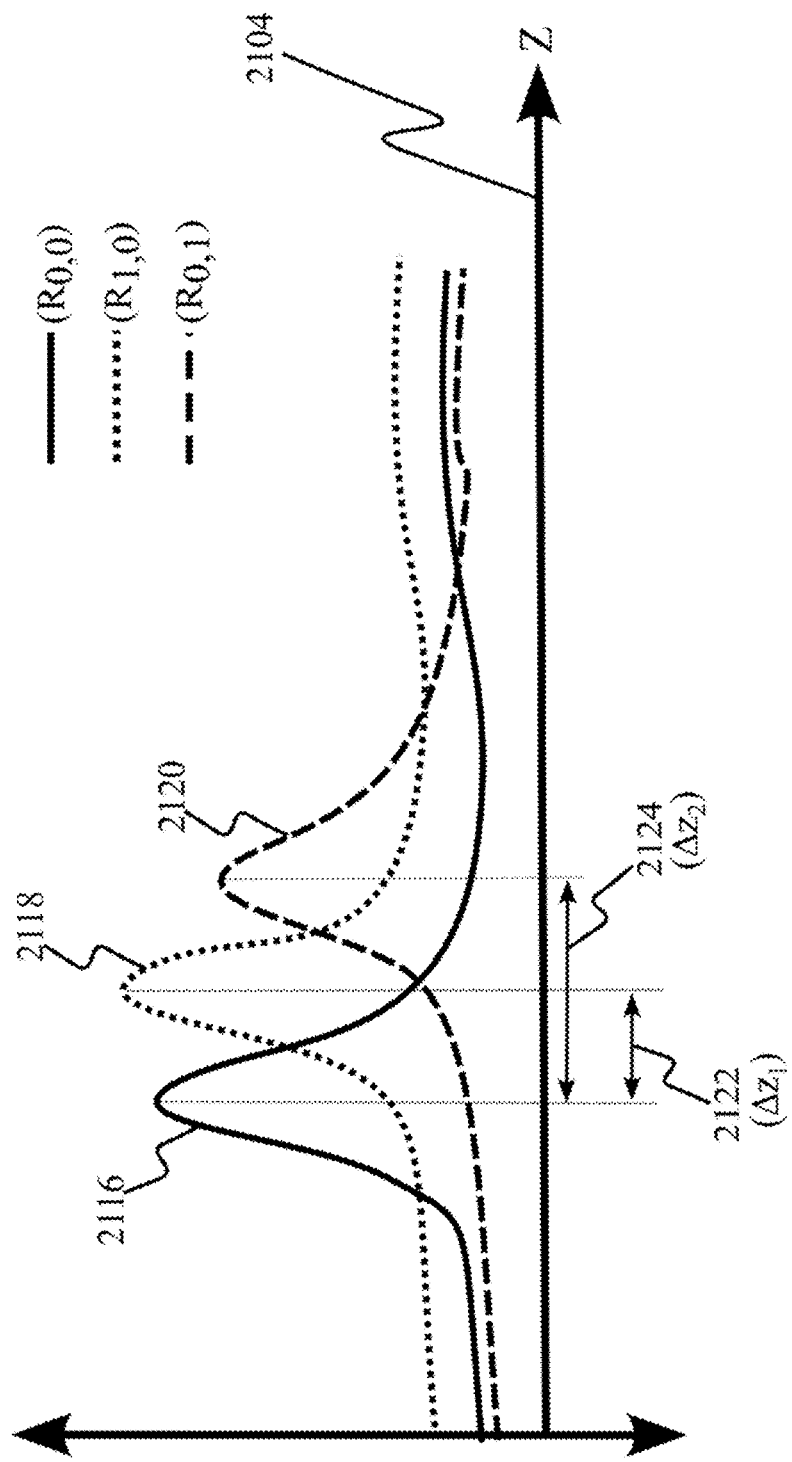
FIG. 21B illustrates the process of analyzing each of the ROIs from FIG. 21A into the board depth to determine relative offsets from one ROI to another.
Figure 21C:
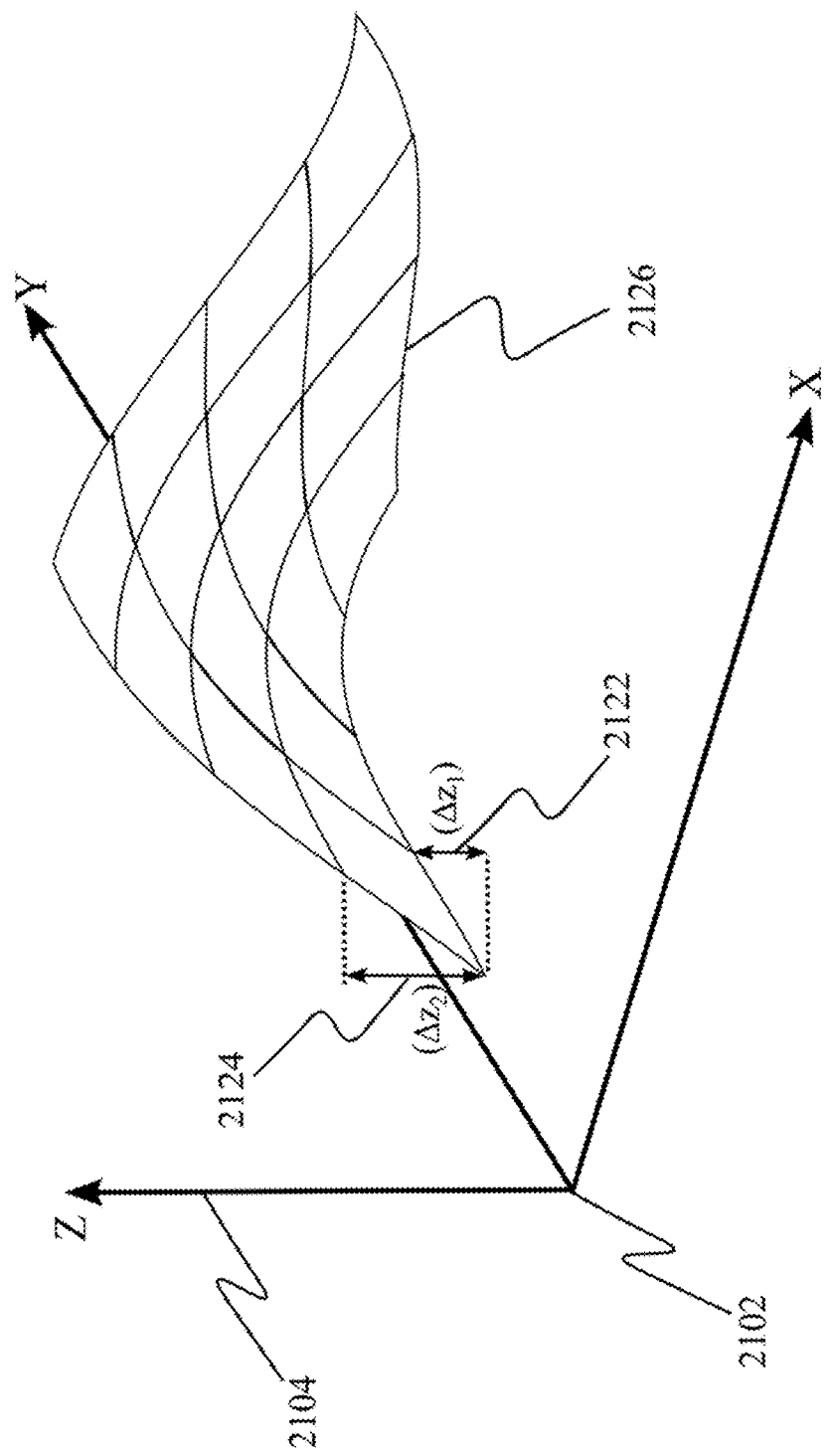
FIG. 21C illustrates aggregating the offset information from FIG. 21B with the ROI grid positions from FIG. 21A to create a board flexure surface.

The algorithm used in this step of the process divides the total 3D image into a series of smaller region of interest (ROI) 3D images as illustrated in FIG. 21A. The figure shows this subdivision for a sub-portion of the PCB NDI image 704 with a set 2102 of voxel grid axes, including a Z axis 2104 oriented into the depth (thinnest dimension) of the PCB. The figure shows three example extracted ROIs— 2106 (aka $R_{0,0}$), 2108 (aka $R_{0,1}$), and 2110 (aka $R_{1,0}$)—for this sub-portion of the NDI Image. The size of the ROIs may vary, and they may or may not overlap. The ROI 3D images are denoted $R_{m,n}$ and are laid out on the regular grid in the plane which does not contain the board thinnest dimension—called here the XY plane. A grid spacing 2112 in the X direction is denoted $\Delta x$ and a grid spacing 2114 in the Y direction is denoted $\Delta y$. As illustrated in FIG. 21B, for each ROI, the set of NDI data over all X and Y ROI values is processed and aggregated for each distinct depth value along the Z axis 2104 to yield a series of traces (2116, 2118, and 2120) of values versus depth. The solid trace 2116 shown in the figure corresponds to data obtained from the ROI 2106 denoted $R_{0,0}$ and so on as illustrated in the legend in the figure. The depth traces for neighboring ROIs are compared to determine the amount of relative offset, $\Delta z$, from one ROI depth trace to the next. For instance, a first relative offset 2122 denoted $\Delta z_1$ corresponds to the shift present between the trace 2116 for ROI $R_{0,0}$ and the trace 2118 for ROI $R_{1,0}$. A second relative offset 2124 denoted $\Delta z_2$ corresponds to the shift present between the trace 2116 for ROI $R_{0,0}$ and the trace 2120 for ROI $R_{0,1}$. The algorithm aggregates this information over the grid of ROIs which encompass the entire PCB to build a board flexure surface 2126 as illustrated in FIG. 21C. This board flexure surface is set as the nominal slicing surface for each circuit layer.

Figure 22A:
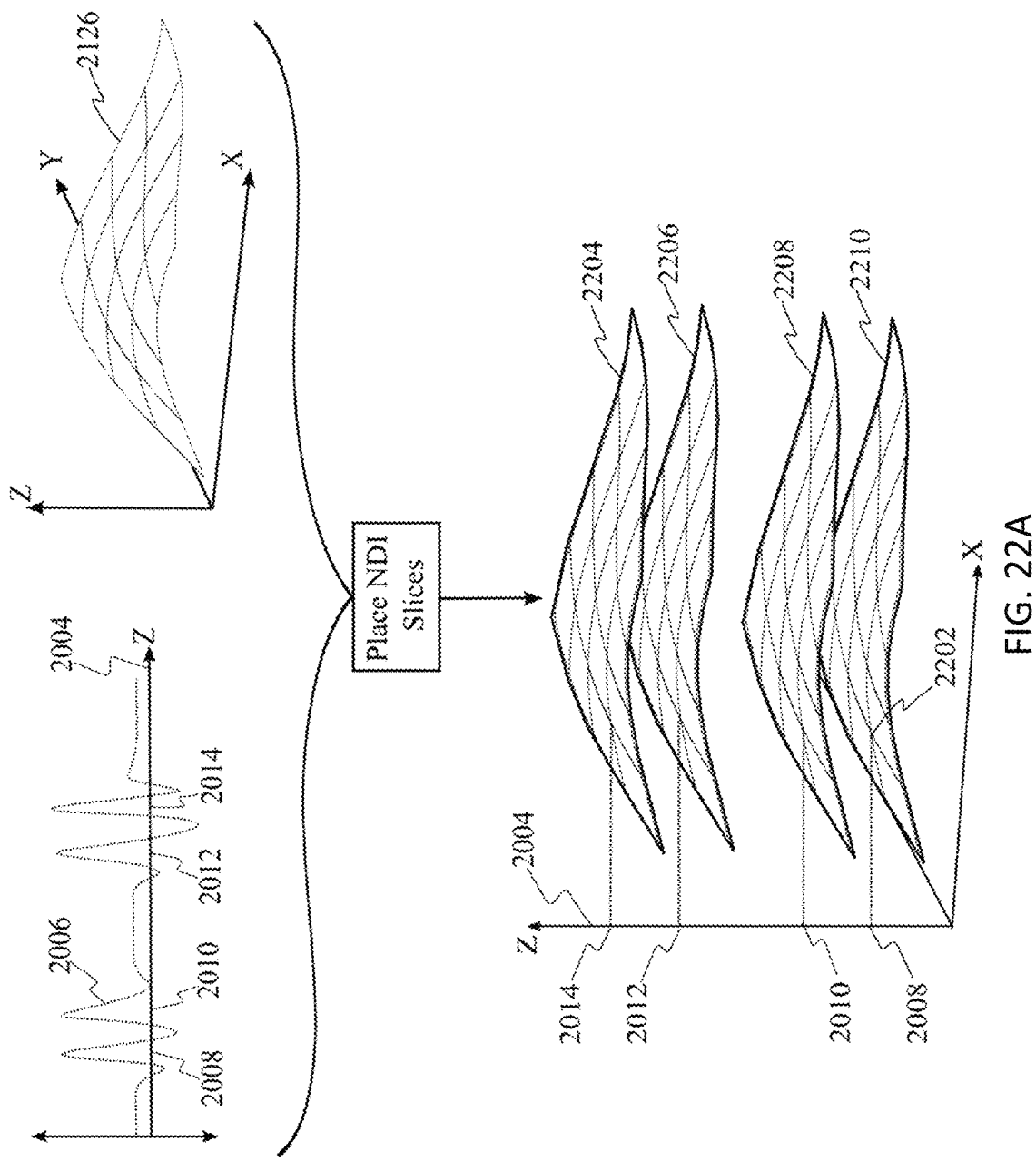
FIG. 22A illustrates a step of creating NDI slice surfaces for each circuit layer based on placing the board flexure surface from FIG. 21C at depths where they intersect the respective Z value at the X-Y coordinate used for the ROI from FIG. 20A.
Figure 22B:
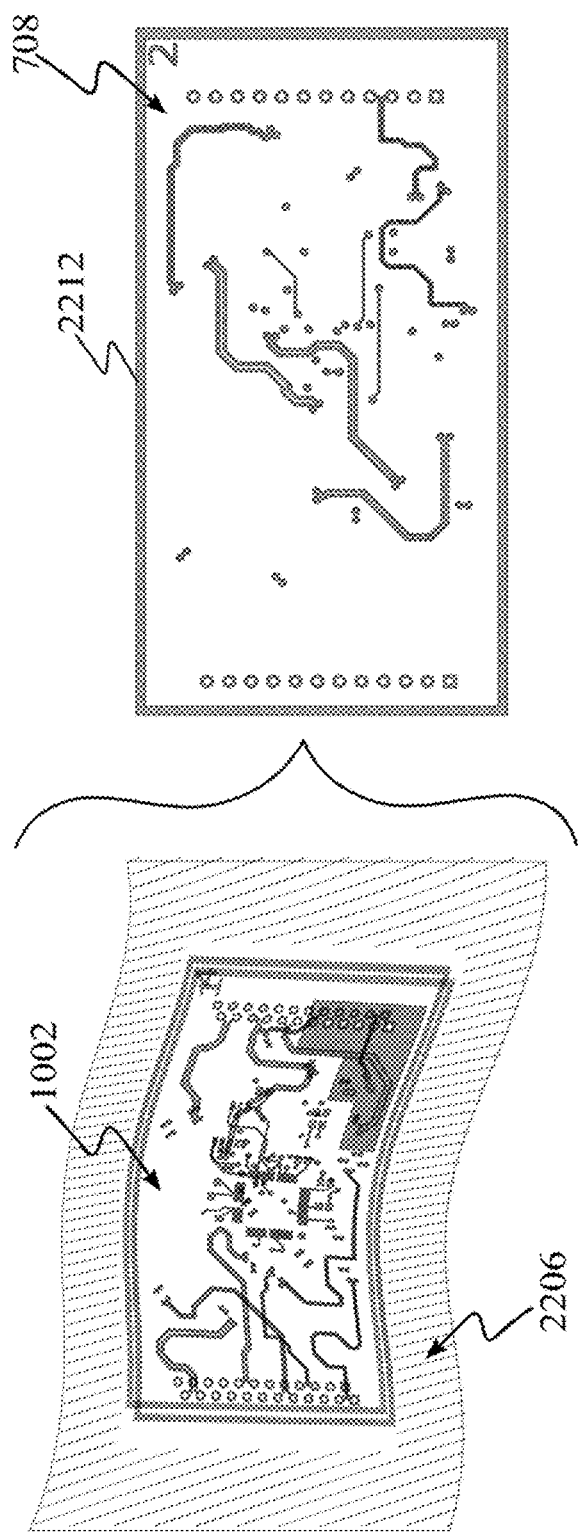
FIG. 22B illustrates an NDI slice image resulting from one of the NDI slice surfaces shown in FIG. 22A.

Step 4.4: Place Nominal Slice Surface at Proper Depths for Each Circuit Layer As illustrated in FIG. 22A, the flexure surface 2126 found in Step 4.4 is placed at each of the Z depth locations (2008, 2010, 2012, and 2014) found previously from the stackup detection step (Step 4.3), which indicates the presence of a circuit layer. The placement occurs such that the Z value of each respective flexure surface at the X-Y location 2202 shown in the figure corresponds to the Z value for the corresponding circuit layer from Step 4.3. Furthermore, the X-Y location 2202 corresponds to the X-Y coordinates of the center of the ROI 2002 used in Step 4.1. If the board contains N layers, N surfaces are created and are placed at the appropriate Z depths. As illustrated in FIG. 22B when a flexure surface such as a second surface 2206 is used as an NDI slice into the 3D NDI Image 1002 of the flexed PCB, the result is a 2D slice image 2212 of the corresponding circuit layer voxels, which for the second flexure surface 2206 corresponds to the set 708 of voxels of circuit layer "layer 2". Each of the N surfaces created and placed as described above is used as an NDI slice to yield a series of 2D images—each of which now shows only one circuit layer at a time since flexure has been corrected for.

Step 4.5: Manually Modify Individual Circuit Layer Slices if Needed

Figure 23A:
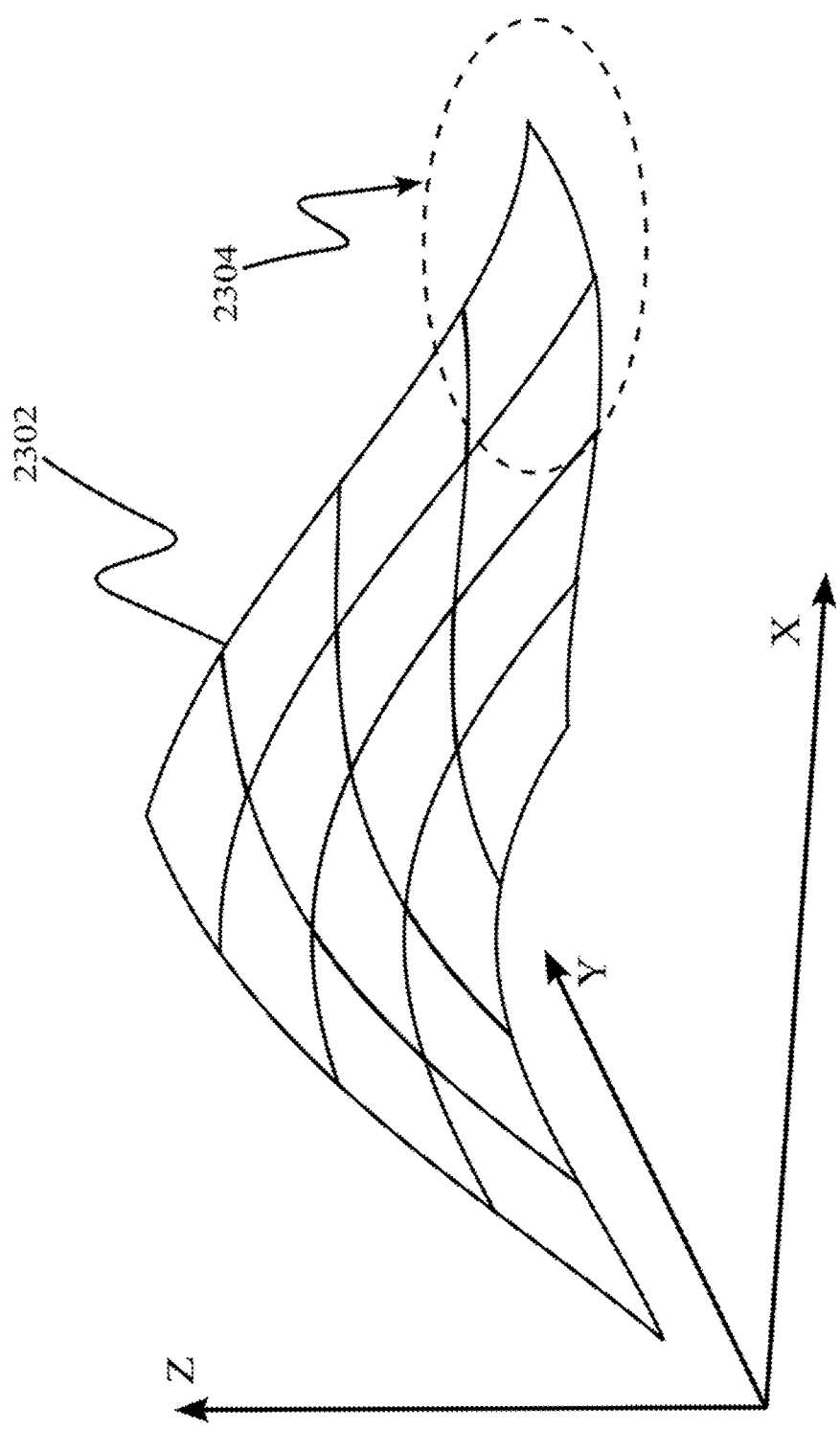
FIG. 23A illustrates an NDI slice surface with a locally poor region highlighted.
Figure 23B:
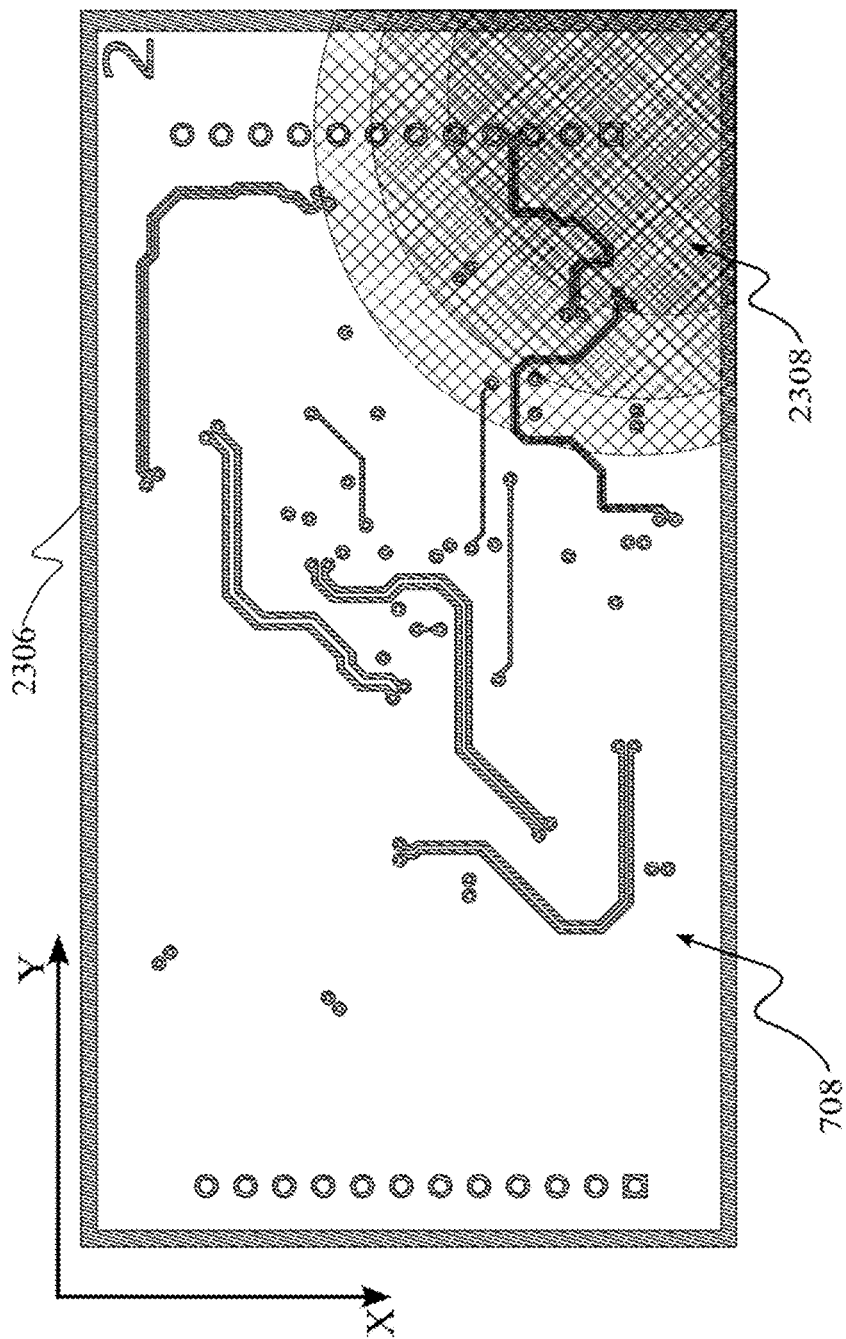
FIG. 23B illustrates the NDI slice image resultant from the NDI slice surface in FIG. 23A with the impact of the locally poor region highlighted.
Figure 24A:
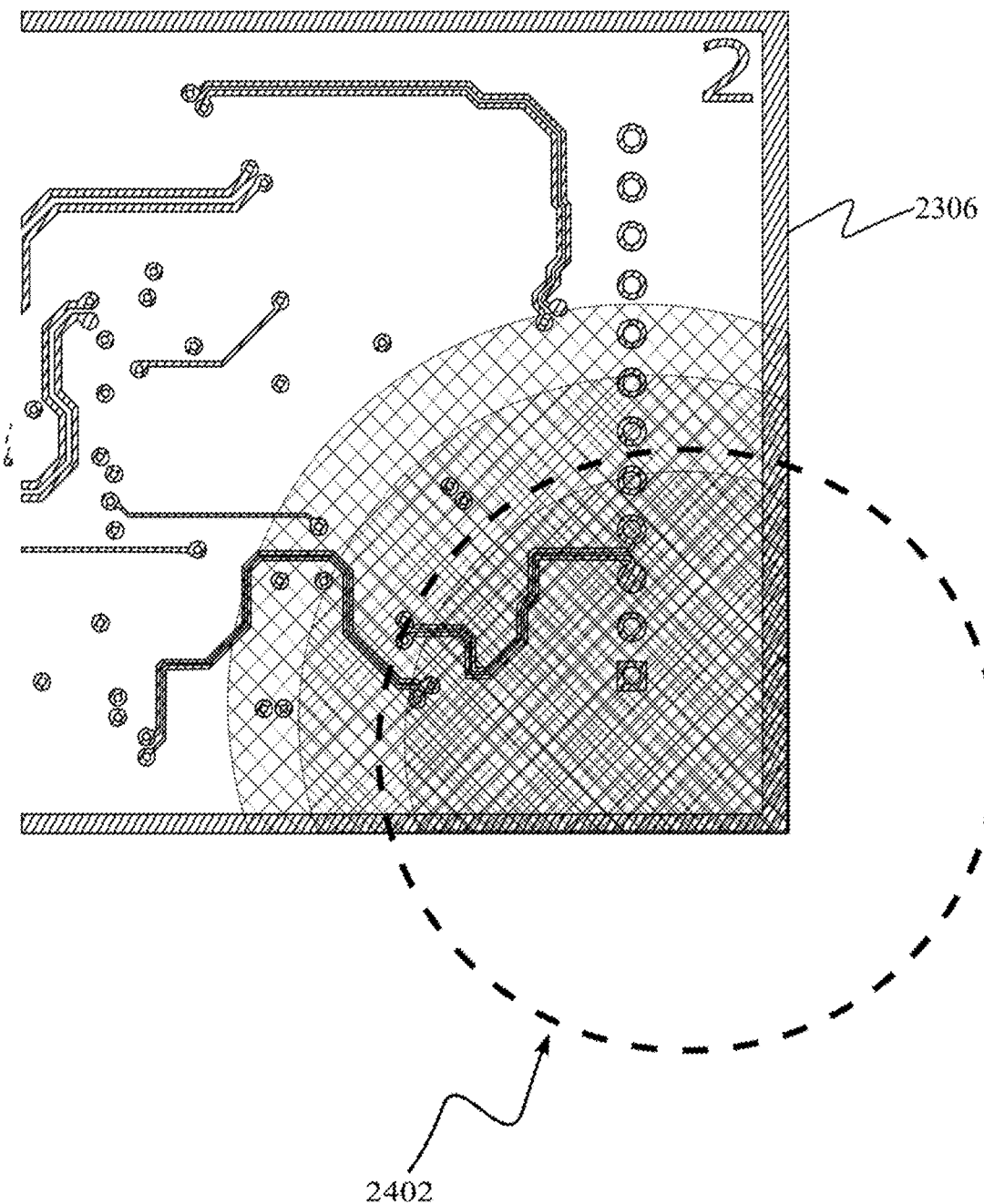
FIG. 24A illustrates a local adjustment ellipse placed around the poor region of FIG. 23B.
Figure 24B:
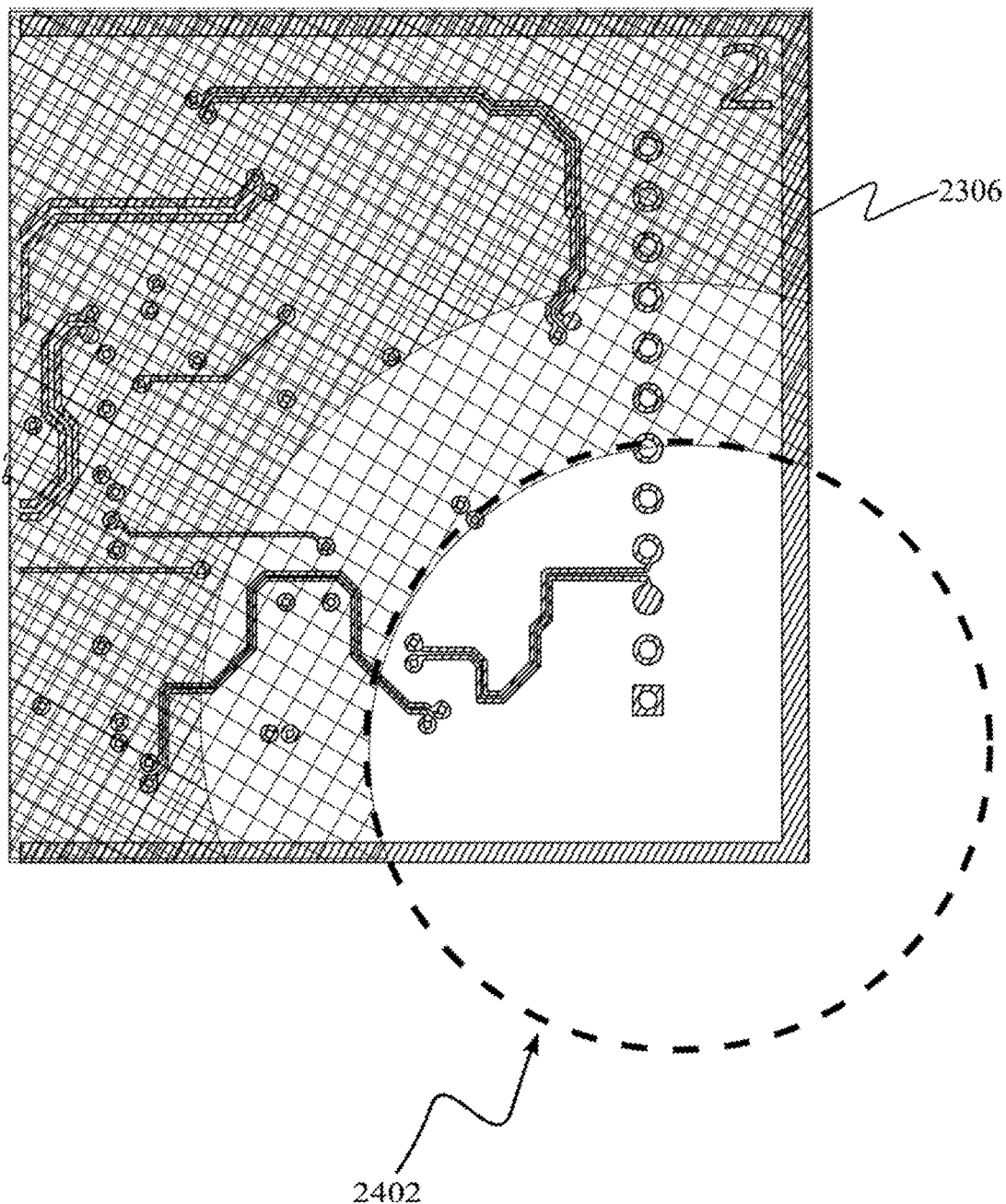
FIG. 24B illustrates the improvement in the contrast of the local region provided by an adjustment of the depth of the image in the local region.

This step is optional. After the previous step, if any of the circuit layer grayscale images appear poor in a local region, the images can be corrected for that layer. This is done by modifying the NDI slice depth within that local region. The software contains algorithms to facilitate this modification. This step can be repeated by a user as many times as desired for each layer until a suitable grayscale 2D Image for each layer is found. FIGS. 23A-23B illustrate an example of a locally poor region in a slice surface and its effect on the resulting 2D slice image. FIG. 23A shows an NDI slice surface 2302 that is generally well aligned with the set 708 of voxels corresponding to circuit layer "layer 2" discussed previously except for in a local region 2304. As illustrated in FIG. 23B, this results in an NDI slice 2D image 2306 that generally captures the "layer 2" set 708 of voxels except in the local region 2308 where voxels from dielectric material are present. In FIG. 24A the software presents the user with the image 2306 of the NDI slice result and allows the user to zoom to a portion of the image and draw an ellipse 2402 around a local region requiring adjustment. The user, through the software, adjusts the depth of the NDI slice so the image in the selected region now appears correct as illustrated in FIG. 24B. Note that when adjusting the depth of the NDI slice surface during this step, other portions of the circuit layer image may now temporarily appear poor.

Figure 25A:
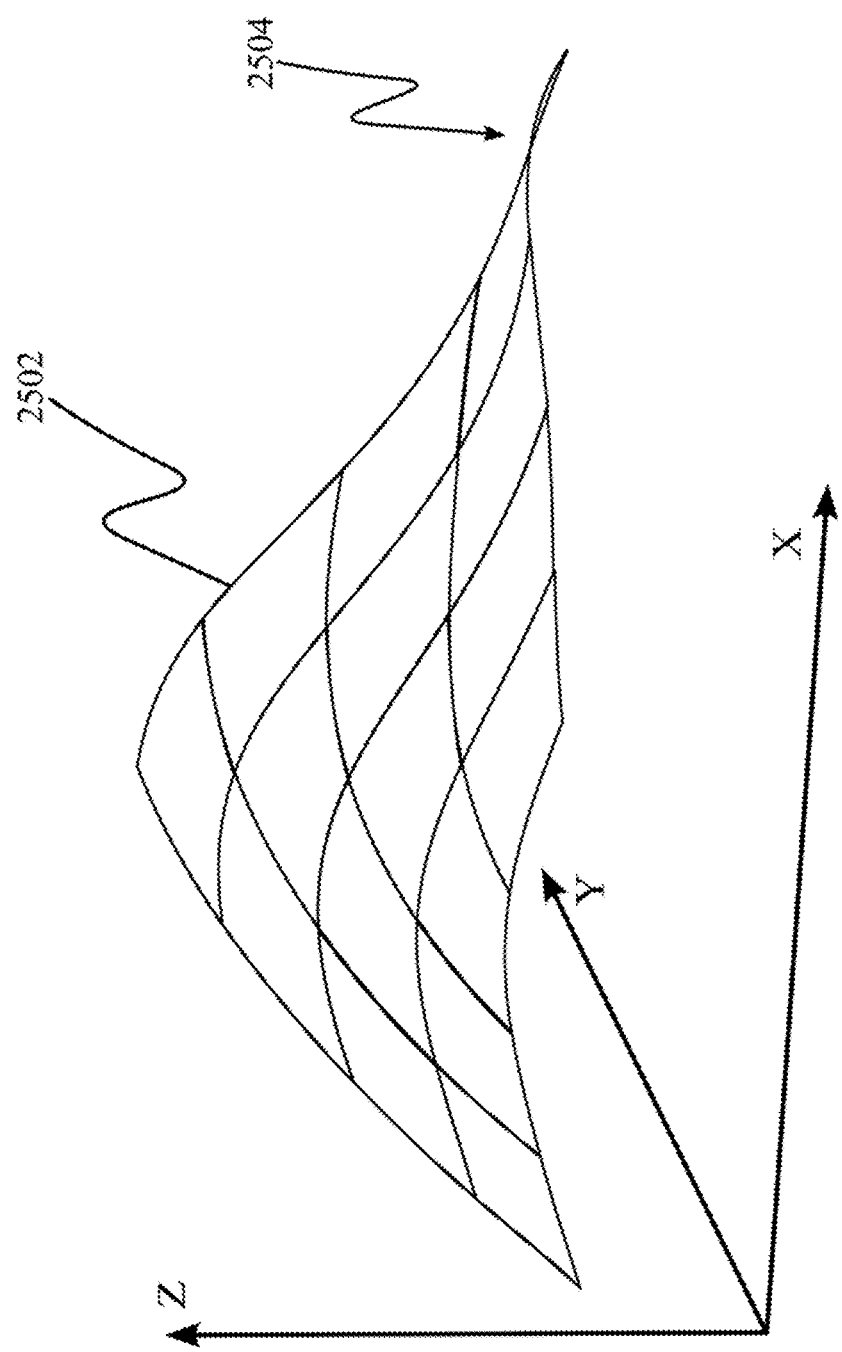
FIG. 25A illustrates the updated NDI slice surface from FIG. 23A after the local adjustment shown FIGS. 24A-24B.
Figure 25B:
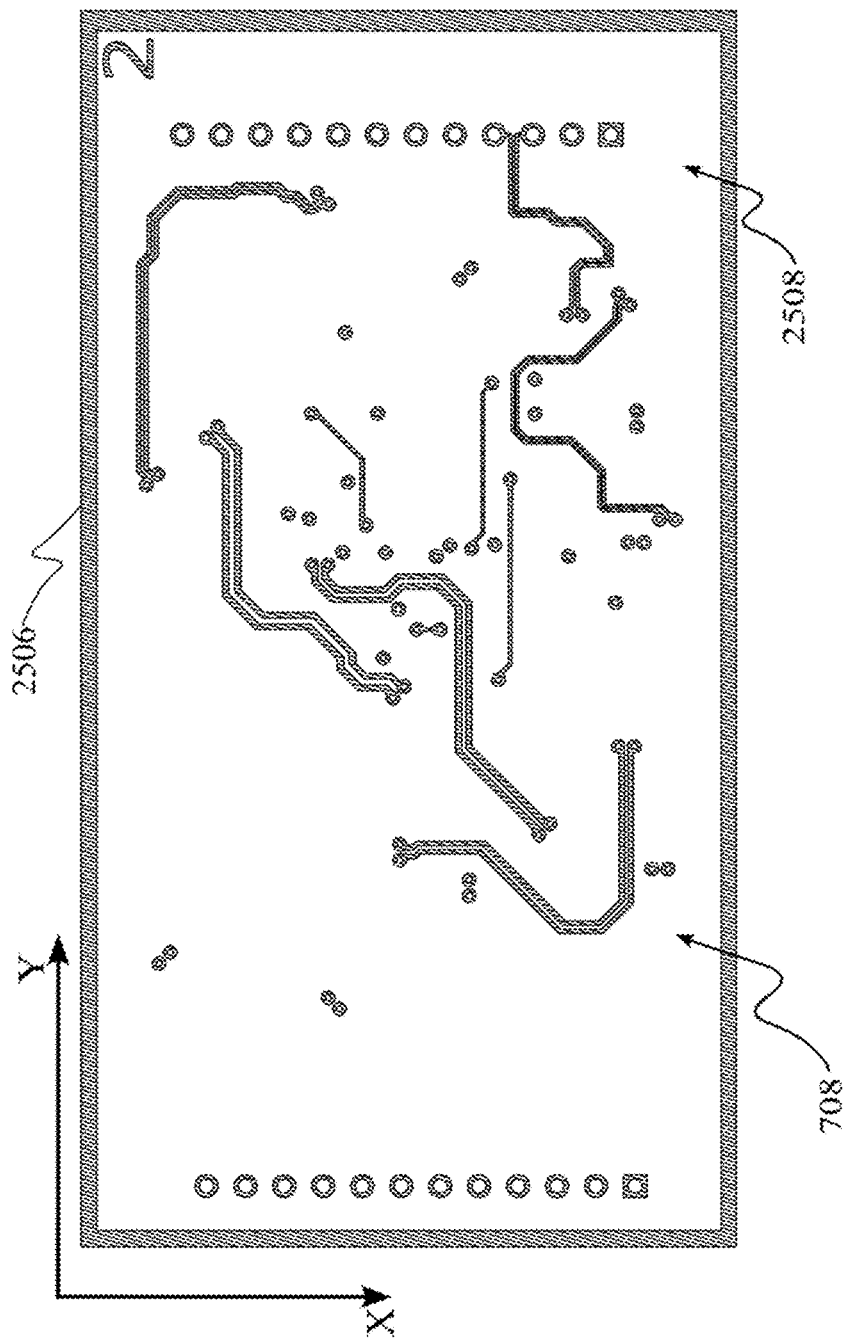
FIG. 25B illustrates the better representation of the circuit layer based on the adjusted NDI slice surface in FIG. 25A.

As illustrated in FIG. 25A, once the user accepts the local adjustments illustrated in FIG. 24B, the information about the user-specified depth in the local region is blended with the slice surface information from outside the local region to yield an updated slice surface 2502. The depth of this updated slice surface is adjusted primarily in the local region 2504. As illustrated in FIG. 25B the resulting 2D circuit layer image 2506 yields a better representation of the circuit layer in the local region 2508 and the entire image generally captures the set 708 of voxels of the corresponding circuit layer.

Step 5: Align and Scale Grayscale Imagery

Figure 26A:
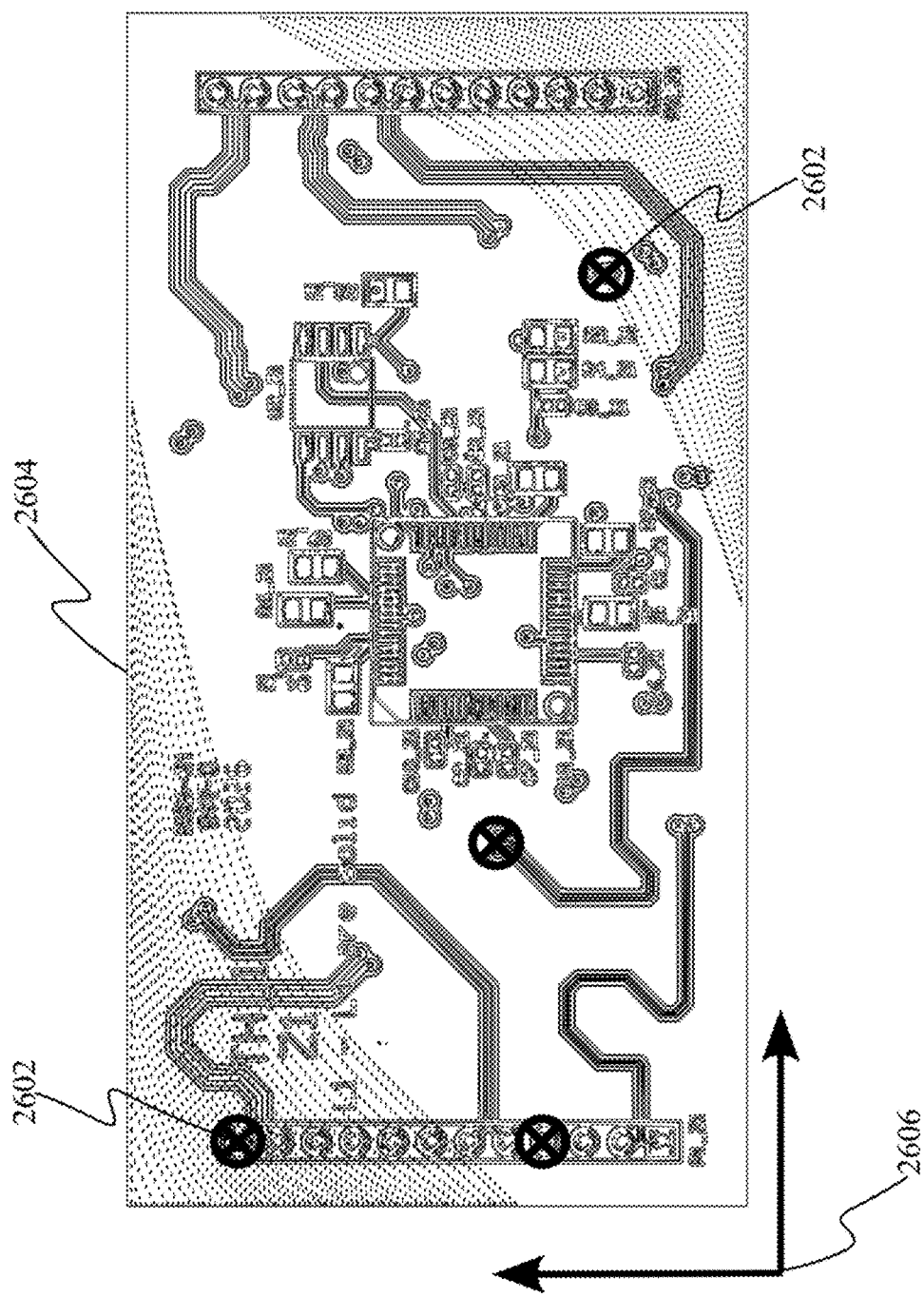
FIG. 26A illustrates the first step in aligning circuit layer images where target points are selected on a dimensionally accurate image of the outer surface of the PCB.
Figure 26B:
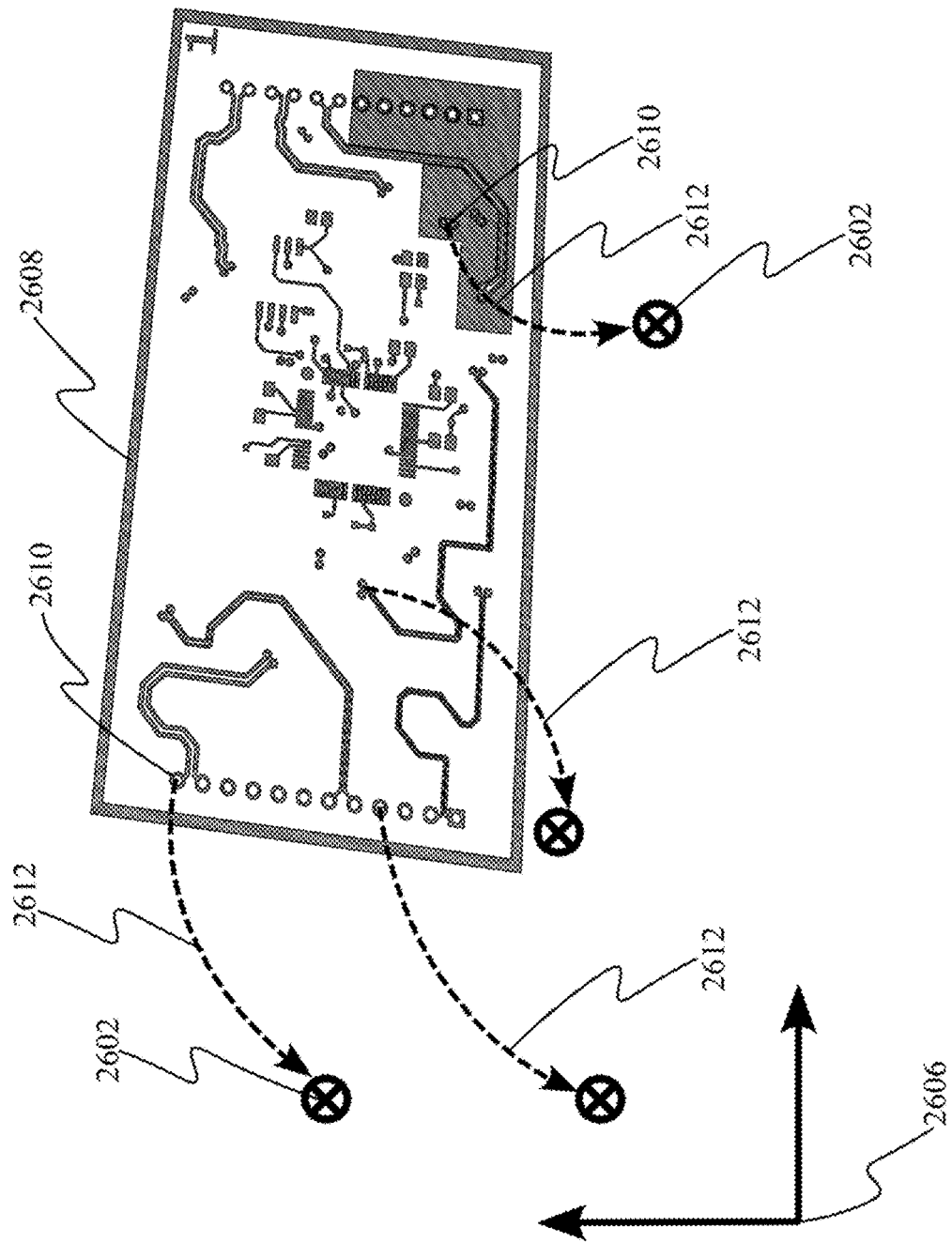
FIG. 26B illustrates the second step in aligning circuit layer images where matching points corresponding to the target points in FIG. 26A are selected on a circuit layer image extracted from the NDI data.
Figure 26C:
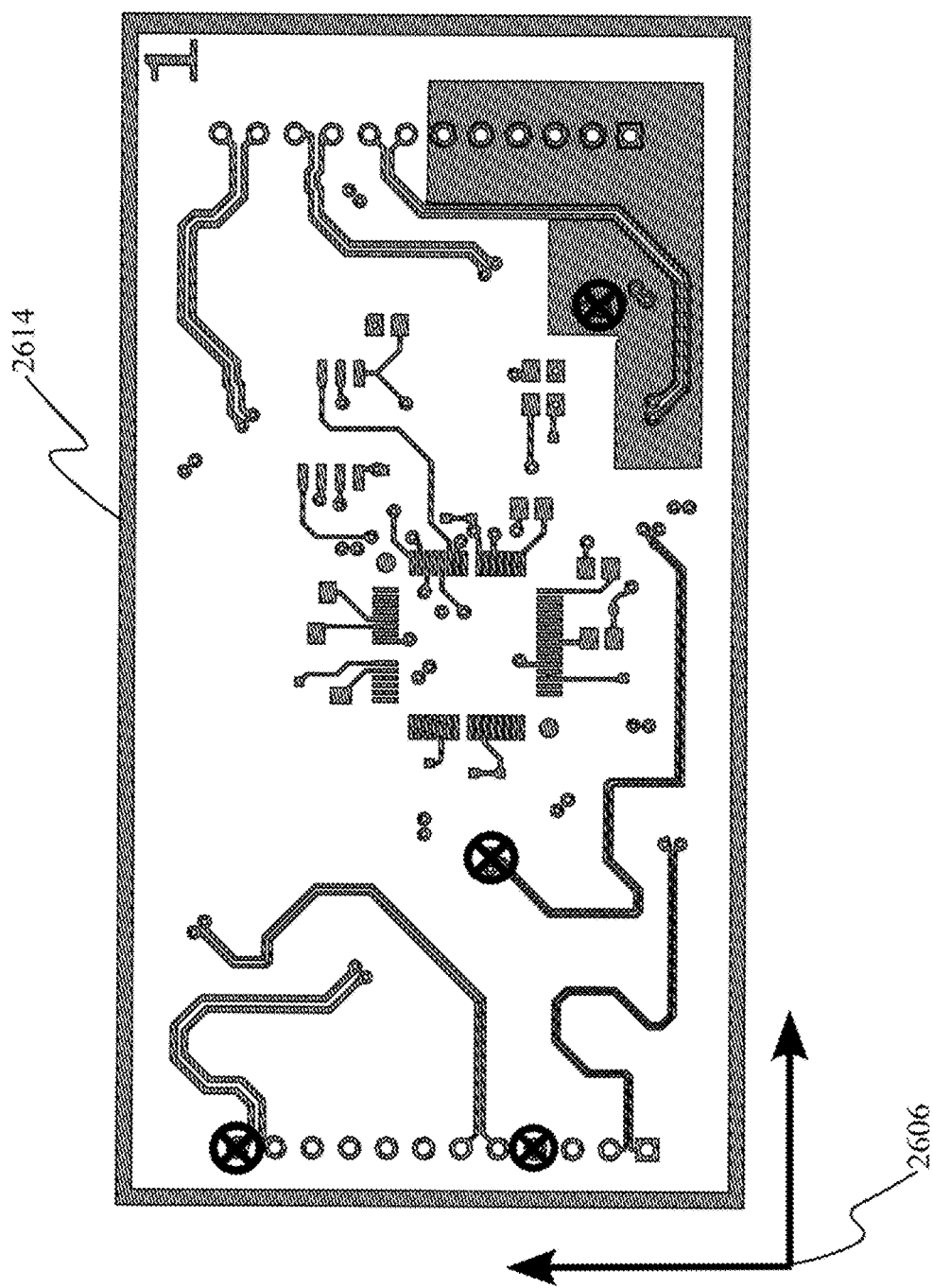
FIG. 26C shows the final result of the circuit layer alignment where the image from FIG. 26B is transformed such that the selected matching points from FIG. 26B are aligned with the target points from FIG. 26A.

This step is performed if desired or deemed necessary and is illustrated in FIGS. 26A-26C. The step geometrically transforms (e.g., translates, rotates, stretches, scales, skews or otherwise warps) the NDI slice 2D grayscale images for each circuit layer so that the images are dimensionally correct and aligned. The images are dimensionally correct when the distances/angles between NDI image reference points/lines correspond to distances and angles measured from the physical board reference points or matching some other desired reference points. The images are aligned when the NDI image reference points for each NDI layer image are aligned with each other.

As illustrated in FIG. 26A, the transform of the images is accomplished by first defining a set 2602 of target reference points while viewing a dimensionally accurate image 2604 of the outer surface of the PCB 202. The image is located with respect to a set 2606 of coordinate axes. Oftentimes the target points correspond to specific features (e.g., drill holes) contained on the physical board. In a second step illustrated in FIG. 26B, the user views an NDI slice image 2608 for the PCB 202 overlaid against the reference points 2602 in the same coordinate system and picks a set 2610 of matching points in the slice image which should correspond to each reference point. The NDI slice image is then subjected to the transformation 2612 such that the reference points and matching points are aligned. FIG. 26C illustrates the final aligned NDI slice image 2614. Any set of reference points that might correspond from one layer to another are typically chosen. Common choices are the center of elements which pass all the way through the board thickness such as the center of fiducials or through drill holes.

Step 6: CAM File Generation from a PCB Circuit Layer Image

As described above, the physical construction of a PCB comprises a laminated structure having alternating layers of conductor and dielectric materials wherein neighboring conductor layers are electrically interconnected by conductor plated holes known as vias, which pass through the intervening dielectric layer. A conventional computer-aided manufacturing (CAM) file such as a Gerber format file, comprises primarily vectorized image files for each conductor layer and also comprises drill holes and vias (conductor-plated drill holes) for the conductor layers. The CAM file also includes a description of the PCB stackup—the thickness and the ordering of each conductor layer and each dielectric layer. The above-described nondestructive process recovers circuit layer images and stackup information from a PCB, which may be flexed (e.g., curved) rather than planar.

Figure 27A:
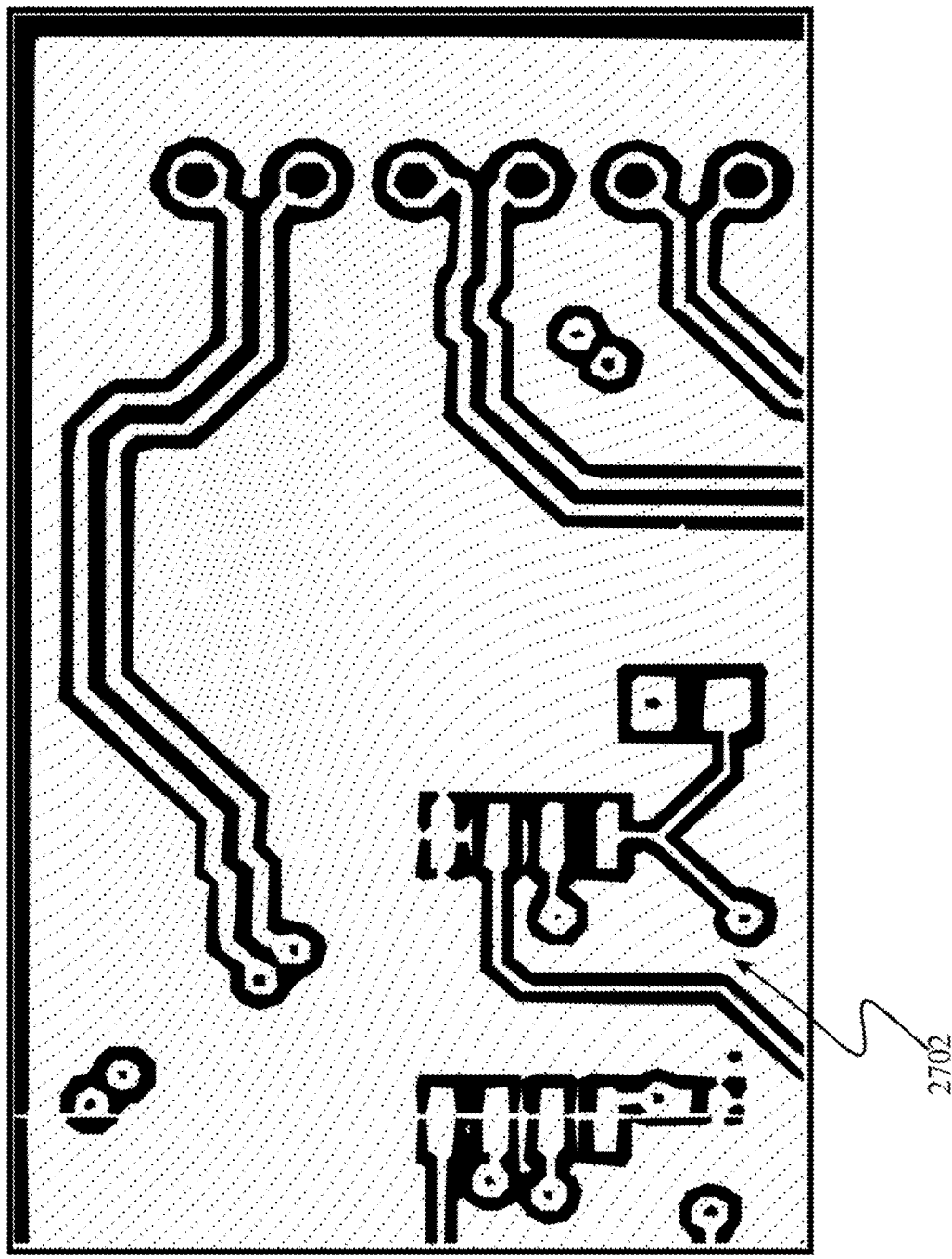
FIG. 27A illustrates a region of a raster (i.e., pixelated) image of a PCB circuit layer generated by the process described herein.
Figure 27B:
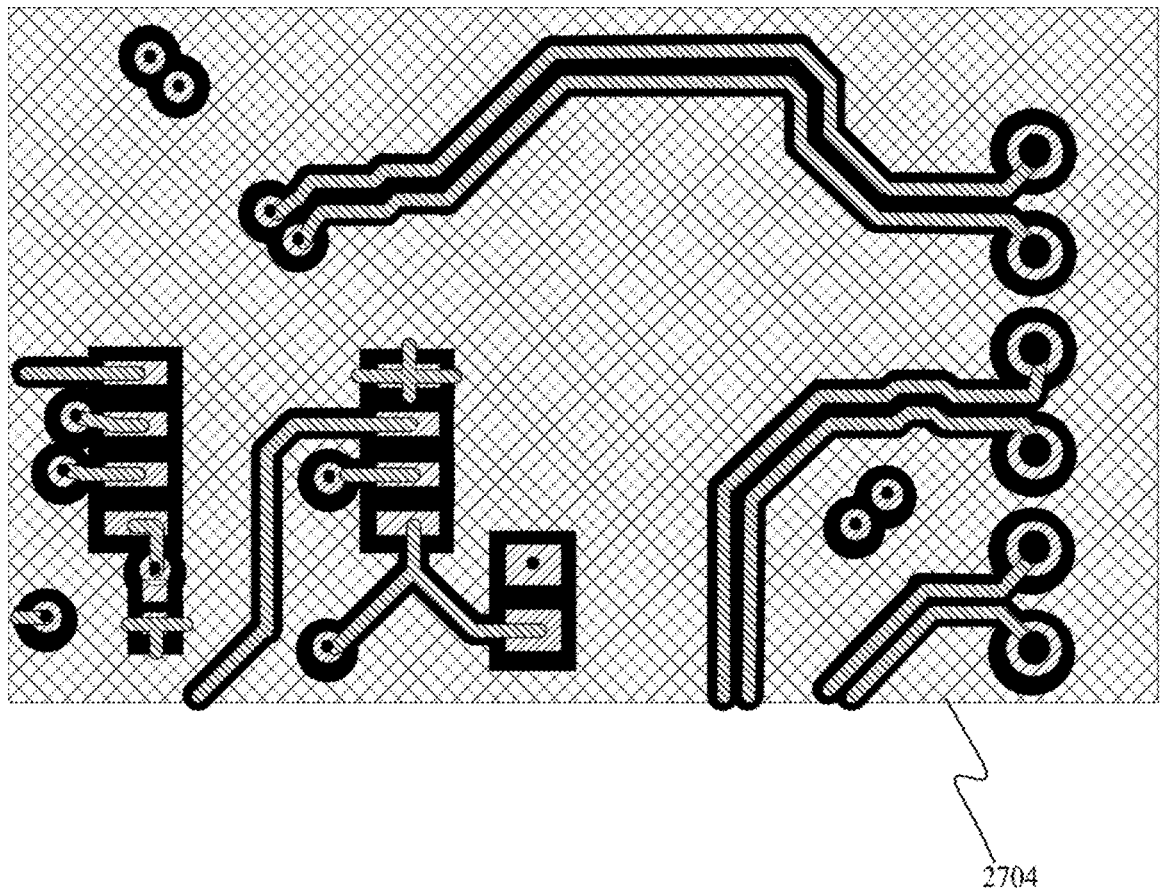
FIG. 27B illustrates a vectorized CAM file generated from the raster image of FIG. 27A using vector graphics primitive elements such as flashed pads and drawn tracks.
Figure 27C:
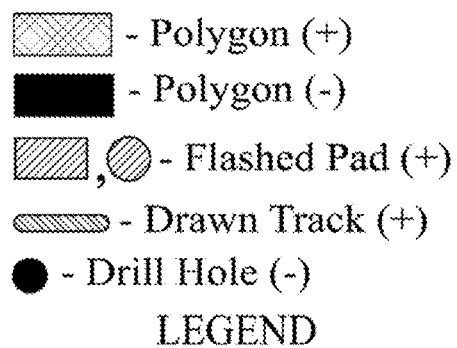
FIG. 27C provides the legend accompanying FIG. 27B.

The following process converts the recovered images of the circuit layers to the selected CAM file format (e.g., the Gerber format in the illustrated process). This process receives a raster (i.e., pixelated) image region 2702 of a PCB circuit layer as illustrated in FIG. 27A and generates a vectorized CAM file and image 2704 as illustrated in FIG. 27B and the accompanying legend illustrated in FIG. 27C. PCB CAM file formats enable the creation of various vector graphic elements, such as polygons defined by boundary points, simple shapes such as rectangles and ovals defined by their size and center point (often called flashed pads or holes), and lines of given thickness defined by their endpoints (often called tracks or traces) as illustrated in FIGS. 27B-27C.

Figure 27D:
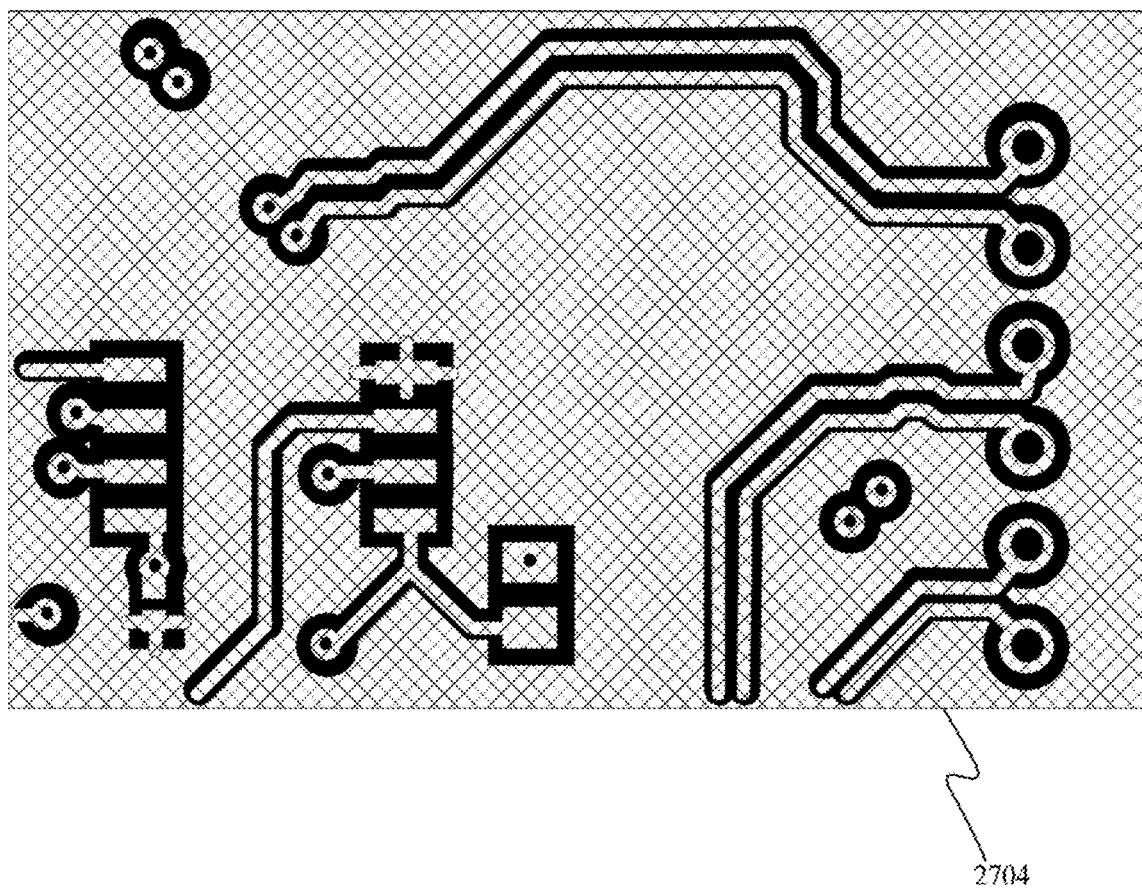
FIG. 27D illustrates a vectorized CAM file generated from the raster image of FIG. 27A using only vector graphics polygon elements.
Figure 27E:
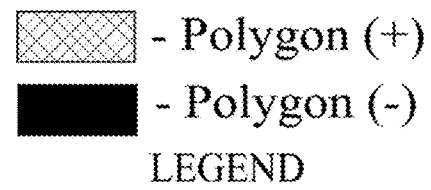
FIG. 27E provides the legend accompanying FIG. 27D.

As illustrated in FIG. 27B, the created elements are drawn in overlaying fashion and in positive and negative polarity (e.g., overlaying black and white layers) to create a final binary image used for manufacturing. The Gerber CAM vector format is flexible, and the same circuit layer image may be represented in different ways as illustrated in FIGS. 27B-27C and FIGS. 27D-27E. FIG. 27D represents the same circuit layer image 2704 as FIG. 27B but using only vector polygon elements as shown in the accompanying legend FIG. 27E. In contrast, FIG. 27B represents the same circuit layer image 2704 using primitive shapes (also known as flashed pads) for circuit layer pads and drill holes, drawn tracks for circuit layer traces, and polygons for circuit layer shielding (also known as conductor pours) and keepout regions. The representation in FIG. 27B is more consistent with PCB design files produced during the initial engineering design of the electronic object.

Figure 28:
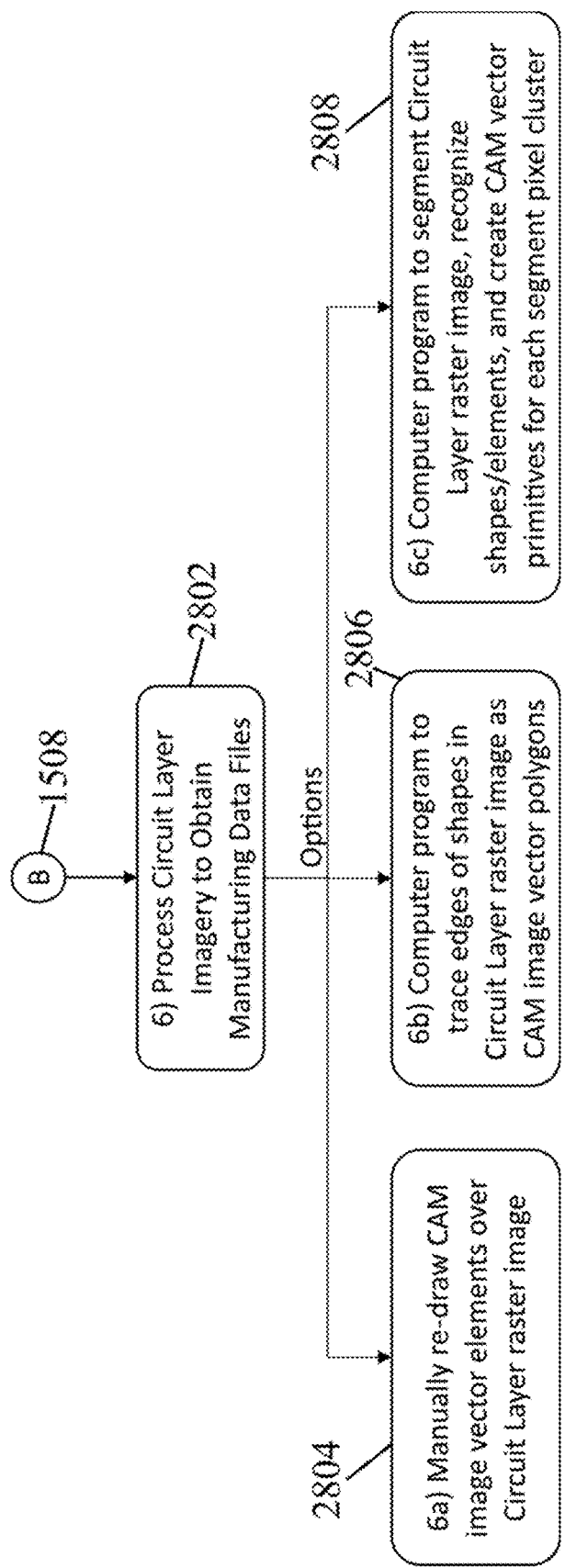
FIG. 28 illustrates three methods for converting a raster image of a circuit layer to an appropriate vector CAM representation.

A process step 2802 (aka Step 6) of converting a raster circuit layer image to a vector CAM file representation is illustrated in FIG. 28, In the illustrated embodiment, the process step 2802 includes at least an optional method 2804 (Step 6a), an optional method 2806 (Step 6b), or an optional method 2808 (Step 6c). As illustrated, the process starts with the set 1508 of circuit layer raster images suitable for reverse engineering from FIG. 15. The optional method 2804 (aka Step 6a) manually re-draws the CAM image vector elements over the circuit layer raster image for each circuit layer image. The optional method 2806 (aka Step 6b) uses a computer program to trace the edges of the shapes in the circuit layer raster image as CAM image vector polygons thereby producing a polygon-only image like that illustrated in FIG. 27D. The optional method 2808 (aka Step 6c) uses a computer program to segment the circuit layer raster image, recognizing primitive shapes and elements, and create CAM vector primitives for each segment pixel cluster polygons thereby producing a CAM primitive-based image like the image 2704 illustrated in FIG. 27B.

Step 6a: Manually Re-Draw CAM Over Raster Image

Figure 29A:
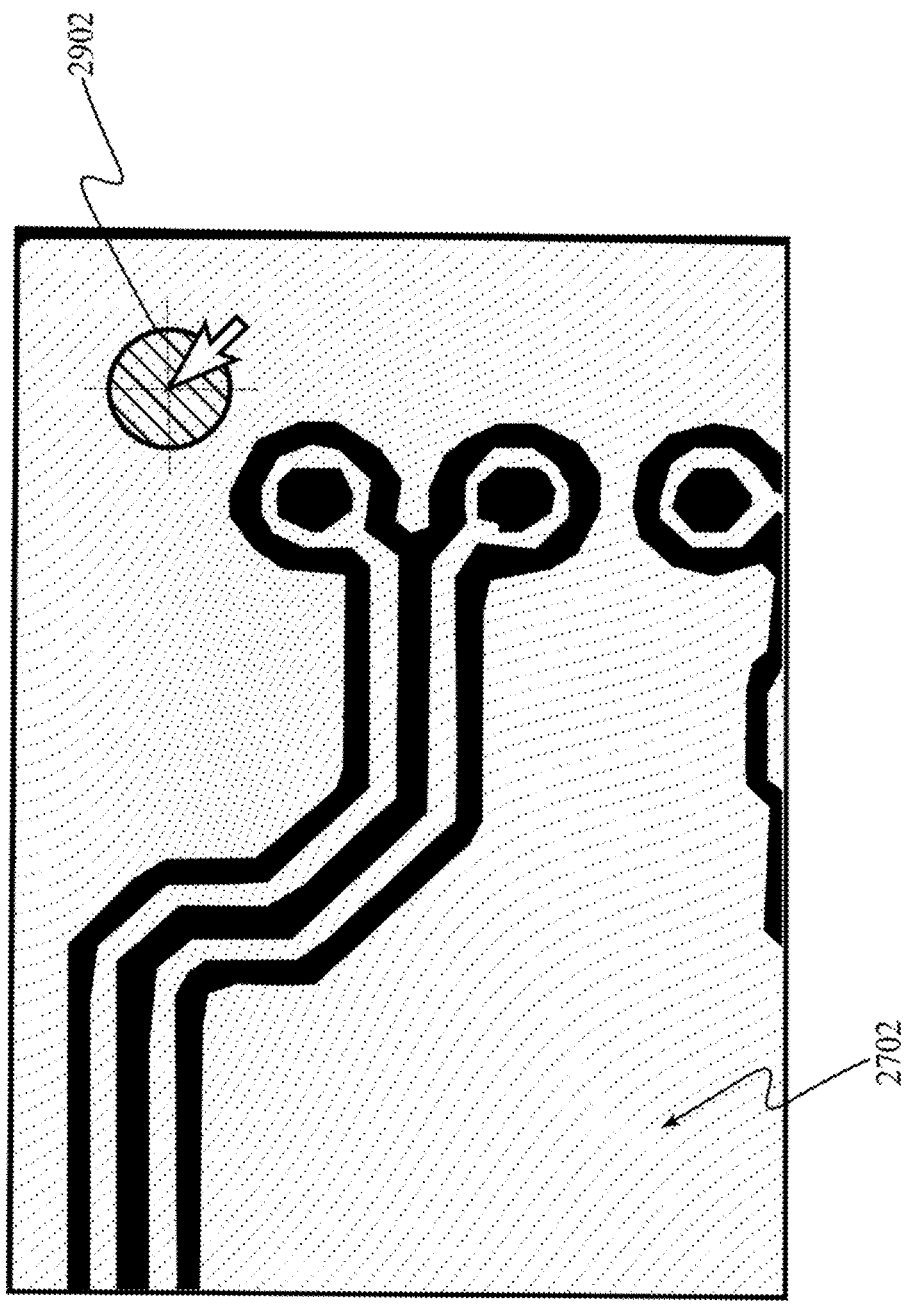
FIG. 29A illustrates a typical PCB CAM application interface process that enables a user to set a background raster image such as an NDI grayscale circuit layer image and attach certain CAM elements such as a flashed pad to the mouse to manually redraw the circuit layer CAM over the background image.
Figure 29B:
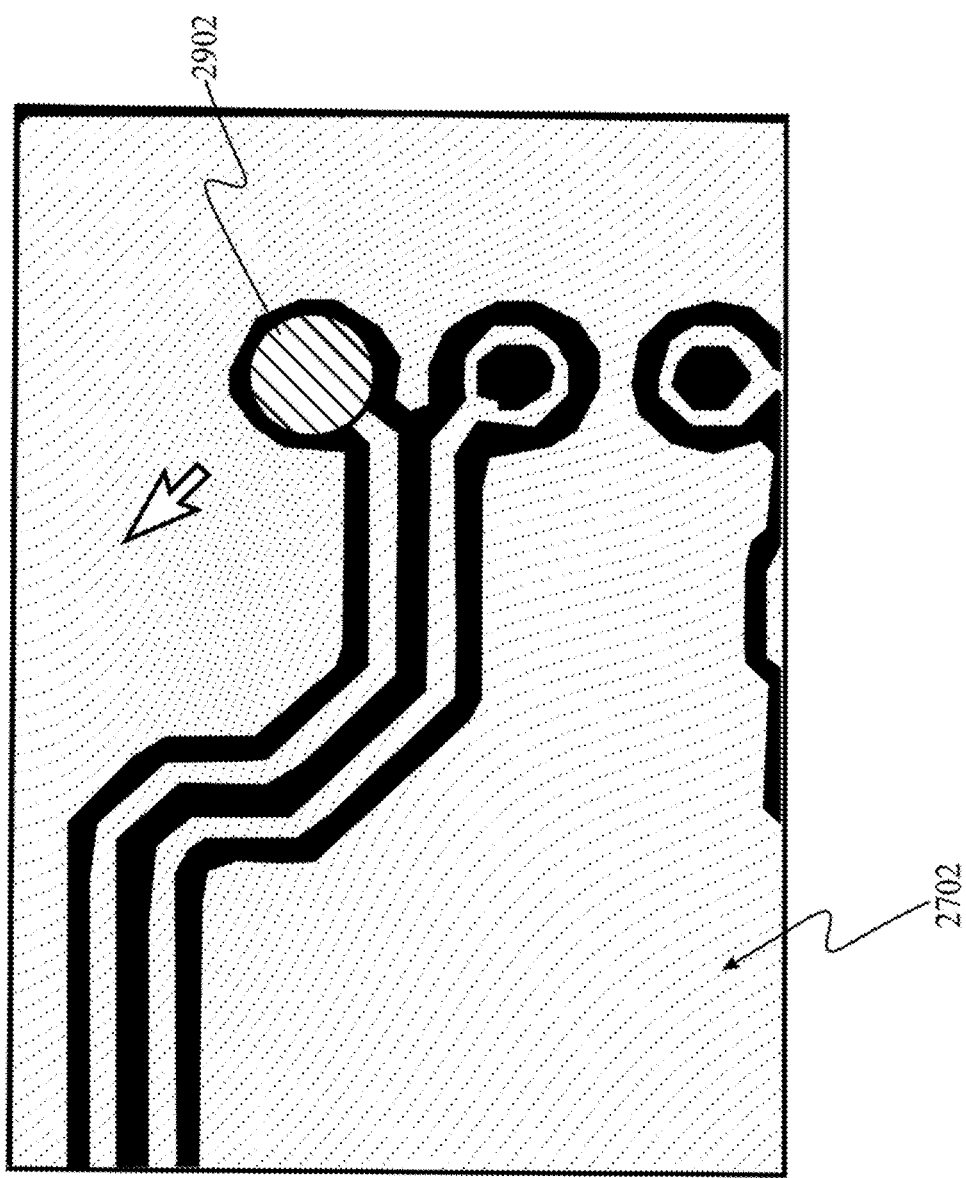
FIG. 29B illustrates redrawing of vector CAM data representing a CAM flashed pad over an image using PCB CAM editing tools.
Figure 29C:
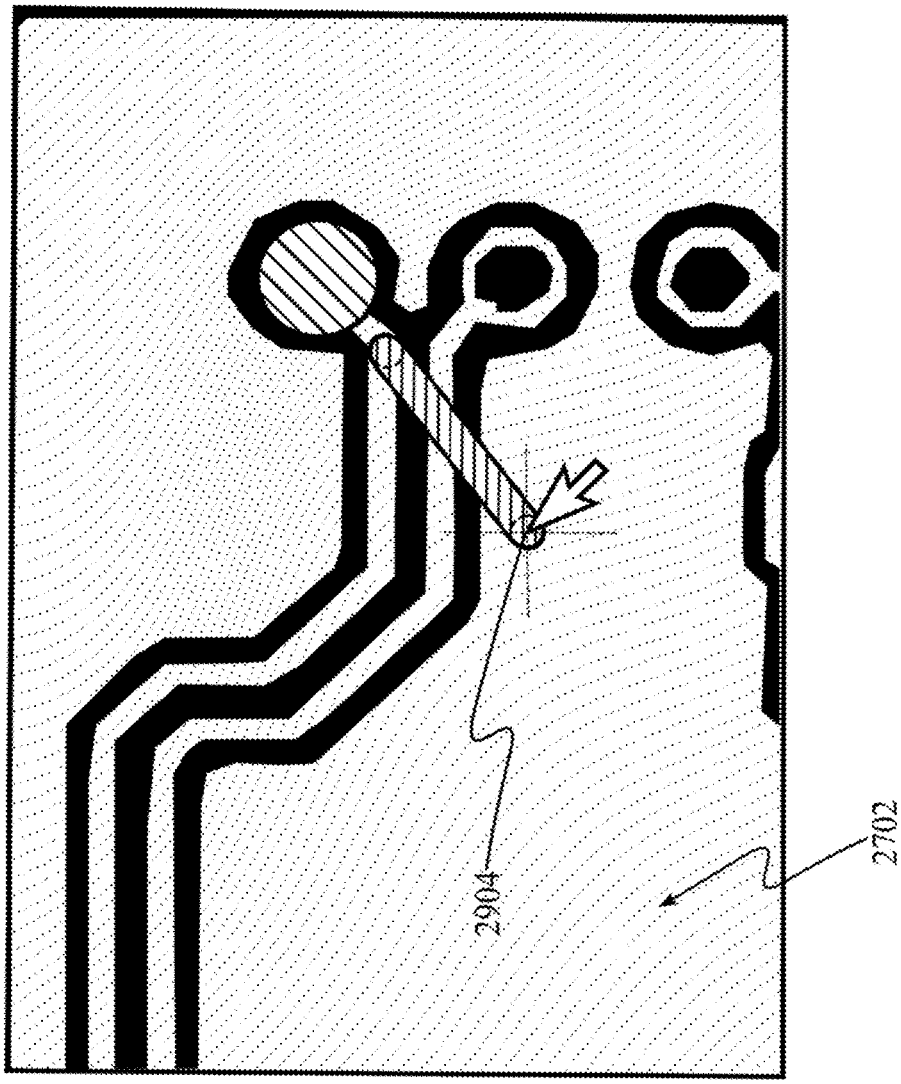
FIG. 29C illustrates a typical PCB CAM application interface process enabling redrawing of vector CAM data representing CAM drawn tracks over an image using PCB CAM editing tools.
Figure 29D:
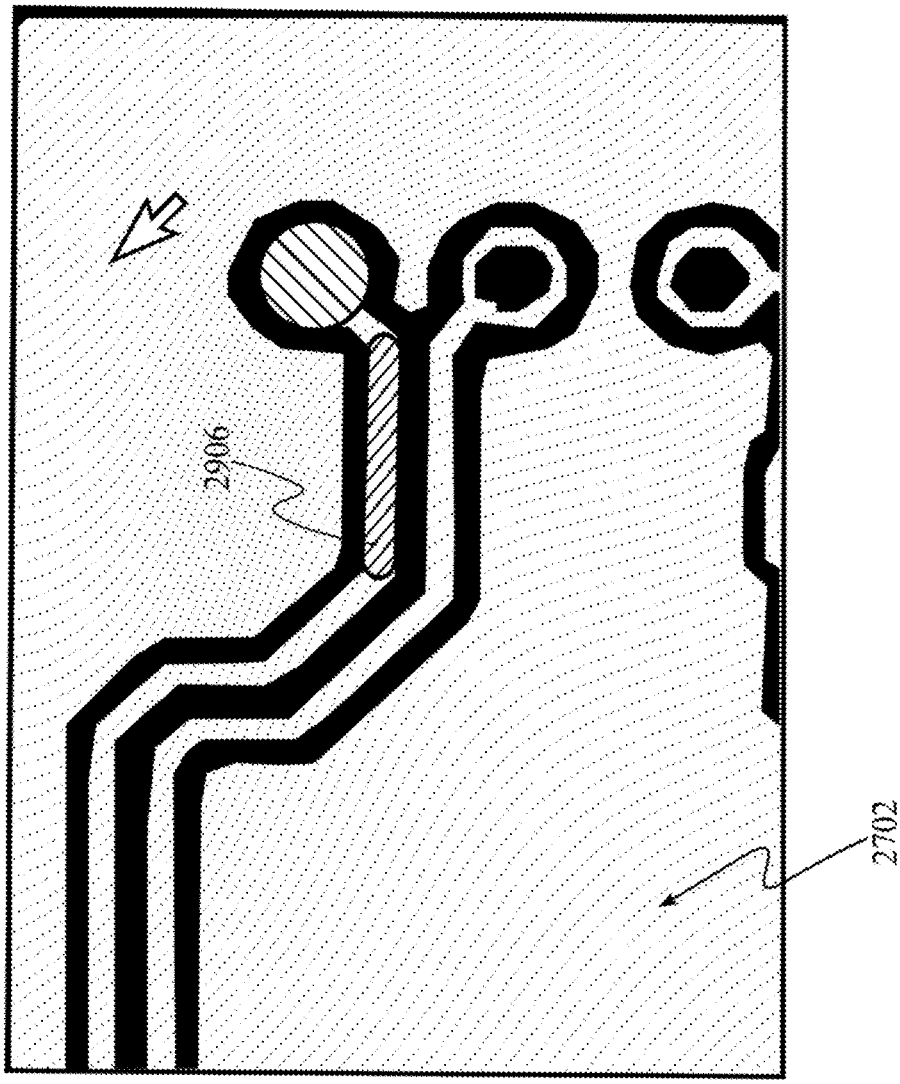
FIG. 29D illustrates the result of manually drawing vector CAM data representing a CAM drawn track and pad over an image using PCB CAM editing tools.

The optional method 2804 (Step 6a), which is shown in more detail in FIGS. 29A-29D, uses the raster image region 2702 as a background in standard PCB CAM applications and manually re-draws the Gerber and drill elements for each layer. For instance, in FIG. 29A a circular pad 2902 of a specific size is "attached" to the mouse. FIG. 29B shows the result of clicking or placing this pad in an appropriate location to represent a pad in the circuit image. In FIG. 29C a track element 2904 of a given size is attached to the mouse. Typically, a user can click at multiple points to define the starting point of the track, its intermediate bend or junction points, and its terminal point. FIG. 29C illustrates the scenario where the starting point has been defined to align with an appropriate point based on the image 2702, and FIG. 29D shows the result of again clicking appropriate endpoint locations to place this track segment 2906 in an appropriate location. The optional method 2804 (Step 6a) is manual but produces a CAM vector file more consistent with initial PCB design files as discussed previously. PCB CAM applications are available that allow users to set a background raster image such as an NDI grayscale circuit layer image. Standard PCB CAM editing tools can be used to re-draw vector CAM data over the image in ways like that described above.

Step 6b: Edge Tracing of Raster Image Shapes to Generate CAM

Figure 30A:
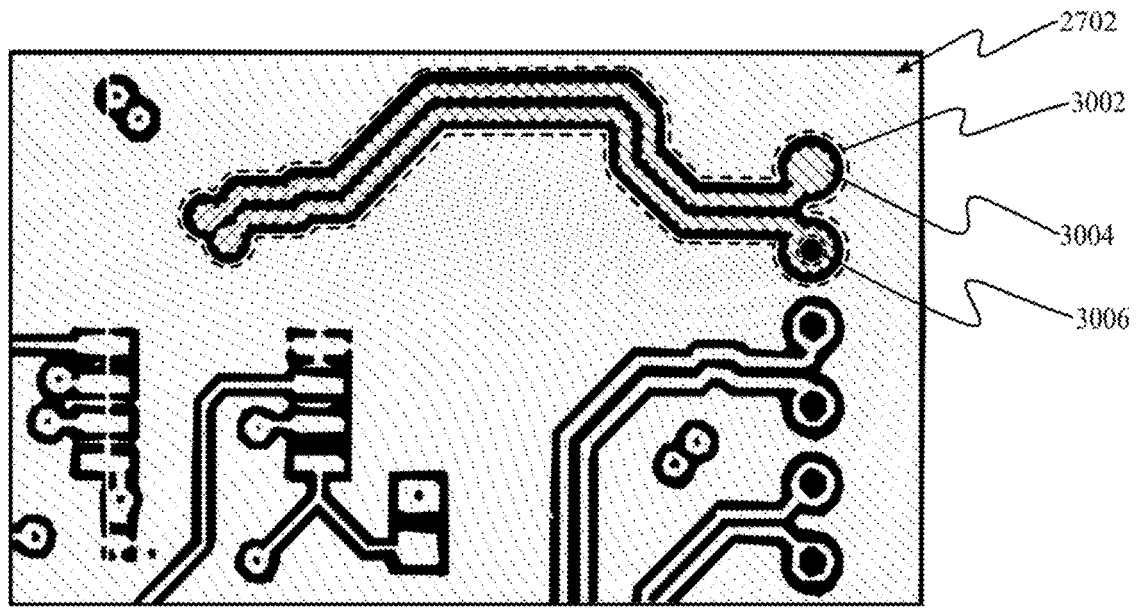
FIG. 30A illustrates a process of automatically identifying and tracing the edges of shapes in a raster image and creating contours (i.e., vector polygons)
Figure 30B:
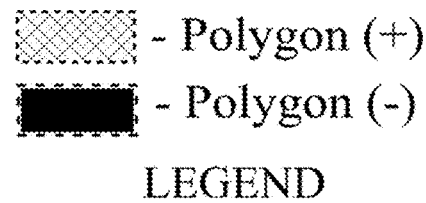
FIG. 30B provides the legend accompanying FIG. 30A.

The optional method 2806 (Step 6b), which is shown in more detail in FIG. 30A and the accompanying legend in FIG. 30B, uses a computer program to automatically identify and trace the edges of the shapes in the raster image region 2702, and to create contours (i.e., CAM vector polygons (e.g., 3002, 3004, and 3006)) as necessary. Note that in this case the positive and negative polarity polygons are drawn in a proper order such that when overlayed the composite image is representative of the raster circuit layer image. For instance, in FIG. 30A the negative polarity polygon 3006 associated with a drill hole is drawn over the positive polarity polygon 3004 associated with two pads and a trace connecting them—both of which are drawn over the negative polarity "cutout" polygon 3002 and so on. Edge identification can be done in several ways including but not limited to pre-existing image edge detection algorithms, or binary segmentation of the raster image to create pixel clusters for each distinct conductor shape. Each shape in the binary image may be first smoothed or otherwise processed so that its edge boundary is simplified. This method is automated but produces a polygon-only CAM vector file less consistent with initial PCB design files as discussed previously.

Converting the raster image to vector CAM in this process identifies distinct conductor shapes within the raster image and generates vector polygons to recreate the image in accordance with the following illustrative approach implemented in software. The software enables a user to convert an NDI grayscale image for a circuit layer to a binary imagery (e.g., black and white imagery). The software identifies independent shapes (distinct pixel clusters) from the binary image, detects the boundary points of the shape, and simplifies the boundary definition (e.g., smooths and/or reduces the total number of edge points) based upon user-set parameters. The software creates vector CAM polygon elements for each shape such that the total vector CAM image is representative of the NDI image. The process of Step 6b is more automated than Step 6a and is based on a series of computer algorithms that query a user for input parameters at each step in the process.

The process of Step 6b produces CAM files that are physically and electrically representative of the PCB and that can be used to manufacture copies; however, the representation of all the CAM features as polygons does have some drawbacks and is not the typical representation created in the forward engineering process. In the forward engineering process, the CAM image is often made of primitive shapes (e.g., circles and rectangles), which are connected by traces (lines with a certain thickness). This representation in the forward engineering process allows designers to easily modify aspects of the design such as the thickness of all traces, whereas the polygon-only representation produced by the process of Step 6b does not enable easy modification of the reverse-engineered CAM image.

Step 6c: Raster Image Shape Detection & Creation of Gerber Shapes

The optional method 2808 (Step 6c) uses an algorithm to segment the raster image into pixel clusters corresponding to common CAM vector features (e.g., drill holes, pads, traces, conductor polygons) and subsequent algorithms to process each pixel cluster to create the proper Gerber feature. The optional method 2808 (Step 6c) is automated and produces a CAM vector file more consistent with initial PCB design files as discussed previously.

The optional method 2808 (Step 6c) uses shape detection algorithms to recover a CAM file from the circuit layer raster image that is more consistent with what an engineer would produce during the forward engineering process. In the optional method 2808 (Step 6c), the vector CAM image comprises primitive shapes and features as described previously rather than using a polygon-only image representation as discussed in the previous section.

The optional method (Step 6c) performs semantic segmentation of a raster circuit layer to yield four types of clusters of pixels. A first type of clusters includes clusters of pixels that likely represent drill holes. A second type of clusters includes clusters of pixels that likely represent CAM flashed pads. A third type of clusters includes clusters of pixels that likely represent CAM-drawn tracks. A fourth type of clusters comprises clusters of pixels that represent other remaining CAM features, which are represented as polygons. After segmenting the clusters into the types of clusters, the process performs further operations on the first, second and third types of clusters. For each of the first, second and third types of clusters, the process analyzes pixel cluster geometries, groups similar geometries together, and assigns an appropriate CAM vector feature to the pixel clusters. The process writes the vector graphic information to a file (e.g., a Gerber file).

A variety of semantic segmentation techniques may be used to yield the four types of clusters of pixels as discussed above. Illustrative examples of techniques are described below for yielding the first, second and third types of clusters. The fourth type of clusters can be yielded in accordance with the previously described Step 6b.

Figure 31:
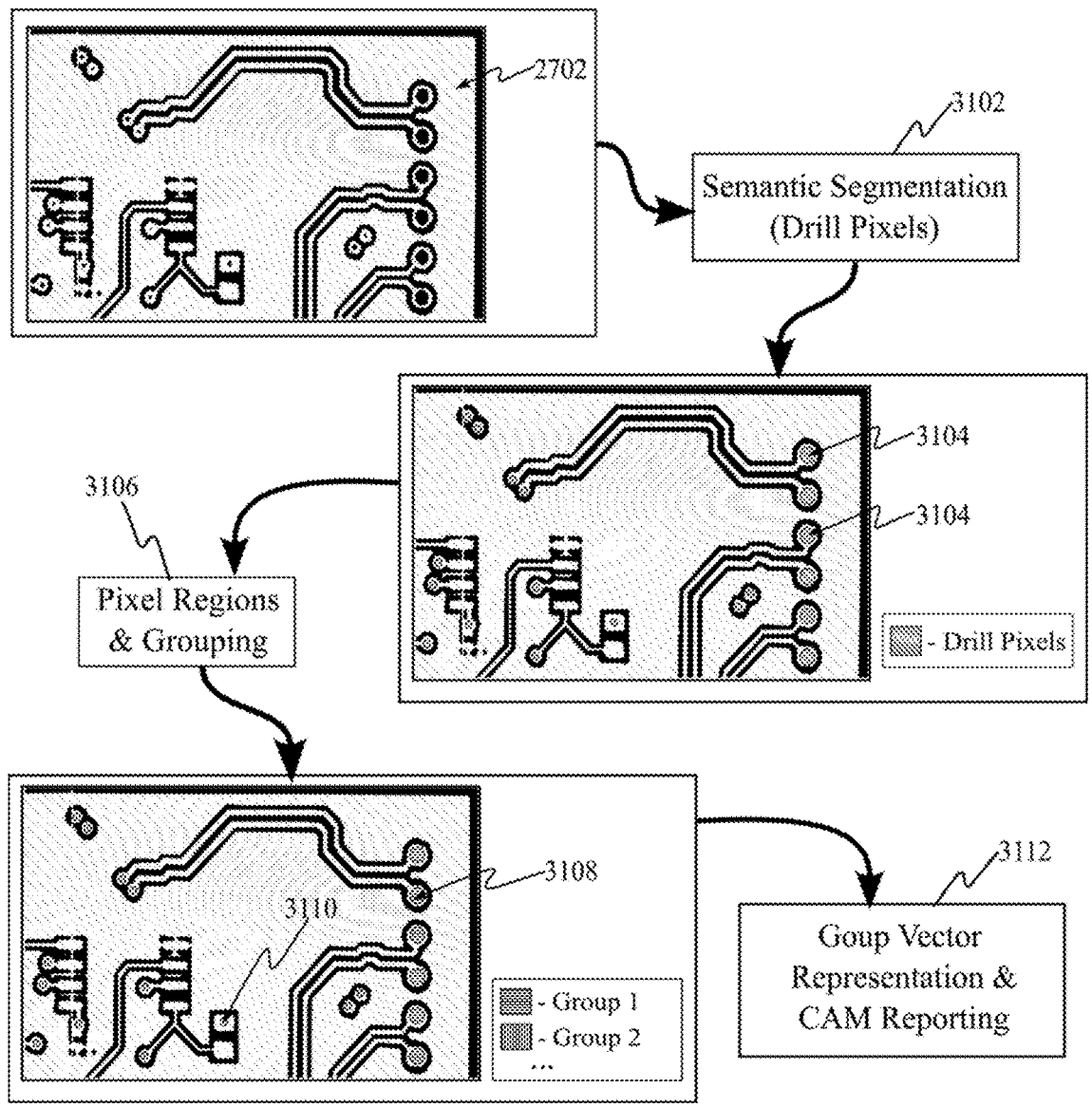
FIG. 31 illustrates a process for producing CAM file vector elements of drill holes by performing segmentation of a circuit raster image to yield a first type of clusters of pixels likely to represent drill holes and assigning vector CAM elements to those clusters.

FIG. 31 illustrates the process for producing CAM file vector elements of drill holes by performing semantic segmentation of the circuit layer raster image region 2702. As illustrated, a semantic segmentation step 3102 first identifies the pixels 3104 associated with drill holes. In a subsequent step 3106, the identified pixels are formed into isolated regions. A single region contains all neighboring pixels identified from the segmentation which are isolated by a border of pixels not identified from the segmentation step or are on the image border. For the regions identified, this step also analyzes the region geometry and groups similar region geometries together as illustrated by the example groups 3108 and 3110 in the figure. This grouping is performed using a clustering algorithm or similar approach. The number of groups may be automatically estimated or specified by a user. In a final step 3112, the regions belonging to each group are analyzed based on their shape and size and assigned an appropriate CAM vector feature definition. The last step also writes the CAM vector graphic features to the drill hole CAM file for each region within each group.

Figure 32:
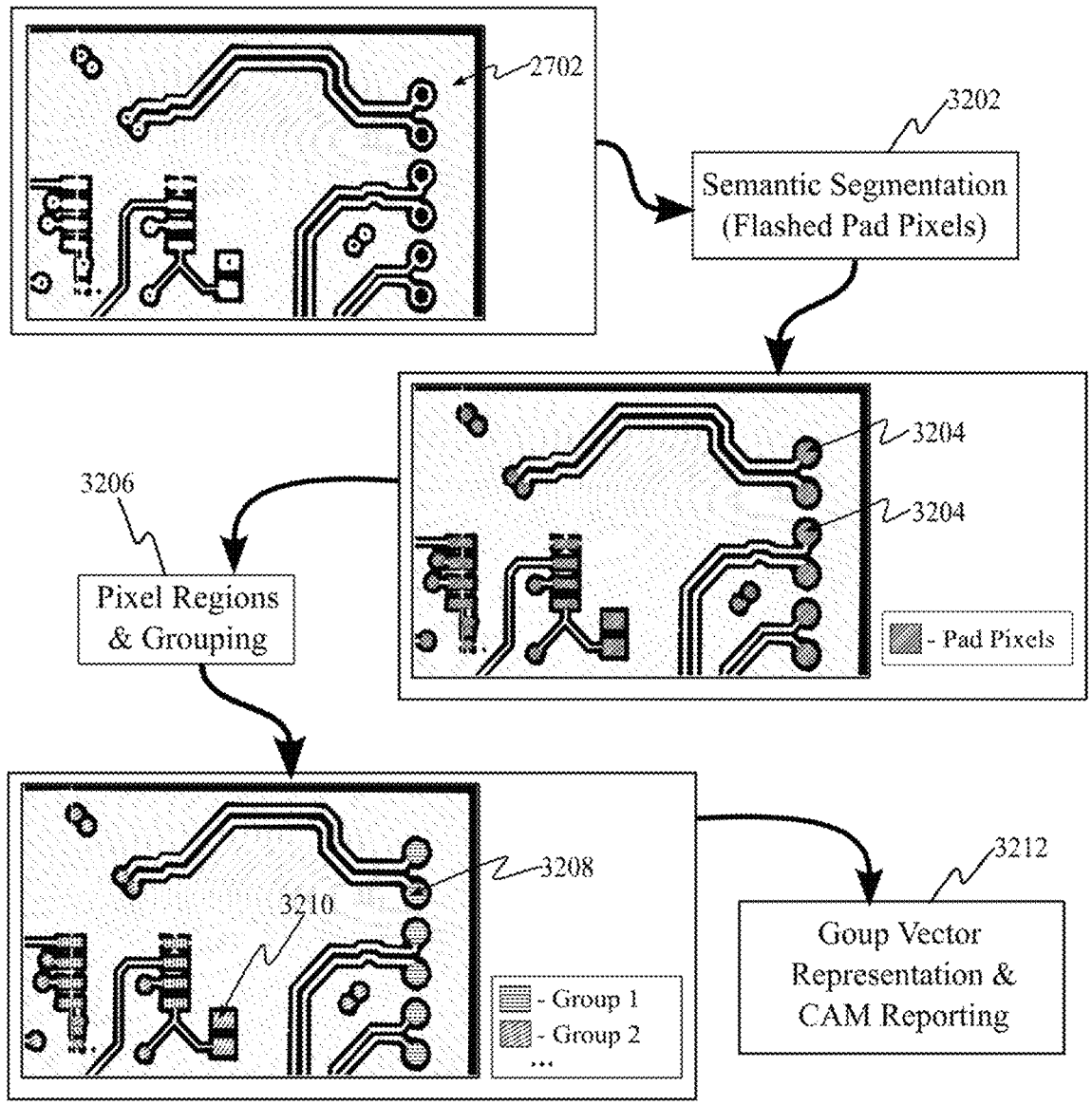
FIG. 32 illustrates a process for producing CAM file vector elements of flashed pads by performing segmentation of a circuit raster image to yield a second type of clusters of pixels likely to represent flashed pads and assigning vector CAM elements to those clusters.

FIG. 32 illustrates the process for producing CAM file vector elements of flashed pads by performing semantic segmentation of the circuit layer raster image region 2702. As illustrated, a semantic segmentation step 3202 first identifies the pixels 3204 associated with flashed pads. In a subsequent step 3206, the identified pixels are formed into isolated regions. A single region contains all neighboring pixels identified from the segmentation which are isolated by a border of pixels not identified from the segmentation step or are on the image border. For the regions identified, this step also analyzes the region geometry and groups similar region geometries together as illustrated by the example groups 3208 and 3210 in the figure. This grouping is performed using a clustering algorithm or similar approach. The number of groups may be automatically estimated or specified by a user. In a final step 3212 the regions belonging to each group are analyzed based on their shape and size and assigned an appropriate CAM vector feature definition. The last step also writes the CAM vector graphic features to the drill hole CAM file for each region within each group.

Figure 33:
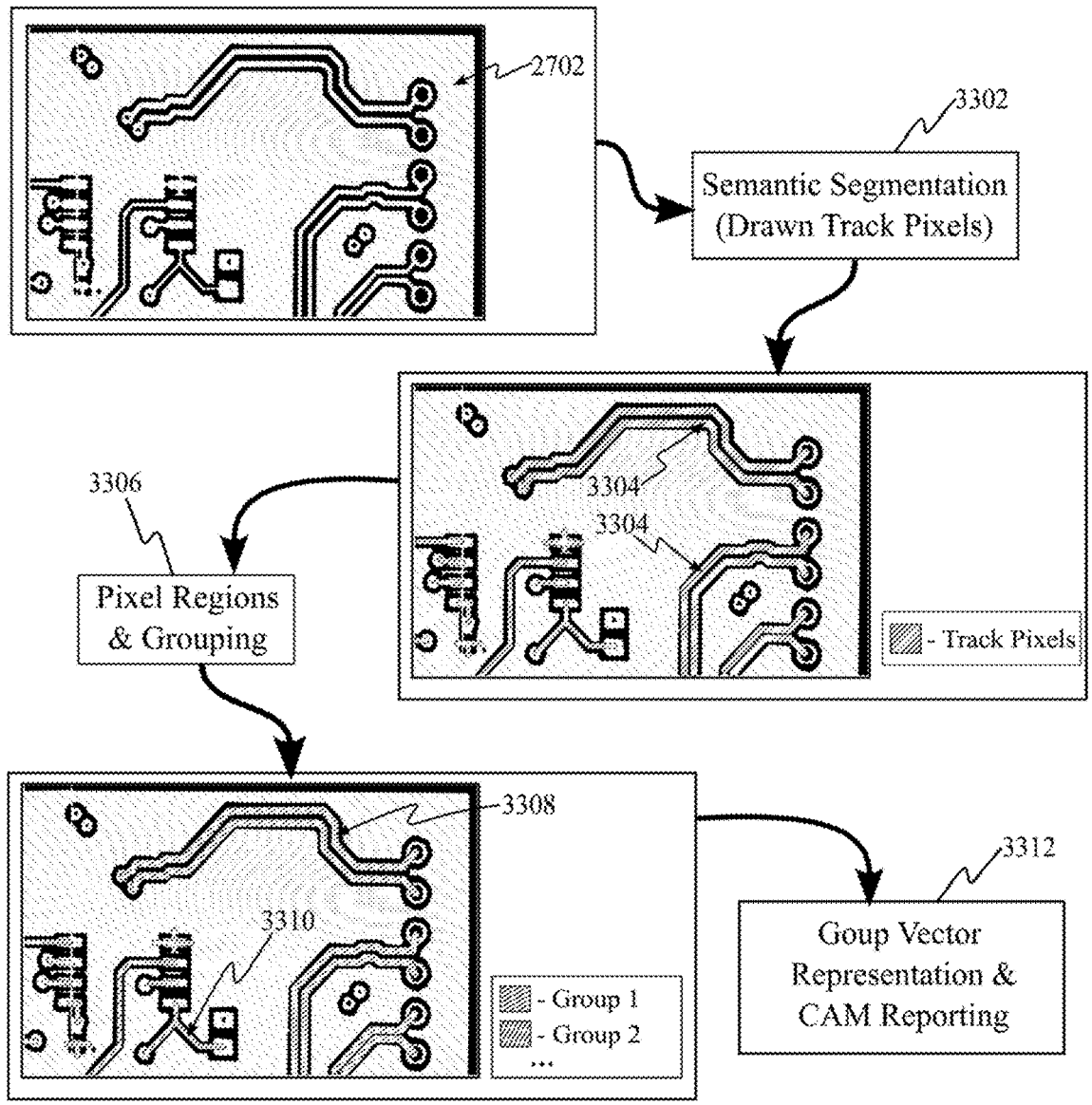
FIG. 33 illustrates a process for producing CAM file vector elements of drawn tracks by performing segmentation of a circuit raster image to yield a third type of clusters of pixels likely to represent drawn tracks and assigning vector CAM elements to those clusters.

FIG. 33 illustrates the process for producing CAM file vector elements of drawn tracks (aka traces) by performing semantic segmentation of a circuit layer raster image 2702 (in this case a nondestructively obtained grayscale image). As illustrated, a semantic segmentation step 3302 first identifies pixels associated with drawn tracks 3304. The identified pixels are then formed into isolated regions where a single region contains all neighboring pixels identified from the segmentation which are isolated by a border of pixels not identified from the segmentation or the image border. For the regions of identified pixels, a step 3306 of the process analyzes the pixel region geometries and creates groups 3308, 3310 of similar region geometries using, for example, a clustering algorithm. The number of groups may be automatically estimated or specified by a user. Lastly, the regions belonging to each group are analyzed based on their shape and size and assigned an appropriate CAM vector feature definition. In a step 3312, the process writes the CAM vector graphic features to the circuit layer CAM file for each region in each group 3308, 3312.

Semantic Segmentation and Shape Recognition

As described above, the optional method 2808 (Step 6c) relies on image processing routines to perform semantic segmentation and shape recognition. Semantic segmentation analyzes a raster image and yields groups of pixels corresponding to a particular feature of interest. As described herein, the features of interest are PCB CAM elements such as drill holes, flashed pads, and drawn tracks. A variety of methods including heuristic approaches, machine learning, neural networks, and artificial intelligence-based algorithms can be used to perform this task. The following paragraphs describe an example of an algorithm that implements a heuristic approach.

Figure 34:
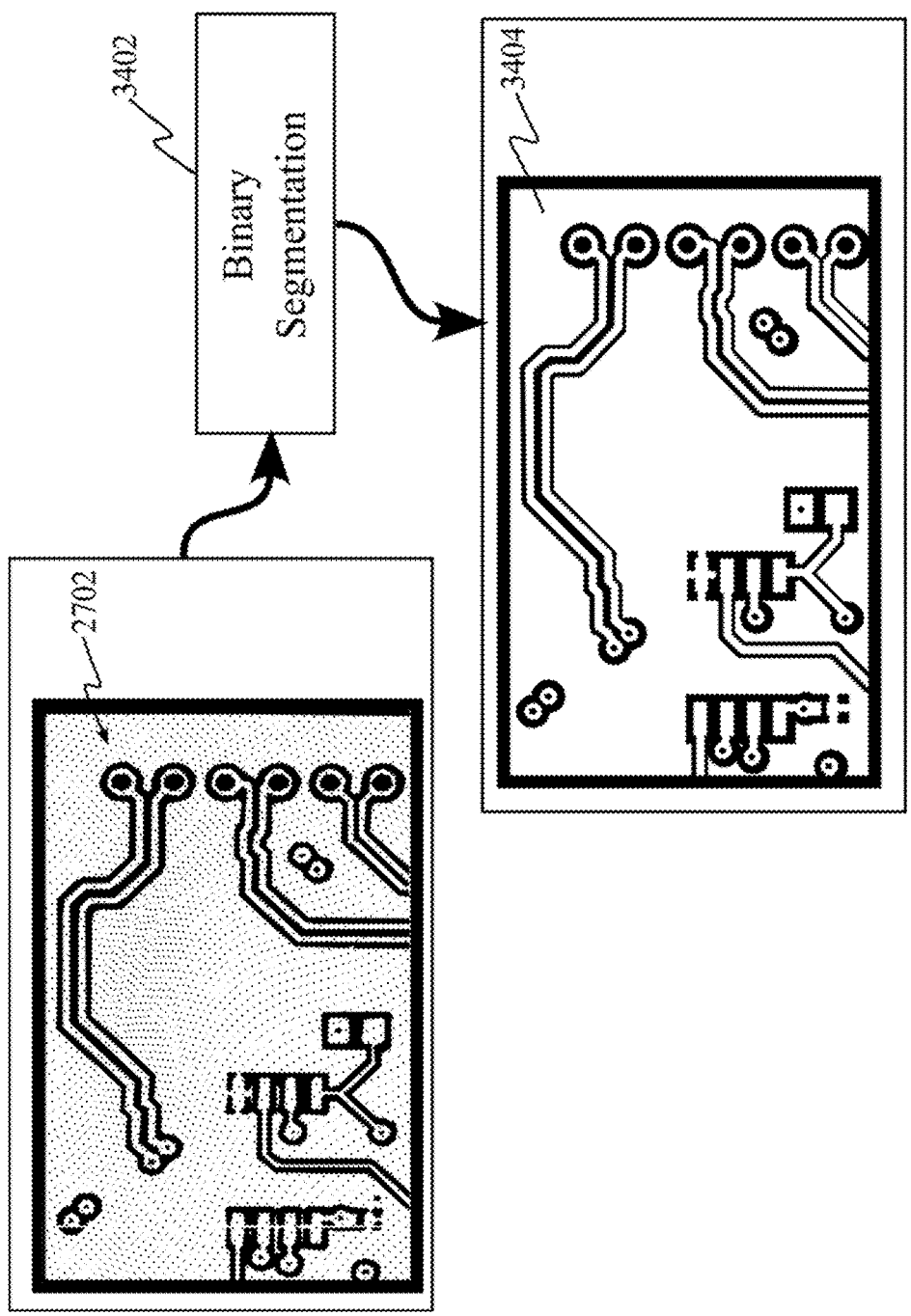
FIG. 34 illustrates an example of performing binary segmentation to convert a grayscale raster image to a binary raster image wherein each "white" or "positive" region is intended to represent a portion of the conductor in a circuit layer.

In a first step 3402, illustrated in FIG. 34, the algorithm performs binary segmentation to convert the grayscale raster image region 2702 to a binary raster image region 3404, wherein each "white" or "positive" area is intended to represent a portion of a conductor in the circuit layer.

Figure 35:
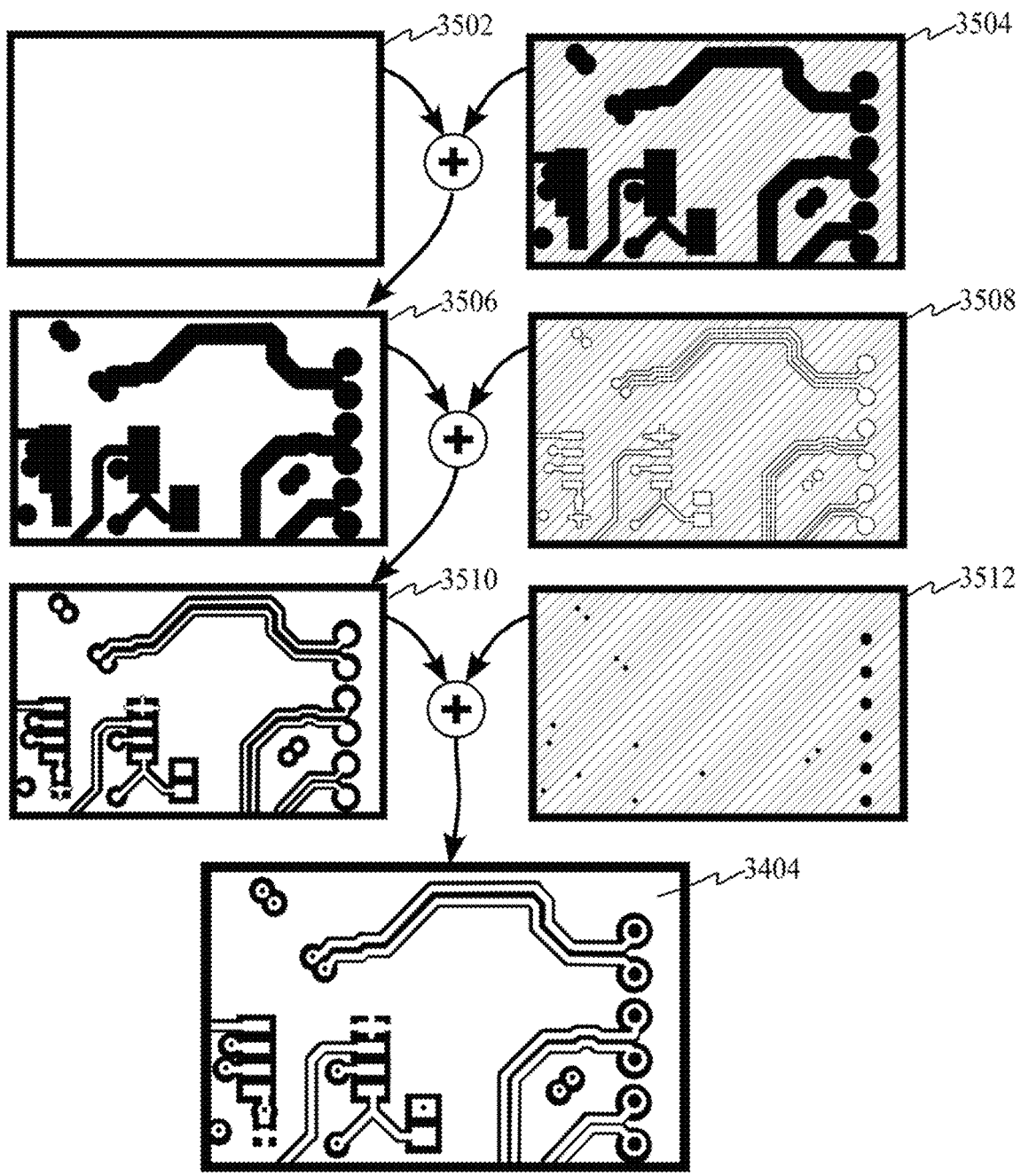
FIG. 35 illustrates the subdivision of a region of FIG. 34 into overlaid positive levels representing conductive material, and negative levels representing areas of no conductive material to yield the final conductor image.

In a second step, the algorithm uses binary image process techniques such as repeated filling of holes and binary subtraction to subdivide the net circuit layer binary image from the first step into a series of alternating positive and negative polarity binary images called levels. The alternating series of images is such that when they are overlaid in the proper level order as illustrated in FIG. 35 the net binary image from the first step is recovered. For instance, the first level 3502 may be a copper pour level (positive polarity) as shown. The second level 3504 is a negative polarity keepout level that when added to the previous level yields an image 3506 containing the copper pour and keepouts for circuit elements as shown. Similarly, a positive level 3508 (the third level) containing traces and pads is added yielding the image 3510 shown which represents the circuit layer except for the drill holes. Finally, a negative level 3512 (the fourth level) containing drills is added to yield the final circuit layer binary image 3404 as illustrated in FIG. 35.

Figure 36:
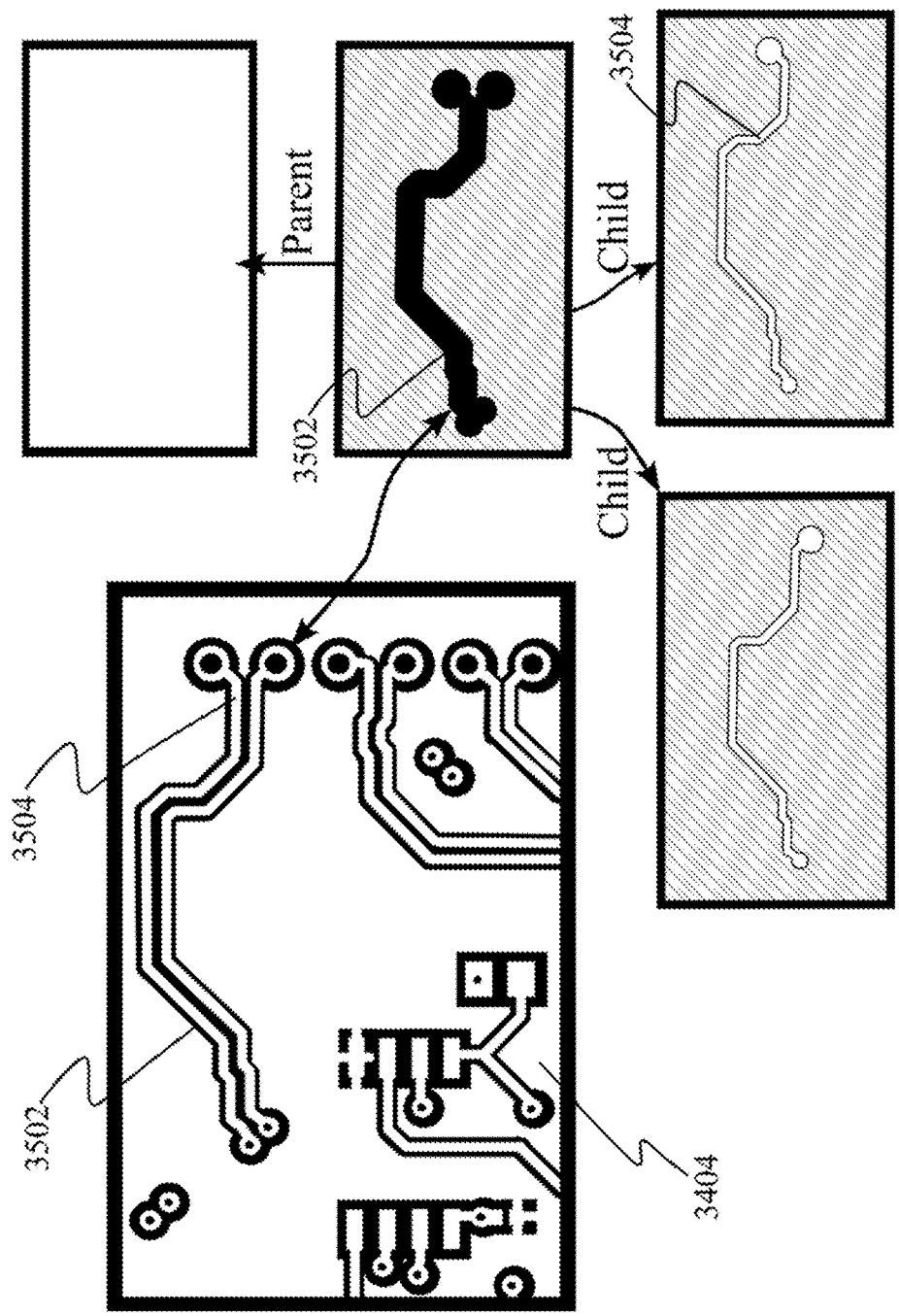
FIG. 36 illustrates the processing of clustered pixel regions to track parent/child relationships between regions within the different levels of FIG. 35.

In a third step, the algorithm identifies and uniquely tags each distinct cluster of pixels in each of the levels generated in the second step. The algorithm further processes the pixel clusters to track the parent and child relationships among levels between clusters as illustrated in FIG. 36. For instance, in the figure the binary circuit layer image 3404 is comprised of a plane conductor layer which contains the keepout region 3502. The keepout region contains regions representing traces and pads like the region 3504. As illustrated in FIG. 36 the region 3502 within the algorithm is a distinct cluster with a reference to the parent conductor pour region on the level above it, and references to its children conductor trace and pad elements including the region 3504 on the level below it.

In a fourth step, the algorithm performs semantic segmentation of drill hole features. The algorithm uses the parent/child relationships from the third step to create a list of all pixel clusters that are drawn in negative polarity and have no children (i.e., have no positive polarity clusters within them). These pixel clusters are identified as potential drill features. For each pixel cluster in the list, the algorithm performs a shape analysis to determine whether the pixel cluster is likely a drill hole (e.g., the pixel cluster is circular). Various shape analysis techniques are available to evaluate the aspect ratio of the pixel cluster and to compare the area of the pixel cluster to that of a respective bounding rectangle area. Another approach evaluates the moments of the pixel cluster to identify certain symmetries present in the shape. Other approaches may seek to fit the geometric equation of a circle boundary to the pixel cluster boundary and measure a goodness of fit. Decisions as to the degree of circularity may be made on this type of information.

Figure 37:
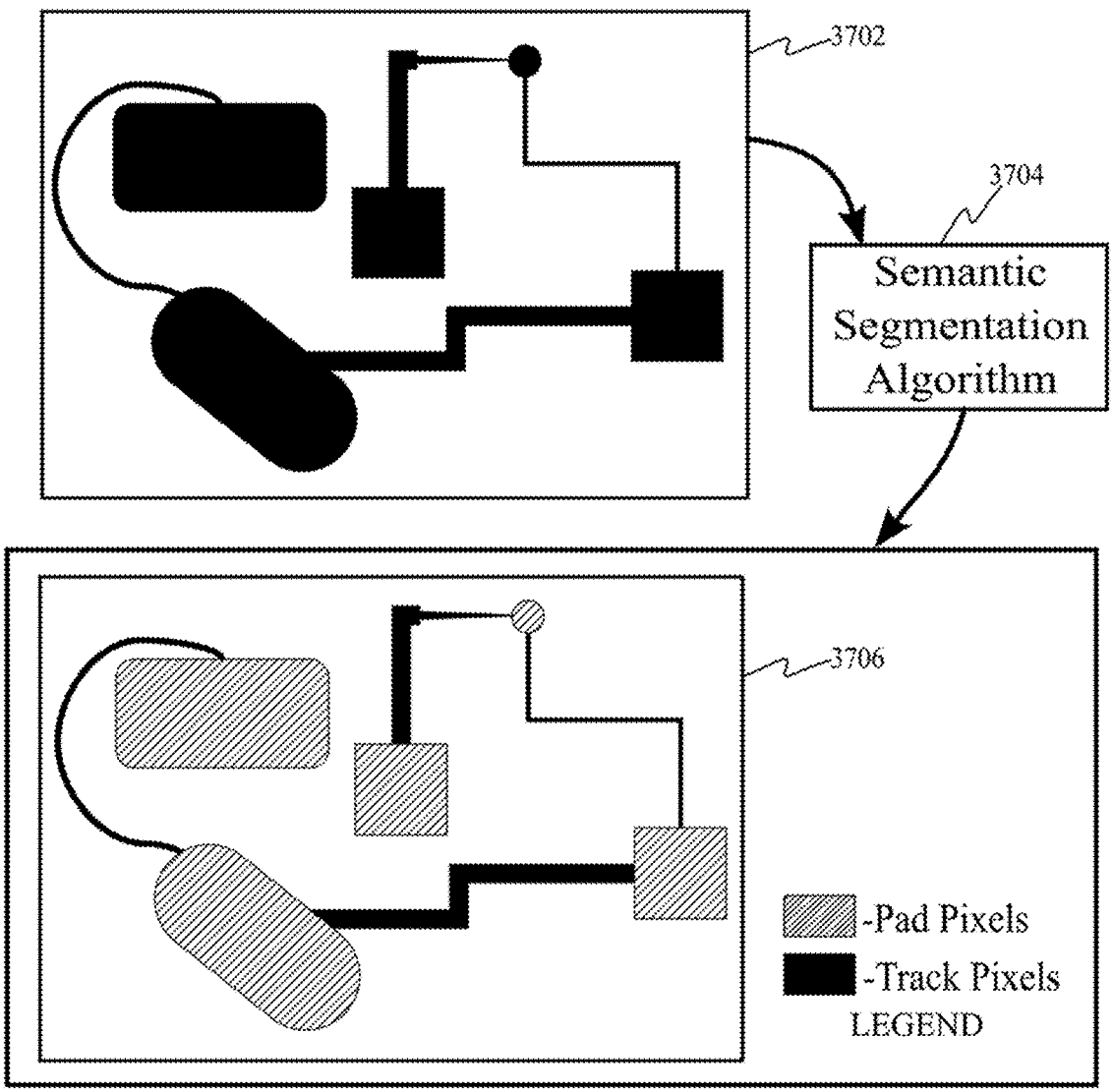
FIG. 37 illustrates the semantic segmentation of pixel clusters that are potential pad and track features by identifying distinct pixels with a larger shape that are likely part of a pad and by tagging non-pad pixels as track pixels.

In a fifth step, the algorithm performs semantic segmentation of pad and track features. The algorithm uses the parent/child relationships from the third step to create a list of all pixel clusters that are drawn in positive polarity and whose children have no children. The pixel clusters in the list are potential pad and track features. For each pixel cluster in the list, the algorithm applies a semantic segmentation algorithm to identify distinct pixels within the larger shape that are likely part of a pad and to tag non-pad pixels as track pixels. This is illustrated in FIG. 37 where a general conductor-shaped image 3702 that might be contained within a circuit layer image is subjected to this semantic segmentation algorithm 3704 and thereby yields an image 3706 of the same region but with groups of pixels tagged as being associated with pads and tracks.

The fifth step may be accomplished with various approaches. One approach is to repeatedly perform binary opening (binary erosion followed by dilation) at ever-increasing thicknesses and to evaluate the resultant shapes (i.e., pixel clusters) for being potential pads after binary opening at each thickness. Binary opening at a certain thickness breaks apart connections in the shape smaller than the given thickness (e.g., tracks thinner than the given thickness). Pixel clusters that are potential pads can be identified using several techniques like those discussed for evaluating the circularity of drill holes discussed previously. After identifying all the potential pads, all remaining pixels are identified as track pixels. Optionally, the algorithm identifies the endpoints of track-like pixel clusters and continues the track feature to the center of the nearest or connected pad (e.g., via dilation of a structuring element the same thickness as the track at its end along a line from the track end to the pad center).

Figure 38:
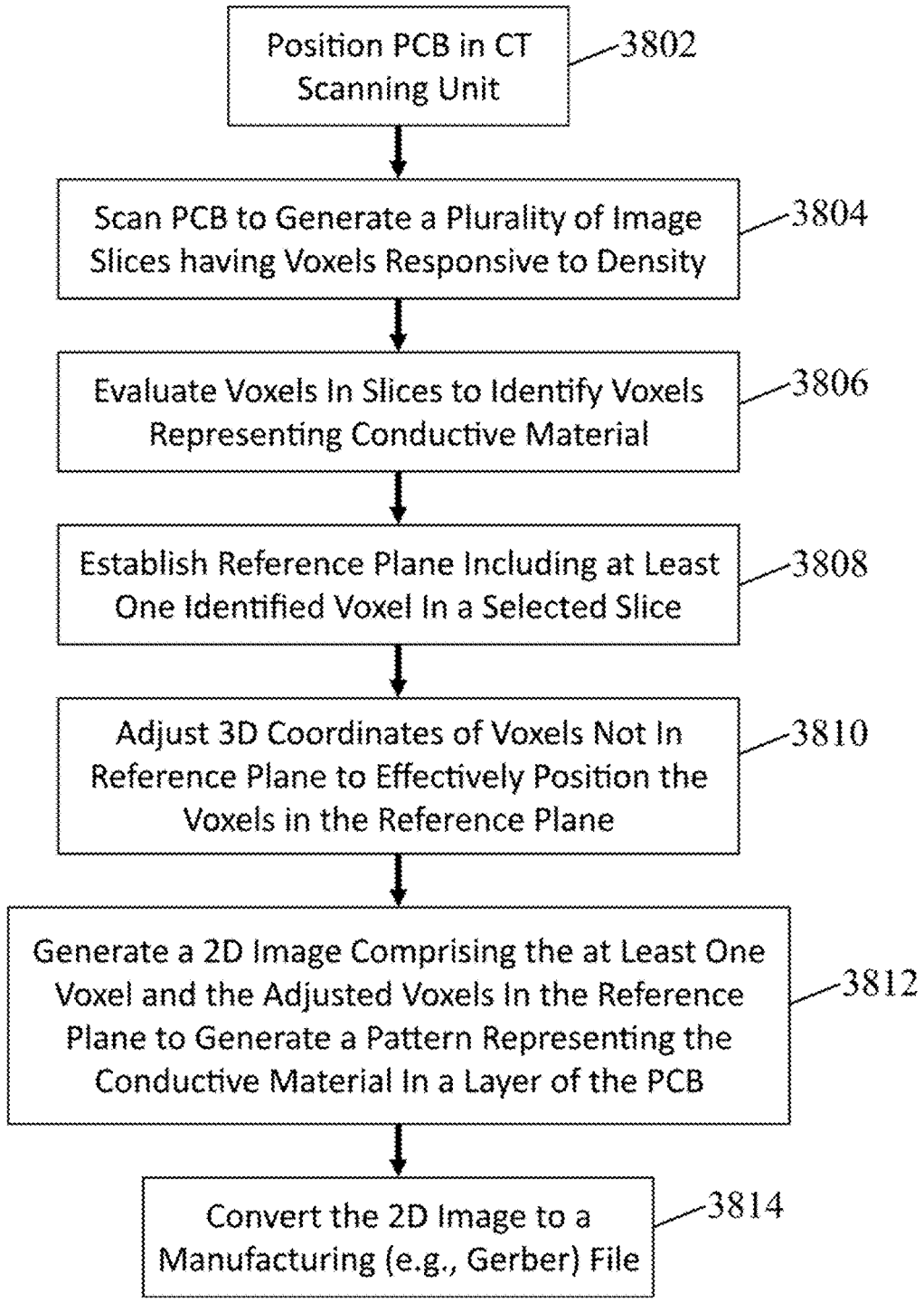
FIG. 38 illustrates a flow chart of the process for reverse engineering a PCB as described herein.

The foregoing description of the process of non-destructively reverse engineering a PCB is summarized in a flow chart illustrated in FIG. 38. In a first step 3802, the PCB (or other electronic object) is positioned in a CT scanning unit. In a second step 3804, the PCB is scanned to generate a plurality of image slices having voxels responsive to densities of conductive material in the PCB. In a third step 3806, the voxels are evaluated to identify voxels representing conductive material. In a fourth step 3808, a reference plane is established that includes at least one of the identified voxels. In a fifth step 3810, the 3D coordinates of voxels not originally in the reference plane are adjusted to effectively position the adjusted voxels in the reference plane. In a sixth step 3812, the process creates a 3D image comprising the at least one voxel and the adjusted voxels in the reference plane to generate a pattern representing the conductive material of a layer of the PCB. In a seventh step 3814, the 2D image is converted to a manufacturing file (e.g., a Gerber file) for the layer. The fourth through seventh steps are performed for each conductive layer of the PCB.

As various changes could be made in the above constructions without departing from the scope of the invention, it is intended that all the matter contained in the above description or shown in the accompanying drawings shall be interpreted as illustrative and not in a limiting sense.

What is claimed is:

1. A nondestructive method for generating a representation of a pattern of electrically conductive material on at least one layer of a multiple-layer printed circuit board (PCB), wherein the at least one layer potentially has a non-planar surface, wherein the electrically conductive material is positioned on the non-planar surface, and wherein the electrically conductive material has a thickness orthogonal to the non-planar surface, the method comprising:

generating a plurality of imaging slices with a three-dimensional (3D) scanning device, each imaging slice comprising a plurality of voxels, each voxel having a volume centered at a respective 3D coordinate with respect to a common origin, each voxel having an intensity responsive to a density of electrically conductive material in the volume of the voxel;

evaluating the voxels in each imaging slice to identify voxels having intensities representing electrically conductive material;

establishing a reference plane that includes at least one voxel identified in a selected one of the plurality of imaging slices, the reference plane parallel to a plane tangential to the non-planar surface;

for a voxel not in the selected imaging slice, determining a distance of the voxel from the reference plane and adjusting the respective 3D coordinate of the voxel to effectively position a respective adjusted voxel in the reference plane; and generating a two-dimensional (2D) image comprising the at least one voxel and the adjusted voxel in the reference plane, the 2D image representing the pattern of electrically conductive material in the at least one layer.

2. The method of claim 1, wherein generating a plurality of imaging slices with a 3D scanning device includes:
x-raying the PCB at a plurality of angles to create a plurality of 2D projections; and
combining the plurality of 2D projections to create the plurality of imaging slices.

3. The method of claim 2, wherein combining the plurality of 2D projections to create the plurality of imaging slices includes applying a computed tomography (CT) algorithm to the plurality of 2D projections to estimate a 3D intensity dataset.

4. The method of claim 1, wherein generating the plurality of imaging slices with a 3D scanning device includes aligning a slice axis of each of the plurality of imaging slices with an object axis of the PCB.

5. The method of claim 1, further comprising:
evaluating the quality of the plurality of imaging slices; and
selectively introducing intentional curvature to the PCB to improve the quality of the plurality of imaging slices.

6. The method of claim 1, wherein establishing a reference plane includes determining a number of layers present in the PCB and establishing a reference plane associated with each layer.

7. The method of claim 1, wherein evaluating the voxels in each imaging slice includes:
dividing each imaging slice into a plurality of regions of interest (ROI) arranged in a grid pattern; and
measuring a depth of the electrically conductive material of each voxel within each ROI.

8. The method of claim 7, wherein determining a distance of each voxel from the reference plane includes:
comparing the depths of electrically conductive material of each voxel to determine a relative offset of each voxel; and
building a board flexure surface based on the relative offset of each voxel.

9. The method of claim 8, further comprising aligning and orienting the board flexure surface with a respective one of the plurality of imaging slices.

10. The method of claim 1, further comprising converting the 2D image into a computer-aided manufacturing file.

11. The method of claim 10, wherein the computer-aided manufacturing file is in the form of a Gerber file.

12. The method of claim 10, wherein converting the 2D image into a computer-aided manufacturing file includes manually drawing elements associated with each layer.

13. The method of claim 10, wherein converting the 2D image into a computer-aided manufacturing file includes, via a computer program, automatically identifying and tracing elements associated with each layer.

14. The method of claim 10, wherein converting the 2D image into a computer-aided manufacturing file includes, via an algorithm, segmenting the 2D image into pixel clusters corresponding to individual elements and processing each pixel cluster.

15. A nondestructive method for generating a representation of a pattern of electrically conductive material on at least one layer of a multiple-layer printed circuit board (PCB), wherein the at least one layer potentially has a non-planar surface, wherein the electrically conductive material is positioned on and/or within the non-planar surface, and wherein the electrically conductive material has a thickness orthogonal to the non-planar surface, the method comprising:

generating a plurality of imaging slices via a three-dimensional (3D) scanning device, each imaging slice including a plurality of voxels, each voxel having a volume centered at a respective 3D coordinate with respect to a common origin, each voxel having an intensity responsive to a density of electrically conductive material in the volume of the voxel;

aligning a slice axis associated with the plurality of imaging slices with an object axis of the PCB;

evaluating the voxels in each imaging slice to identify voxels having intensities representing electrically conductive material;

determining a number of layers of the PCB;

generating a non-planar slice surface for each layer consistent with an estimated flexure of the PCB; and generating a two-dimensional (2D) image of each non-planar slice surface, the 2D image representing the pattern of electrically conductive material in the at least one layer.

* * * * *